US006952060B2

(12) United States Patent
Goldner et al.

(10) Patent No.: US 6,952,060 B2
(45) Date of Patent: Oct. 4, 2005

(54) ELECTROMAGNETIC LINEAR GENERATOR AND SHOCK ABSORBER

(75) Inventors: Ronald B. Goldner, Lexington, MA (US); Peter Zerigian, Arlington, MA (US)

(73) Assignee: Trustees of Tufts College, Medford, MA (US)

( * ) Notice: Subject to any disclaimer, the term of this patent is extended or adjusted under 35 U.S.C. 154(b) by 160 days.

(21) Appl. No.: 09/850,412

(22) Filed: May 7, 2001

(65) Prior Publication Data

US 2003/0034697 A1 Feb. 20, 2003

(51) Int. Cl.$^{7}$ ................................................ H02K 41/00

(52) U.S. Cl. .............................. 310/12; 310/13; 310/15

(58) Field of Search .............................. 310/12, 13, 15, 310/154.01, 152, 266, 154.02, 154.05, 154.45; 290/1 A

(56) References Cited

U.S. PATENT DOCUMENTS

| | | | | |
|---|---|---|---|---|
| 3,559,027 A | | 1/1971 | Arsem | |
| 3,842,753 A | | 10/1974 | Theodore et al. | |
| 3,861,487 A | | 1/1975 | Gill | |
| 3,921,746 A | | 11/1975 | Lewus | |
| 3,941,402 A | | 3/1976 | Yankowski et al. | |
| 3,981,204 A | | 9/1976 | Starbard | |
| 4,032,829 A | | 6/1977 | Schenavar | |
| 4,387,781 A | | 6/1983 | Ezell et al. | |
| 4,500,827 A | | 2/1985 | Merritt et al. | |
| 4,815,575 A | * | 3/1989 | Murty | 188/299 |
| 4,912,343 A | * | 3/1990 | Stuart | 310/14 |
| 5,036,934 A | | 8/1991 | Nishina et al. | |
| 5,146,750 A | | 9/1992 | Moscrip | |
| 5,214,710 A | | 5/1993 | Ziegenberg et al. | |
| 5,347,186 A | | 9/1994 | Konotchick | |
| 5,578,877 A | | 11/1996 | Tiemann | |
| 5,818,132 A | | 10/1998 | Konotchick | |

FOREIGN PATENT DOCUMENTS

JP 58127533 7/1983

OTHER PUBLICATIONS

Y. Suda, et al., "A New Hybrid Suspension System with Active Control and Energy Regeneration," Vehicle System Dynamics Supplement 25, pp. 641–654 (1996).

D. Karnopp, "Permanent Magnet Linear Motors Used as Variable Mechanical Dampers for Vehicle Suspensions," Vehicle System Dynamics, 18:187–200 (1989).

K.E. Graves, "Electromagnetic Regenerative Damping in Vehicle Suspension Systems," Int. J. Vehicle Design, vol. 24, Nos. 2/3, pp. 182–197 (2000)/.

(Continued)

*Primary Examiner*—Burton S. Mullins
*Assistant Examiner*—Iraj A. Mohandesi
(74) *Attorney, Agent, or Firm*—R. Dennis Creehan, Esq.

(57) ABSTRACT

An electromagnetic linear generator and regenerative electromagnetic shock absorber is disclosed which converts variable frequency, repetitive intermittent linear displacement motion to useful electrical power. The innovative device provides for superposition of radial components of the magnetic flux density from a plurality of adjacent magnets to produce a maximum average radial magnetic flux density within a coil winding array. Due to the vector superposition of the magnetic fields and magnetic flux from a plurality of magnets, a nearly four-fold increase in magnetic flux density is achieved over conventional electromagnetic generator designs with a potential sixteen-fold increase in power generating capacity. As a regenerative shock absorber, the disclosed device is capable of converting parasitic displacement motion and vibrations encountered under normal urban driving conditions to a useful electrical energy for powering vehicles and accessories or charging batteries in electric and fossil fuel powered vehicles. The disclosed device is capable of high power generation capacity and energy conversion efficiency with minimal weight penalty for improved fuel efficiency.

24 Claims, 22 Drawing Sheets

OTHER PUBLICATIONS

K.W. Ford, et al. (eds.), "Efficient Use of Energy: Part I—A Physics Perspective," AIP Conference Proceedings, No. 25 (New York 1975), pp. 99–121.

R. Isermann, "Modeling and Design Methodology for Mechatronic Systems," IEEE/ASME Transactions on Mechatronics, vol. 1, No. 1 (Mar. 1996), pp. 16–28.

I. Boldea, et al., "Linear Electric Actuators and Generators," 1997 IEEE International Electronic Machines and Drives Conference Record, Milwaukee, WI (May 18–21, 1997), pp. MA1–1.1–1.5.

J. Rizk, et al., "Design and Performance of Permanent Magnet Generators," Symposium on Power Electronics, Electrical Drives, Advanced Electrical Machines (SPEEDAM), Proceedings, Sorrento, Italy (Jun. 3–5, 1998), pp. 5–9.

J Wang, et al. "Design and Experimental Characterisatio of a Linear Reciprocating Generator," IEE Proc.–Electr. Power Appl., vol. 145, No. 6 (Nov. 1998), pp. 509–518.

* cited by examiner

ELECTROMAGNETIC LINEAR GENERATOR AND SHOCK ABSORBER

FIELD OF THE INVENTION

This invention relates generally to linear motion energy recovery and energy conversion generators. More particularly, this invention relates to efficient, variable frequency, electromagnetic generators for converting parasitic intermittent linear motion and vibration into useful electrical energy. Most particularly, this invention relates to regenerative electromagnetic shock absorbers which both dampen displacement motion and vibrations and convert these into useful electrical energy.

BACKGROUND OF THE INVENTION

Fuel consumption for transportation accounts for a considerable portion of total U.S. energy consumption. The efficiency of conventional gasoline powered vehicles has been estimated at less than ten percent based on energy delivered to the drive train wheels [see Efficient Use of Energy, K. W. Ford, et al. (eds.), American Institute of Physics (New York 1975), p 99–121, which is incorporated herein by reference]. Vehicle efficiency is further reduced by mechanical energy losses dissipated as heat from braking, aerodynamic drag and road resistance. For urban driving conditions, it is estimated that as much as thirty percent of drive train energy is lost in vehicle braking and between thirty to fifty percent of drive train energy is lost to road resistance. It is estimated that the combination of road resistance and aerodynamic drag account for 20–30 kW of power for conventional passenger vehicles and as much as 125 kW of power for heavy trucks at moderate highway speeds. Through the introduction of innovative vehicle designs and technologies, fuel efficiency may be improved and mechanical energy losses recovered.

Energy efficiency in both electric and conventional gasoline powered vehicles is generally compromised by road resistance with associated parasitic energy losses caused by mechanical displacements produced by road bumps and road roughness. It is anticipated that a fifty percent reduction in road resistance could reduce fuel consumption by fifteen to twenty-five percent. Thus, innovative devices which can recover these energy losses with minimum vehicle weight penalty would be highly desirable for improving the overall energy efficiency of both conventional fossil fuel powered and electric powered vehicles.

Conventional vehicle shock absorbers and other suspension damping devices are known in the art. Isermann [IEEE/ASME Transactions on Mechatronics, v.1, no. 1, p.16–28 (March 1996)] has reviewed studies of semi-active vehicle suspension systems which are adaptive to changing vehicle conditions. While Isermann does not teach specific device designs or configurations, he discloses concepts of parameter adaptive vehicle suspension systems for continuously adjustable damping and feedback control for improved driving comfort and safety. Isermann does not appear to cite any references which teach or suggest a regenerative vehicle shock absorber which combines damping with power generation.

U.S. Pat. No. 3,842,753 to Theodore et al. discloses an improved damping system comprising an electro-magnetic damping means with feedback control means for dynamic control of undesirable vehicle suspension oscillations. Theodore does not appear to teach a means for generating power from suspension motion.

U.S. Pat. No. 4,815,575 to Murty discloses an electric, variable damping vehicle suspension device which converts vertical suspension motion into rotational motion which drives a multiphase alternator for generating electrical current flow through a variable load resistance. The load resistance and current are varied by a control signal sensitive to displacement motion to provide dynamic variation in vertical damping force. The disclosed device dissipates the suspension kinetic energy through a variable load resistance as heat and does not appear to teach or suggest energy recovery and power generation from suspension motion.

U.S. Pat. No. 3,941,402 to Yankowski, et al., discloses an electromagnetic shock absorber to supplement or replace conventional hydraulic vehicle shock absorbers for damping road vibrations. The disclosed device employs two electromagnets, one of which has fixed field produced by a unidirectional current flow and another whose polarity is reversible due to bi-directional current flow which is switched depending on the direction of the shock to be absorbed or dampened. The disclosed reversible field electromagnet can produce either a repulsive or attractive force with the fixed field magnet in response to undesirable movement of the vehicle frame. The disclosed device requires an external power source for energizing the electromagnets for damping. In another embodiment, Yankowski discloses the use of permanent magnets of fixed polarity where damping of shocks in only a single direction is required. Due to the pole to pole configuration employed and relatively low flux magnetic flux density produced, it is anticipated that the disclosed device provides for relatively weak damping by way of either repulsive or attractive forces acting between single poles of two adjacent electromagnets or magnets. The disclosed device consumes rather than generates power.

Linear motion generators which recover energy from repetitive linear motion or vibrational motion are also known in the art. Boldea, et al. [IEEE Int. Electric Machines and Drives Conf. Record, IEMDC 1997, IEEE (Piscataway, N.J.), p. MA1-1.1–MA1-1.5 (1997)], provide a review of the art of linear motors, actuators and generators as well as oscillating motors and generators that employ either moving coil stators, moving permanent magnet stators and moving iron stators. The disclosed devices generally have a cylindrical configuration and are typically designed to operating at fixed displacement frequency and fixed displacement amplitude. None of the disclosed devices appear to teach or suggest the use of linear generators as a shock absorber for damping.

U.S. Pat. No. 4,500,827 to Merritt, et al., discloses a linear reciprocating electrical generator with a reciprocating armature comprising a plurality of rectangular permanent magnets which are coupled to a source of relative motion. The device has applications in automotive suspension systems, windmills and in ocean wave power generation. In the disclosed embodiments, armature magnets are arranged with alternating magnetic poles, configured orthogonal to the direction of reciprocating motion, which oscillate within a fixed stator comprising a plurality of spaced windings. The magnetic poles of adjacent magnets are aligned with individual winding groups for inducing current. One limitation of the disclosed device is that it does not appear to fully utilize the magnetic field and flux created by the magnet array since the generator apparently exploits only single magnetic pole-coil interactions and does not appear to provide for positioning the coil windings in the region of maximum magnetic flux density. This limitation results in reduced efficiency and power generation capability. Merritt discloses alternative embodiments in which the generator armature is mechanically or hydraulically linked to a conventional automobile control arm and its shock springs.

U.S. Pat. No. 5,578,877 to Tiemann discloses a linear generator device for converting vibratory motion to electrical energy for powering tracking units, such as GPS or Loran-C receivers, or electronic sensors in vehicles such as railroad cars and tractor trailers. The disclosed device is apparently designed for large amplitude, low frequency motion where displacements are typically greater than one centimeter. In one disclosed embodiment, the apparatus comprises a carrier structure fitted with aligned rows of permanent rectangular magnets which are supported by a suspension means which allows reciprocating movement relative to an enclosure fitted with an armature assembly comprised of coil windings. In an alternative disclosed embodiment, the coil windings are attached to the vibrating carrier structure and the magnets are attached to the enclosure. The disclosed device does not appear to fully utilize the magnetic field and flux created by the magnet array since the magnet-coil configuration does not provide for placement of the coil windings in the region of maximum magnetic flux density. Since Tiemann teaches device enclosures made from ferromagnetic materials to couple to the magnets, the disclosed device will likely produce undesirable eddy currents within the housing enclosure during operation which will significantly dampen motion of the armature, resulting in reduced current output and compromised power generation capacity. It is anticipated that these limitations will result in a significant reduction in energy conversion efficiency and power generation capability. Tiemann discloses one embodiment where the generator is coupled to a charging circuit for recharging an attached battery. Tiemann does not appear to teach or suggest the use of the disclosed generator as a shock absorber.

U.S. Pat. No. 5,347,186 to Konotchick discloses several embodiments of a linear motion electric power generator which employ a cylindrical assembly of a rare earth NdFeB magnets and coil windings positioned to move reciprocally relative to each other. The device has applications in powering buoys, roadway signs, call boxes and portable radios. The disclosed device apparently is designed for relatively high amplitude, repetitive linear mechanical motion typically associated with high power motion such as ocean waves and jogging. One limitation of the disclosed embodiments is that they do not appear to fully utilize the magnetic field and magnetic flux generated from device magnets since the generator designs appear to exploit only single magnetic pole-coil interactions and do not appear to provide for positioning the coil windings in the region of maximum magnetic flux density. In one disclosed embodiment, Konotchick demonstrated a continuous power output of over 80 milliwatts could be maintained with hard shaking of the device. Konotchick also discloses circuitry for electrical regulation of the current and voltage output of the generator for charging batteries. In one preferred embodiment, the total power output observed by Konotchick's disclosed generator with intense shaking was limited to approximately 1 Watt or 1.54 watts per pound. The reported mechanical to electrical energy conversion efficiency for the total generator unit were relatively low, ranging from 2.7 to 4.8%. '186 to Konotchick does not appear to teach or suggest the use of his generators as shock absorbers.

U.S. Pat. No. 5,818,132 to Konotchick discloses alternative configurations of the cylindrical linear motion generator of '186 for converting low amplitude, low power, repetitive linear displacements, or intermittent linear displacements into electrical power. Disclosed applications for the device include power generation for flashlights, alarm systems and communication devices. The disclosed design is similar to the device of'186 to Konotchick except for the partial substitution of ceramic magnets, or magnetically permeable disks, in sandwiched layered structures with rare earth magnets to reduce cost. Additional disclosed embodiments include variations such as reversing coil winding direction in adjacent coils, connecting multiple generating units in parallel or increasing the number of moving magnets for increased power output, employing a vented tube configuration to avoid air damping of magnet travel, and enhancing generator sensitivity by orienting magnet travel vertically. One disclosed embodiment produced peak to peak voltage of 3 to 20 volts with mild to heavy shaking with 17.5 milliwatts of peak power. '132 to Konotchick does not appear to teach or suggest the use of the disclosed device as a regenerative shock absorber for vehicles.

Wang, et al. [IEEE Proc. Electric Power Applications, v145, no.6, p. 509–518 (November 1998)], disclose a small, linear microgenerator for generating low level electrical power as a battery substitute in telemetry vibration monitoring systems. The disclosed device employs rare earth NdFeB magnets in a translatable stator which vibrates within a cylindrical coil winding supported by beryllium copper springs to generate electrical power from the relative movement of the stator within the coil winding. The device requires springs with very high radial stiffness to withstand unbalanced magnetic forces and very low axial stiffness for operating at low resonance frequency. Wang's device is apparently designed for fixed vibrational frequencies and for stationary deployments. The device has a nominally 50 Hz fixed resonant frequency and a nominally ±0.8 mm fixed displacement stroke to provide an optimum power output. In one disclosed embodiment the device provides 11 milliwatts of power at about 4.3 Volts. Since the disclosed device apparently relies on natural resonance to drive the device with negligible damping provided, it is unlikely that the disclosed device could function as a shock absorber or provide acceptable power generation capacity and efficiency at the variable bump and displacement frequencies anticipated with vehicles under normal driving conditions on typical road surfaces.

U.S. Pat. No. 3,559,027 to Arsem discloses two embodiments of a regenerative vehicle shock absorber for converting mechanical energy into usable electric energy. In one electromechanical embodiment, the vertical motion of a vehicle wheel is converted to rotary motion with a threaded screw which causes a permanent magnet rotor to be rotated within a coil stator to create an alternating current which is converted to direct current by a rectifier for charging a battery. In an alternative electromagnetic embodiment, vertical wheel motion is directly employed to produce vertical movement of an magnet armature within a coil stator. In this embodiment, the armature is comprised of three coaxial permanent magnets mounted on a post which moves vertically within corresponding circular coil stators comprised of wire-wrapped, concentric, ring-shaped, iron cores to produce alternating current for charging a battery. The disclosed embodiments additionally employ a concentric steel shell housing which surround the magnets and stators. In one disclosed embodiment, resistance may be introduced in a control circuit as desired to vary the stiffness of the shock absorber.

Arsem's device apparently suffers several design limitations which compromise its performance. By employing wire-wound, concentric iron cores in the stators and steel housings, it is anticipated that movement of the magnets within the coil windings and housing would generate significant circumferential eddy currents within the magnetically permeable iron cores and housing which would produce equal and opposing magnetic fields to that of the magnets. This is due to the well-known principle stated in Lenz' law, that the induced current in the iron core loop will always flow in a direction such that the magnetic field induced by the current in the loop opposes motion. Thus, the resultant opposing magnetic field of nearly equal magnitude induced in the iron stator cores and steel housing would substantially dampen any vertical or rotary motion of the magnet armature within the coil stator due to attractive forces between the permanent magnets and the induced magnetic fields in the iron stator cores and housing.

In addition, the volume occupied by the iron cores within Arsem's stators substantially reduces both the coil volume and magnetic flux density available to the actual stator coil winding further limiting coil output current and electric power generating capacity. Furthermore, according to Faraday's law, vertical displacement of the magnet armature within the coil stator, will induce a current flowing in a circumferential direction. Since, as shown in FIG. 4 of '027 to Arsem, the predominant portion of the stator coil windings are wrapped around the iron stator cores in a direction perpendicular to the circumferential direction of the induced current flow, most of the coil stator winding volume is wasted since the perpendicularly oriented winding generates essentially no induced circumferential current while substantially increasing coil resistance due to the excessive length of inactive winding, thereby creating undesirable electric power losses due to the substantial joule heating energy losses.

Mechanical, hydraulic and electromechanical devices for recovering energy from the mechanical displacement of vehicle suspensions are also known in the art. U.S. Pat. No. 3,861,487 to Gill discloses a mechanical device for converting vehicle vertical displacements to rotary motion for driving vehicle electrical components. The disclosed embodiments comprise variations of rack and pinion gears, pulleys, belts and drive shafts to convert reciprocating linear motion into rotary motion for driving alternators or generators to charge vehicle batteries.

U.S. Pat. No. 3,921,746 to Lewus discloses an auxiliary hydraulic power system for vehicles which converts vertical suspension motion to rotary motion for driving an electrical generator. A series of rack and pinion gears, levers, pistons, and pumps are employed, with hydraulic pumps, conduits and motors, for converting kinetic energy into electrical energy for operating auxiliary equipment. The disclosed device allegedly has sufficient inertia or mechanical resistance to suppress vertical movement and provide for shock absorption.

U.S. Pat. No. 3,981,204 to Starbard discloses a mechanical device for converting vertical reciprocating motion of a vehicle suspension to rotary motion for driving electrical alternators through a series of rack and pinion gears, pulleys, belts and drive shafts. The gears and belts allegedly provide sufficient drag to produce a shock absorbing effect.

U.S. Pat. No. 4,032,829 to Schenavar discloses a mechanical device which employs rack and pinion gears, drive shafts, springs, flywheels and clutches for transforming reciprocating vehicle axle motion to rotary motion for driving an electrical generator.

U.S. Pat. No. 4,387,781 to Ezell et al. disclose a mechanical device comprising a pair of opposing rotary electrical generators driven by a rack and pinion system of gears, shafts and springs for converted wasted vehicle kinetic energy from reciprocating vertical wheel movement into rotary movement for driving generators to produce useful electrical energy.

U.S. Pat. No. 5,036,934 to Nishina, et al. discloses a mechanical device comprising gears, shafts and levers for converting vertical vehicle axle movement into rotary motion for driving a magneto generator to produce electrical current to recharge a vehicle battery.

Conventional mechanical devices which attempt to convert suspension displacements from road vibrations and bumps into useful electrical energy suffer from a number of limitations. Mechanical devices which convert vertical motion into rotary motion for driving conventional generators or alternators typically employ a complex series of rack and pinion gears, levers, clutches, shafts, springs and drive belts which typically have a high weight and space penalty, high mechanical inertia, high displacement response threshold, slow displacement response time, large hysteresis due to requisite mechanical tolerances, and significant energy conversion losses due to heat generated from mechanical friction between components. Such conventional mechanical motion conversion devices are typically unresponsive to the high frequency, low amplitude bumps and vibrations which are a predominant source of road surface roughness and vertical wheel displacements under typical driving conditions. These mechanical devices generally require much larger vertical displacements at lower frequencies than are typically encountered in normal driving conditions. Thus, such devices would generally provide relatively low average power generation capability and efficiency under typical urban or highway driving conditions.

While electromagnetic devices which convert reciprocal linear motion into electrical energy, such as the devices disclosed in '827 to Merrit, et al., '877 to Tiemann, '186 and '132 to Konotchick and '027 to Arsem, do not suffer from the same limitations as conventional mechanical motion conversion devices, the power generating capacity, efficiency and energy conversion characteristics of such electromagnetic devices are critically dependent on proper magnet and coil configuration and orientation with respect to displacement motion. The performance of these prior art devices is generally compromised by non-optimized magnet and coil placement and magnetic pole orientations, excessive magnet-coil air gaps, underutilized coil volume, excessive coil resistance, unproductive coil winding orientation, a lack of overlap and combination of magnetic fields from multiple magnets for increased magnetic flux density, reduced magnetic flux density within the coil volume, a lack of accommodation for variable frequency operation to exploit realistic displacement frequencies and amplitudes, inadequate damping and poor matching of device current and voltage output to external electrical power requirements. Thus, conventional regenerative electromagnetic generator devices do not currently provide for efficient and viable power generation and damping for actual displacements and vibrations encountered under normal driving conditions on typical road surfaces.

Due to the limitations of current linear motion energy generator devices, it would be advantageous to provide an efficient, variable frequency, regenerative, linear electromagnetic generator with high power generating capacity and high energy conversion efficiency. Due to limitations in power generation capabilities and energy conversion efficiencies of conventional linear electromagnetic generator, electromagnetic generators which have a high power to weight and high power to volume ratio would be particularly useful in portable generator or regenerative electromagnetic vehicle shock absorber applications to justify the additional cost and weight penalty of such auxiliary power generating devices. For example, the linear electromagnetic generator devices disclosed in '186 and '132 to Konotchick exhibit peak power outputs ranging from 100 microwatts to 90 milliwatts at between 3 to 20 volts, a measured 2.7–4.8% energy conversion efficiency, and an apparent maximum power generating capacity of 1 to 1.54 watts per pound when the disclosed devices are subjected to vigorous displacement motion. It is unlikely that generator devices having such low power output, power generation capacity and energy conversion efficiency would be suitable for vehicle applications where estimates of road rolling resistance losses for typical passenger vehicles traveling between 40 mph and 60 mph on typical road surfaces range from about 3 kW to 10 kW, representing between 30 to 50% of the typical power and total energy delivered to vehicle power trains [see Efficient Use of Energy, Part I, A Physics Perspective, K. W. Ford, et al. (eds.), American Institute of Physics (New York 1975) p 99–121].

To achieve optimum vehicle fuel efficiency with auxiliary power generating devices which recuperate energy losses from parasitic displacement motion from road bumps and vibrations, it would be advantageous to develop innovative regenerative devices which exhibit high energy conversion efficiency and power generation capacity and supplement vehicle power requirements for vehicles traveling at normal speeds on typical road surfaces. Due to the potential power generation capabilities and energy conversion efficiencies of linear electromagnetic generator devices when compared to conventional mechanical linear motion conversion devices, regenerative electromagnetic shock absorbers whose electrical output characteristics are matched to vehicle power, damping and electrical load requirements for typical driving conditions are prime candidates for improving vehicle fuel efficiency. Devices which can operate at typical road bump frequencies, ranging from 1/10 to 1/100 $cm^{-1}$, and typical road bump amplitudes, ranging from 1 to 6 mm, and which satisfy vehicle electrical system requirements are particularly useful. In order to justify the additional cost and weight penalties for equipping vehicles with these auxiliary power generation devices, regenerative devices which are capable of generating peak power ranging between 2 to 20 kW, average power ranging from 1 to 6 kW, with a power generation capacity ranging between 10 to 100 watts per pound, with typical energy conversion efficiencies of at least 50% would be most advantageous. Additionally, a regenerative vehicle shock absorber which provides not only efficient energy recovery but also road shock and vibration damping are particularly desirable for satisfying the competing requirements of increased fuel efficiency and enhanced passenger comfort and safety.

SUMMARY OF THE INVENTION

The linear electromagnetic generator of the present invention uniquely provides for vector superposition of the magnetic field components from a plurality of magnetic fields for maximizing magnetic flux density and electrical power generation from relative motion of a an assembly of coil winding arrays and magnet arrays. The magnetic flux density, power generation capacity and energy conversion efficiency achieved with the innovative design of the present device are substantially higher than typically observed with prior art linear generator devices. The device of the present invention is uniquely suitable for applications as either as a linear motion generator, a reciprocating linear motor or a regenerative electromagnetic shock absorber where electromagnetic damping is exploited.

The generator device of the present invention comprises a unique assembly of magnet arrays, high magnetic permeability spacers and coil winding arrays with an innovative magnet-spacer-coil configuration and geometry which uniquely provides for vector superposition of the magnetic fields from a plurality of adjacent magnets to maximize radial magnetic flux density within coil windings for optimum power generation and energy conversion efficiency. Unlike conventional electromagnetic devices, as either a linear motion generator, a regenerative shock absorber, or a reciprocating linear motor, the device of the present invention provides for substantially more uniform and higher average radial magnetic flux density throughout coil winding volumes which results in a significant increase in electrical power regeneration due to more efficient generation of induced current from coil motion within regions of maximum radial magnetic flux density.

The device of the present invention provides for both efficient electrical power generation and electromagnetic damping due to the relative motion of a coil array assembly within a region of maximum average magnetic flux density produced by an associated magnet array assembly. While either the coil array or magnet array assembly of the present invention may alternatively have either a stationary or translatable mounting to provide for reciprocating relative linear motion, in preferred embodiments, a sliding coil assembly comprised of at least one array of concentric cylindrical coil windings reciprocates within a stationary magnet assembly comprised of a central array of stacked cylindrical magnets and high magnetic permeability, high saturation magnetization ferromagnetic spacers and an outer array of stacked concentric toroidal magnets and high permeability, high saturation magnetization ferromagnetic spacers.

Unlike conventional linear electromagnetic generator designs, which typically utilize the magnetic flux from single magnet magnetic poles and position coil elements within regions of diverging magnetic field lines and relatively low average magnetic flux density, the innovative design of the present invention uniquely provides for vector superposition of the magnetic fields from a plurality of neighboring magnets to produce maximum radial flux density in the coil windings and significantly reduces dispersion of magnetic fields in the magnetic pole regions by employing high permeability, high saturation magnetization ferromagnetic spacers between magnet layers to "bend" magnetic field lines and superposition the radial magnetic flux from adjacent magnets. To enable vector superposition of adjacent magnetic fields from neighboring magnets, the innovative design of the present device provides for stacking the central and outer magnets in layers such that, within each magnet stack, adjacent layers have like magnetic poles facing one another and, within each magnet layer, the central and outer magnets have opposing magnetic poles facing one another. This innovative configuration provides for the vector superposition of the magnetic fields of four neighboring magnets to produce maximum radial magnetic flux density within the coil windings positioned between the magnet stacks.

Due to the vector superposition of the radial flux density components from a plurality of magnetic fields provided by the present invention, a nearly four-fold increase in radial magnetic flux density is produced in coil windings compared to conventional electromagnetic generators which typically exploit magnetic flux density provided by only single magnet pole-single coil interactions. Since the maximum power output of such electromagnetic generators is proportional to the square of the average radial magnetic flux density within the coil volume, this nearly four-fold increase in radial magnetic flux density produced by the present invention generates a nearly sixteen-fold increase in electrical power compared to conventional electromagnetic generator devices.

In one preferred embodiment, the device of the present invention provides for an additional outer coil array which surrounds the outer magnet array and exploits the additional radial magnetic flux produced at the external perimeter of the outer magnet array. As with the inner coil assembly, the outer coil windings are positioned in regions of maximum radial magnetic flux density due to vector superposition of magnetic field components of the outer magnets and spacers.

Unlike many prior art electromagnetic generator devices, the innovative design of the present invention avoids undesirable power losses and damping due to parasitic eddy currents generated within ferromagnetic device housings and internal support structures from reciprocating magnets. In the present device, the reciprocating coil arrays are supported by high magnetic permeability, ferromagnetic cylindrical tubes with a plurality of longitudinal slots aligned axially around tube circumferences. This slotted tube configuration increases the conductor path length and therefore increases resistance to circumferential, parasitic eddy current flow in the tubes so as to minimize undesirable power losses and damping due to induced currents within the tubes.

The coil windings of the present invention may be connected in series, parallel or combinations of series and parallel configurations to match the voltage and current requirements of the vehicle battery or electrical system. In preferred embodiments, a voltage conditioning circuit is preferably employed with each generator assembly to convert time-varying coil voltage and current outputs to constant voltage for an electrical system or rechargeable battery.

As a regenerative electromagnetic shock absorber the present device converts parasitic road displacement motion and vibrations into useful electrical energy for powering vehicles and accessories and charging batteries. As a shock absorber, the present invention provides for controlled electromagnetic damping to match road impedance while maintaining high voltage, current and electrical power output over a broad range of typical road bump and vibration frequencies anticipated under normal driving conditions. Where ride safety and comfort control is desired, in preferred embodiments, controlled electromagnetic damping of road bumps and vibrations is provided by a damping circuit which monitors variation in coil output current or voltage and provides for manual or automatic variation in coil circuit load resistance to adjust damping to road conditions. Thus, the present device provides for an optimized balance between power generation and shock and vibration damping for both improved energy conversion efficiency and enhanced passenger ride comfort and safety. The device of the present invention may be used to replace conventional shock absorbers as vehicle retrofits or may be employed as supplemental devices which complement existing shock absorber systems.

One object of the present invention is to provide for a linear electromagnetic generator which employs stacked arrays of inner cylindrical and outer concentric magnets separated by high permeability, high saturation magnetization, ferromagnetic spacers that are configured to minimize magnetic field dispersion and maximize radial magnetic flux density by vector superposition of magnetic field components from adjacent magnets so as to produce a region of maximum average radial magnetic flux density near adjacent magnet poles.

Another object of the present invention is to provide for a linear electromagnetic generator with stacked central and outer concentric arrays of layered magnets wherein opposing magnets between stacks have opposite magnetic poles facing each other and adjacent magnets within stacks have like poles facing each other and vector superposition of magnetic fields from neighboring magnets and produce a plurality of region of maximum radial magnetic flux density between the magnet stacks.

Yet another object of the present invention is to provide for a linear electromagnetic generator where movable arrays of coil windings are positioned within regions of maximum average radial magnetic flux density formed by the vector superposition of the magnetic fields from a plurality of neighboring magnets.

One object of the present invention is to provide for a linear electromagnetic generator for converting wasted kinetic energy from linear displacement motion and vibrations into useful electrical energy.

Another object of the present invention is to provide for a linear electromagnetic generator having high energy conversion efficiency and high power generating capacity per unit weight and unit volume.

One other object of the present invention is to provide a regenerative electromagnetic shock absorber for converting parasitic linear displacement motion and vibration into useful electrical energy for recovering wasted kinetic energy or improving fuel efficiency.

Another object of the present invention is to provide a regenerative electromagnetic vehicle shock absorber which provides for both power generation and controlled damping of road bump displacements and vibrations for enhanced passenger comfort and safety.

As a linear electromagnetic generator, the device of the present invention may be utilized in any portable or stationary power generating application where recovery and generation of electrical power from parasitic repetitive linear motion is desired with an efficient and compact power source. The present device would be particularly useful in conversion and recovery of electrical energy from repetitive displacement motion, forces and vibrations from a variety of sources such as stationary or portable machinery, vehicles, boats, trains, aircraft, tidal currents and ocean wave motion.

As a regenerative electromagnetic shock absorber, the device of the present invention would be particularly useful for damping environmentally-induced displacements and vibrations in stationary structures such as buildings, towers and bridges and for converting vehicle displacement motion and vibrations into useful electrical energy for charging electric vehicle or hybrid vehicle batteries or powering vehicle accessories. By providing regenerated electrical power directly to major power consuming vehicle accessories, such as heaters, fans and compressors for air conditioners or power steering and power brakes in conventional fossil fuel vehicles, the present device would also reduce engine load and fuel consumption in conventional fossil fuel vehicles.

DEFINITIONS

Where the term "regenerative" is used herein is meant the recovery and conversion of kinetic and thermal energy from parasitic linear motion into useful electrical energy. Where the term "high energy conversion efficiency" is used herein is meant an energy conversion wherein at least 50% of wasted energy due to parasitic displacement motion is converted and recovered as useful electrical energy for an electrical load. Where the term "high radial magnetic flux density" is used herein is meant a radial magnetic flux density which is greater than the remanent magnetization of a magnet producing the radial magnetic flux. Where the term "high saturation magnetization" is used herein is meant a ferromagnetic material having a saturation flux density which is greater than the remanent magnetization of a corresponding magnet employed with such material. Where the term "high magnetic permeability" is used herein is meant a ferromagnetic material having a magnetic permeability of at least 2 at its saturation flux density.

BRIEF DESCRIPTION OF THE DRAWINGS

This invention is pointed out with particularity in the appended claims. Other features and benefits of the invention can be more clearly understood with reference to the specification and the accompanying drawings in which:

FIG. 5A shows typical magnetic field contour plots for two adjacent magnet layers and FIG. 5B shows typical magnetic flux density lines along the air gap between the central and outer magnets;

FIG. 11A shows a perspective view and FIG. 11B shows a cross section view of the coil windings and coil support;

FIG. 12A shows a perspective view and FIG. 12B shows a cross section view of the coil supports and coil windings;

DESCRIPTION OF THE PREFERRED EMBODIMENTS

A. Principle of Operation

1. Electromagnetic Power Generation

Figure 1A:
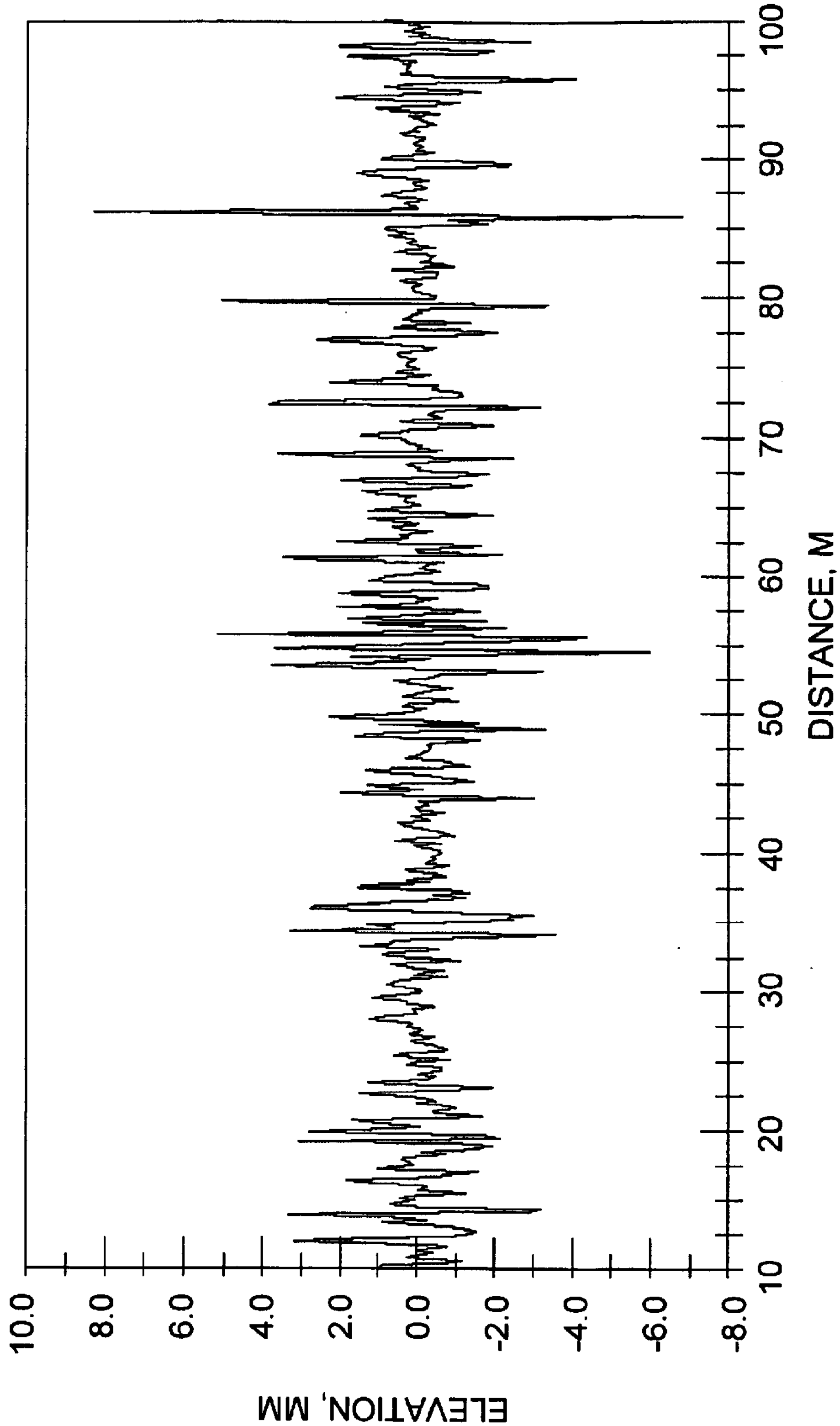
FIGS. 1A–1D show high pass filtered data taken from different portions of a selected road profile from Massachusetts.
Figure 1B:
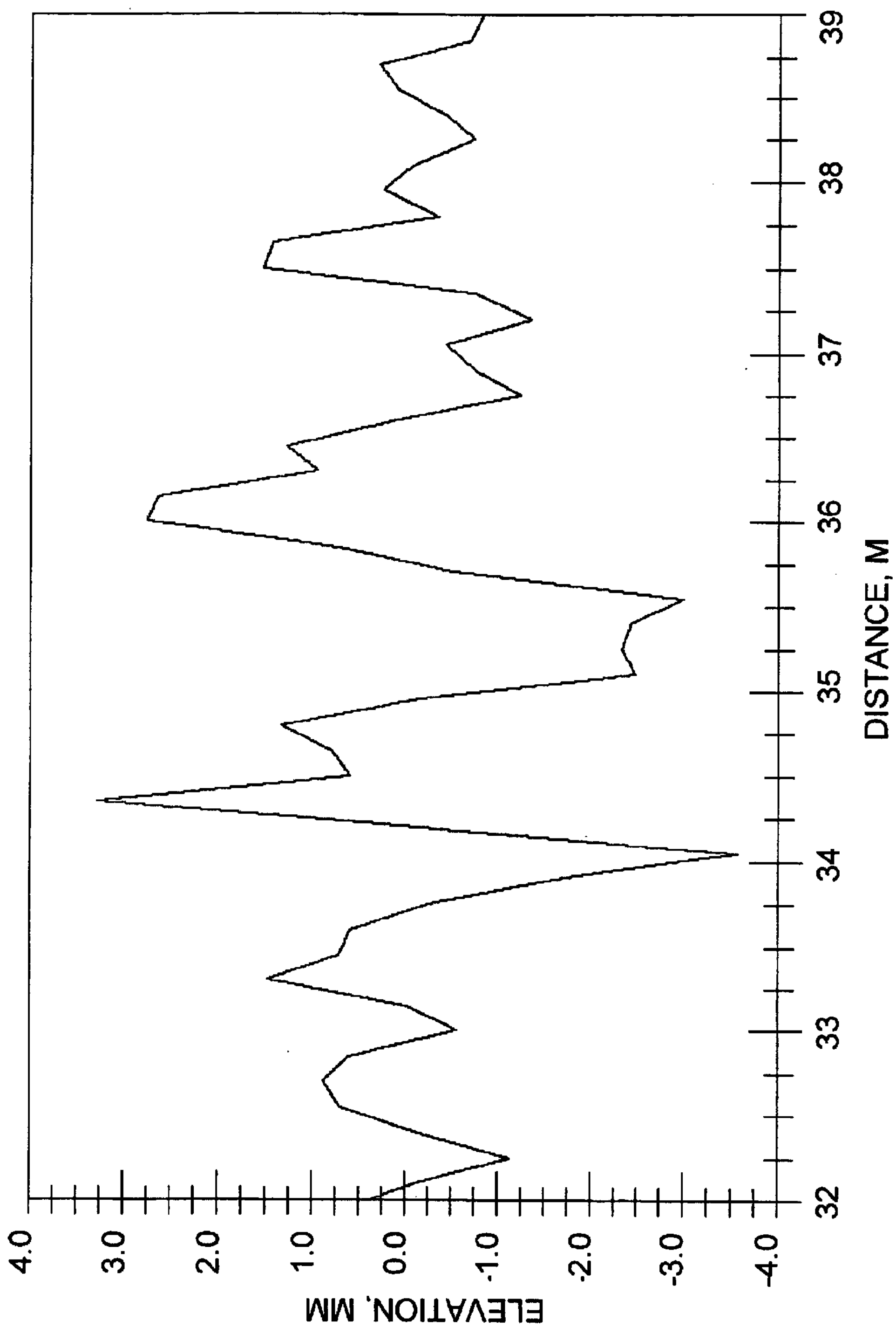
Figure 1C:
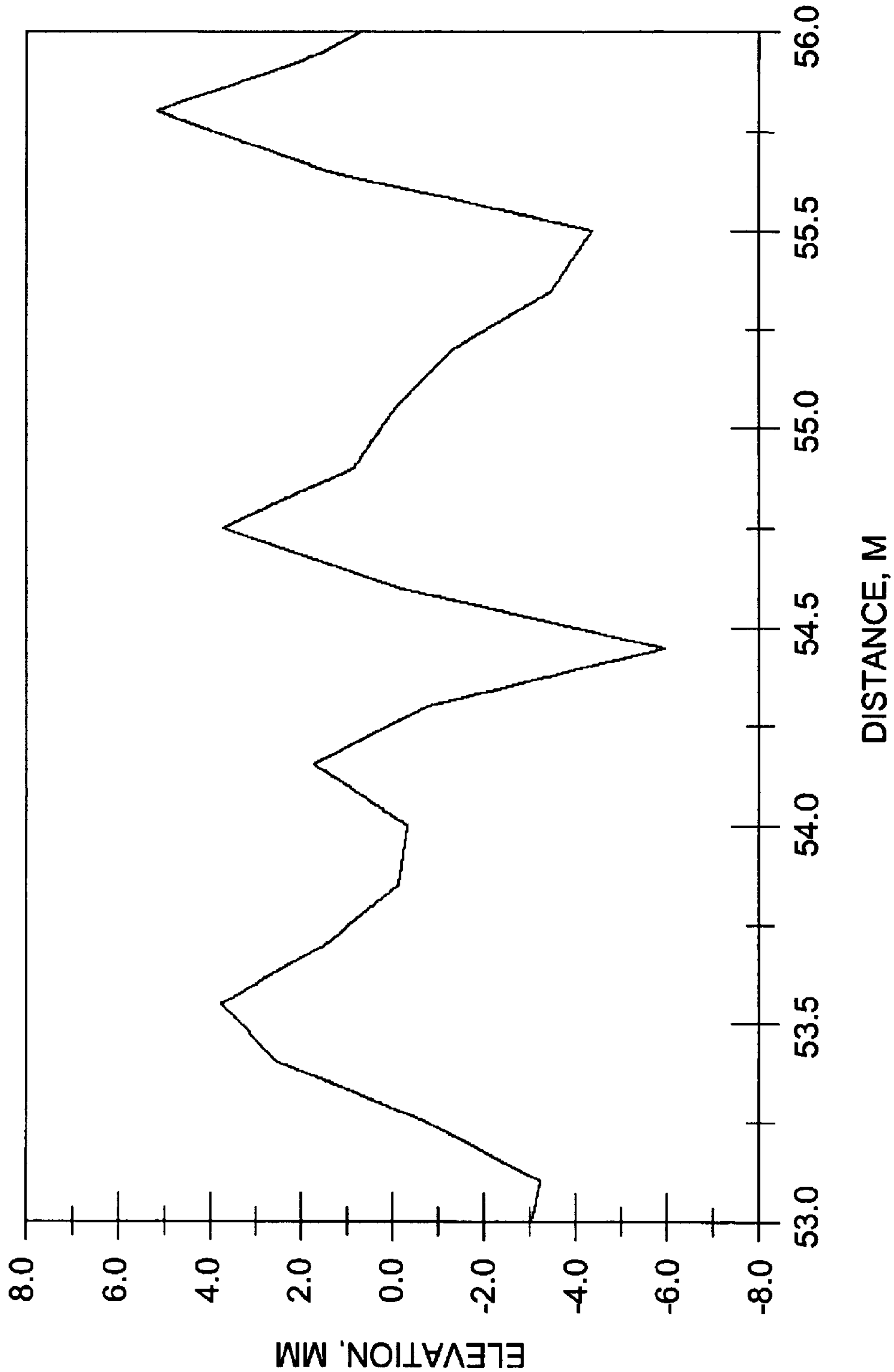
Figure 1D:
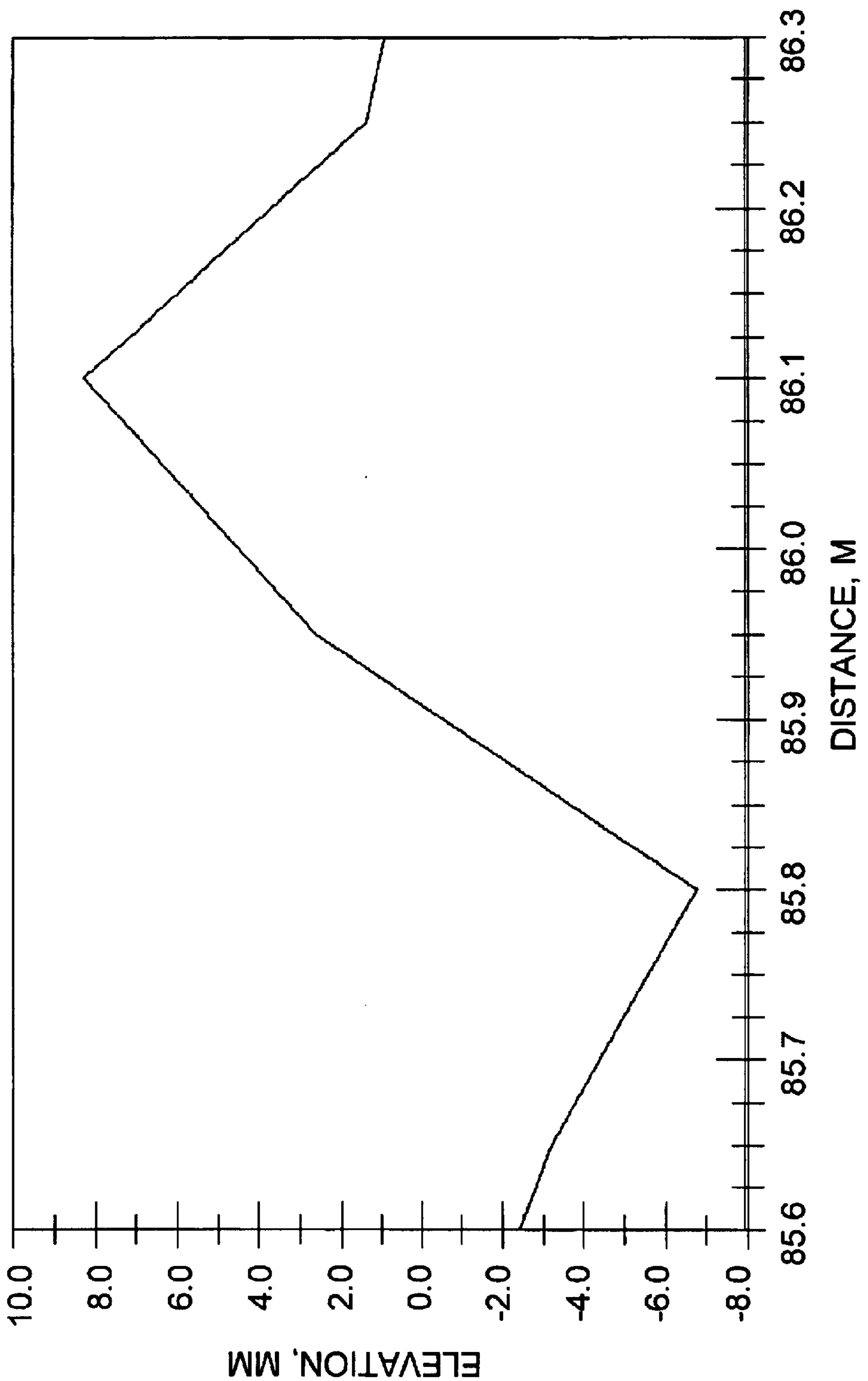
Figure 2A:
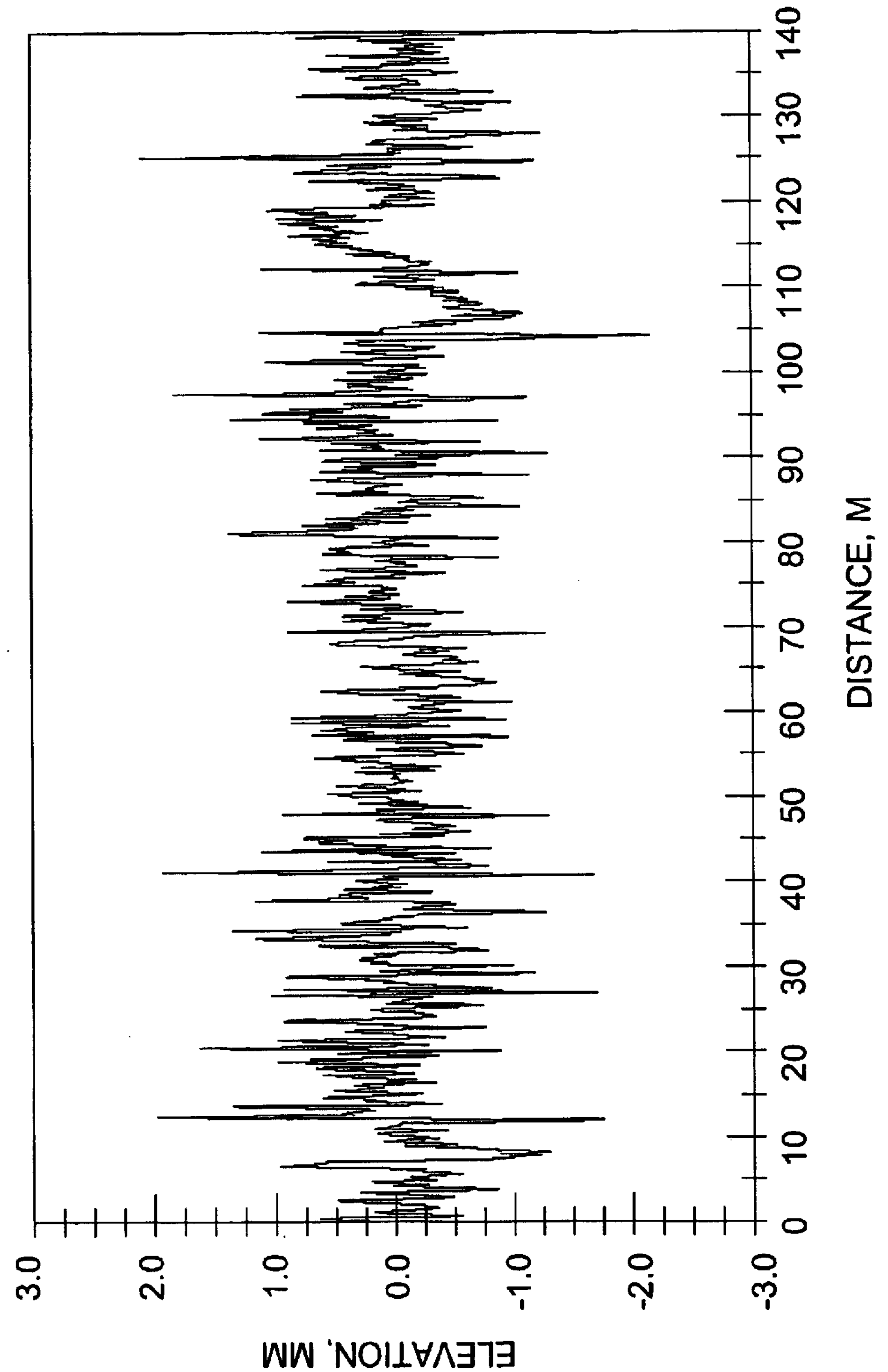
FIGS. 2A–2D show high pass filtered data taken from different portions of a selected road profile from California.
Figure 2B:
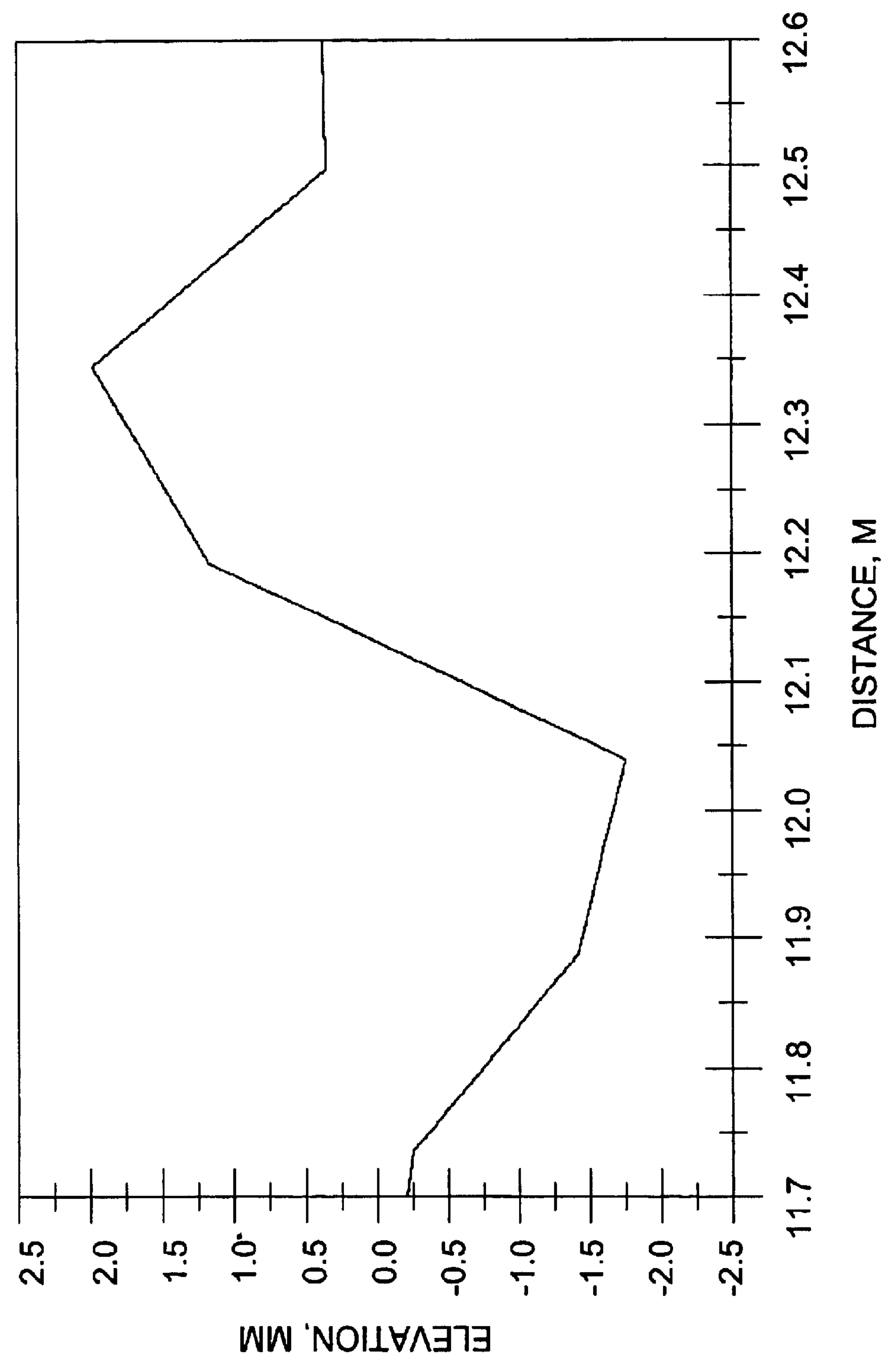
Figure 2C:
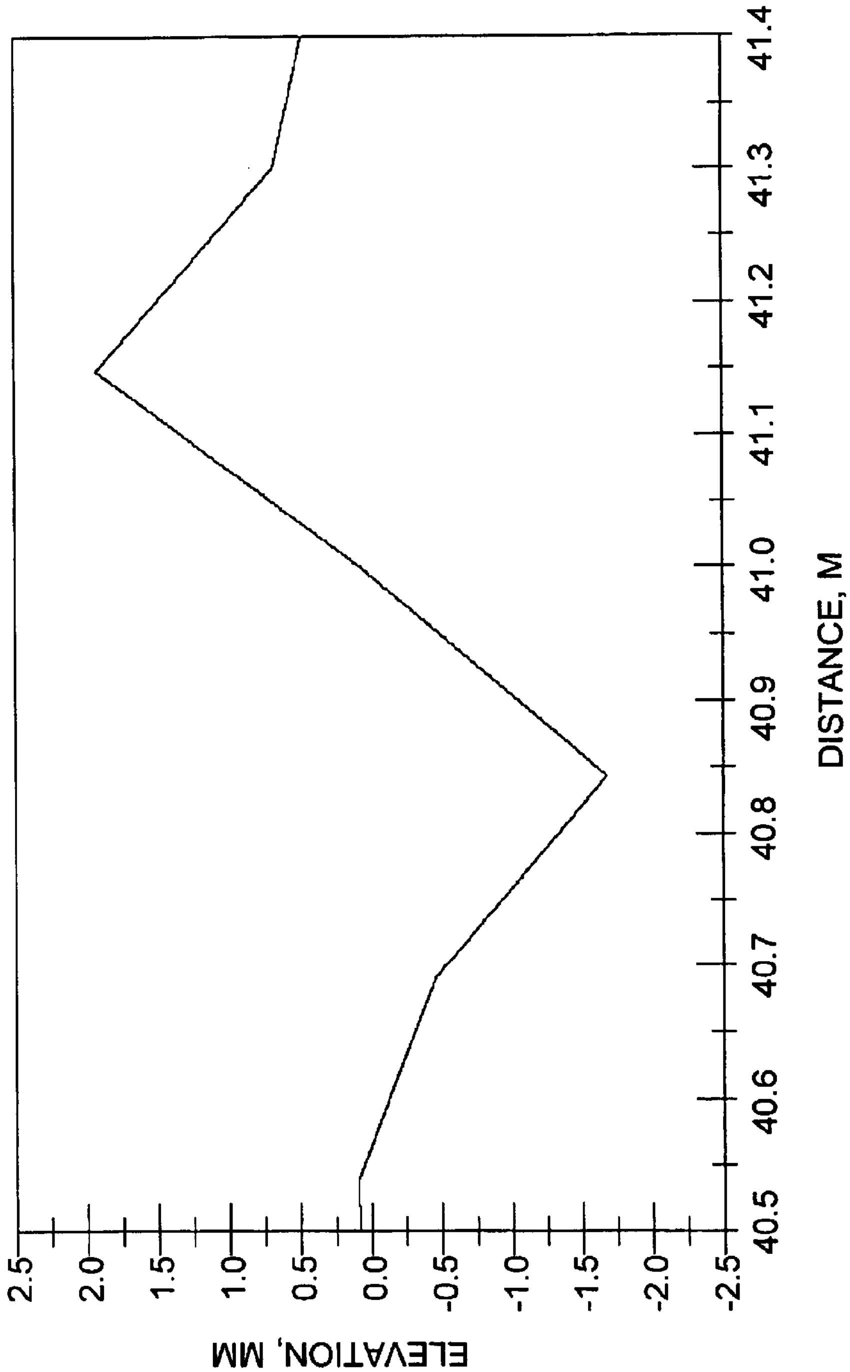
Figure 2D:
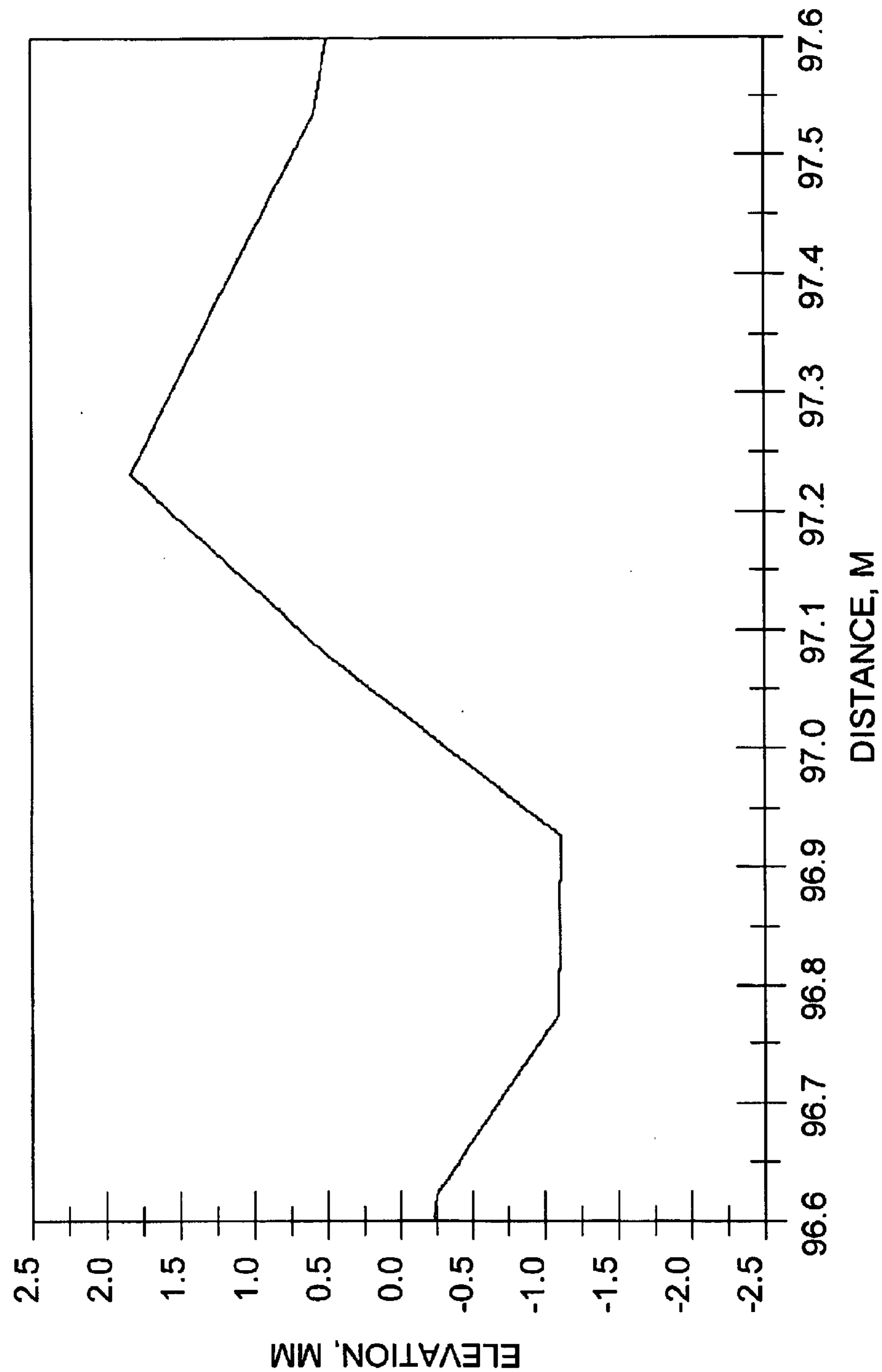

The power generating performance of a linear electromagnetic generator or regenerative electromagnetic shock absorber of the present invention is based upon the well known electromagnetic principle that an electric charge q moving through a magnetic field $\overline{B}$ experiences a Lorentz force $\overline{F}_L$ equal to the product of the cross product of the velocity vector $\overline{V}$ and magnetic field $\overline{B}$ and electric charge q $$\overline{F}_L = q\cdot(\overline{V}\times\overline{B})$$

and a corresponding Lorentz electric field $E_L$ equal to the product of the cross product of the velocity vector $\overline{V}$ and magnetic field $\overline{B}$ $$\overline{E}_L = \overline{V}\times\overline{B}$$

where $\overline{V}$ is the velocity vector of the charge, $\overline{B}$ is the magnetic field of a magnet and q is the charge in coulombs. This principle also applies to a coil of wire moving in a radial magnetic field.

Consider the example of a concentric cylindrical wire coil or tube, having an electrical conductivity σ, mass $m_{coil}$ and volume $V_{coil}$, moving along the axial or z direction of a central cylindrical magnet having an average radial magnetic flux density of $B_r$. The Lorentz electric field $E_{Lorenz}$ in a wire coil or tube moving with an velocity $v_z$ is in the circumferential or φ direction in cylindrical coordinates where $$E_{Lorentz} = E_\phi = v_z\cdot B_r$$

The induced electromotive force or coil voltage $V_e$ produced by coil movement within the magnetic field is obtained by integrating the Lorenz field $E_{Lorenz}$ over the coil winding length $$V_e = \int_0^L E_\varphi\cdot dL \approx B_r\cdot v_z\cdot L$$

where L is the coil winding length.

The corresponding eddy current density J in the φ or circumferential direction is given as $$J_\phi = \sigma\cdot E_{100}.$$

and the differential eddy current dI passing through a differential cross section area $dA_w$ of the coil winding is $$dI = J_\phi\cdot dA_w.$$

By integrating the differential eddy current dI over the coil winding cross section yields the induced eddy current I in the coil $$I \approx \sigma \cdot B_r \cdot v_z \cdot A_w$$

where $A_w$ is the cross-sectional area of the coil winding wire.

For each coil the peak or maximum instantaneous regenerated electrical power $P_{max}$ is given as $$p_{max} \equiv \frac{V_e I}{4} \approx \frac{\sigma \cdot (v_z \cdot B_r)^2 \cdot V_{coil})}{4}$$

where $V_{coil}$ the coil volume is the product of the coil winding length and cross section $L \cdot A_{wire}$.

For a wire coil of average diameter $d_c$ is moving with a vertical velocity $v_z$ relative to central axial magnet having an average radial magnetic flux density $B_r$ and the coil has $N_w$ turns of wire with electrical conductivity $\sigma$ and cross-sectional area $A_w$, then the induced electromotive force or open circuit voltage $V_e$ of the coil is $$V_e \approx \pi N_w \cdot d_c \cdot v_z \cdot B_r$$

and the induced short circuit current $I_0$ in the coil is $$I_0 = \frac{V_e}{R_c} \approx v_z \cdot B_r \cdot \sigma \cdot A_w$$

where the coil resistance $R_c$ is approximately $$R_c \approx \frac{N_w \cdot \pi \cdot d_c}{\sigma \cdot A_w}.$$

The peak or maximum open circuit voltage $V_e$ and short circuit current $I_0$ occur at the maximum displacement velocity $v_{max}$. The peak or maximum instantaneous coil power occurs for a matched load at the maximum displacement velocity $v_{max}$ where the load resistance $R_L$ equals the coil resistance $R_c$ $$P_{max} \equiv \frac{V_e \cdot I_0}{4} \approx \frac{(v_z \cdot B_r)^2 N_w \cdot \pi \cdot d_c \cdot A_w \cdot \sigma}{4} = \frac{(v_{max} \cdot B_r)^2 \cdot \sigma \cdot V_{coil}}{4}.$$

and where $V_{coil}$ is the coil volume, the product of the coil winding circumference $\pi \cdot d_c$ and cross-sectional area $A_w$.

The average coil power $P_{Avg}$ can be obtained by substituting the mean square vertical displacement velocity $\overline{v}_z^2$ for $v_z^2$ in the power expression. The mean square vertical displacement velocity $\overline{v}_z^2$ can be obtained from integrating the time average of $v_z^2$ expressed as $$\overline{v}_z^2 = \frac{\int_0^T v_z^2 \cdot dt}{\int_0^T dt}$$

where $v_z$ can be expressed as the product of an acceleration or deceleration a times time t and $v_z^2$ is given as $$v_z^2 = (a \cdot t)^2$$

For the short bump model discussed below, the displacement velocity $v_z$ decreases from a maximum velocity $v_{z=vmax}$ to $v_z=0$ when a wheel climbs up the first half of a bump, then the displacement velocity $v_z$ changes sign and decreases from $v_z=0$ to $v_z=-v_{max}$ while the wheel descends the second half of a bump. Based on this short bump model analysis, the acceleration a is simply $$a = \frac{v_{max}}{T}$$

where 2T is bump period in seconds. By substituting the acceleration a into the expression for the time dependence of $v_z^2$ and integrating, the mean square vertical displacement velocity $\overline{v}_z^2$ is given as $$\overline{v}_z^2 = \frac{1}{T} \cdot \left[\frac{v_{max}}{T}\right]^2 \cdot \frac{T^3}{3} = \frac{v_{max}^2}{3}.$$

and the average coil power is $$P_{avg} \approx \frac{(\overline{v}_z^2 \cdot B_r)^2 N_w \cdot \pi \cdot d_c \cdot A_w \cdot \sigma}{4} = \frac{(v_{max} \cdot B_r)^2 \cdot \sigma \cdot V_{coil}}{12} = \frac{P_{max}}{3}.$$

Similarly, for a matched load, the rms average coil voltage is given as $$V_{rms} \approx \frac{V_e}{2 \cdot \sqrt{3}}$$

and the rms average coil current is $$I_{rms} \approx \frac{I_0}{2 \cdot \sqrt{3}}.$$

For linear electromagnetic generators or regenerative electromagnetic shock absorbers which comprise of a plurality of coils, the maximum instantaneous power or average power produced by each generator or shock absorber may be obtained for a given displacement velocity by multiplying the above maximum instantaneous power $P_{max}$ or average power $P_{avg}$ for each coil by the total number of coils in each device. Using bump height and width measurements from actual road profile data to calculate vertical displacement velocities, bump frequencies and bump periods anticipated under normal driving conditions, the peak and average coil voltage, current and power generation capacity as well as the energy conversion efficiency for regenerative electromagnetic shock absorbers of the present invention can be readily determined.

As indicated by the above equations, to maximize generated power $P_{max}$ for a given displacement velocity $v_z$, it is necessary to minimize coil resistance and maximize both the average radial magnetic flux density $B_r$ in the coil as well as the coil volume $V_{coil}$ positioned within the region of maximum average radial magnetic flux density $B_r$. This is accomplished through the innovative design of the present invention which uniquely provides for maximizing magnetic flux density in the coil volume through a unique configuration of magnets, high permeability, high saturation magnetization spacers and coils which uniquely provide for vector superposition of the magnetic fields from a plurality of neighboring magnets and maximizing the coil volume exposed to a region of maximum magnetic flux density produced by the superposition of the magnetic fields.

2. Electromagnetic Damping

Electromagnetic damping arises from induced eddy currents in a resistance-loaded, conducting coil or cylinder where the cylindrical conductor surrounds a central cylindrical magnet and the conductor or magnet move relative to each other in response to an applied external force $F_o$. Due to eddy current damping, movement of a current carrying coil in a magnetic field is opposed by damping forces due to the interaction of the permanent magnet and induced magnetic field in the coil. With the device of the present invention, the relative movement of the coil array assembly, or alternatively the magnet array assembly, is opposed by both inertial forces $F_i$ due to the assembly mass and damping forces $F_d$ due to interaction of the permanent magnets with the induced magnetic fields caused by eddy current flow in the coil windings. The resultant damping force $F_d$ is proportional to the induced eddy current I which is inversely proportional to the combined circuit resistance of the coil $R_{coil}$ and load $R_{load}$. Model equations which apply to eddy current damping forces $F_d$ and inertial $F_i$ forces are provided below where $F_o$ represents an external applied force, for example a gravity force due to vertical displacement motion such as a road bump or pothole encountered in a road surface.

Electromagnetic damping forces $F_d$ may be evaluated from a force balance where $F_0$ represents and applied external force, such as a vertical gravity force, acting on the coil assembly, $F_I$ represents inertial force due to the coil assembly mass and $F_d$ is the damping force acting on the coil due to induced eddy currents. In vector notation $$\bar{F}_o=\bar{F}_i+\bar{F}_d$$

where the inertial force is given as $$\bar{F}_i = m\frac{d\bar{v}}{dt},$$

and the damping force is $$\bar{F}_d=\gamma\cdot\bar{v}$$

and where $\gamma$ is a damping constant.

The damping force is $F_d$ obtained by integrating the cross product of the eddy current density and magnetic flux density vectors over the coil volume $V_{coil}$ $$\bar{F}_d=\int\int\int_{Coil\ Volume}(\bar{J}\times\bar{B})d(V_{coil})$$

The magnitude of the differential damping force $dF_d$ acting in the axial or z direction due to eddy current density $J_{100}$ from eddy current flow in the $\phi$ or circumferential direction of a differential coil volume element $d(V_{coil})$ in a magnetic field having a radial magnetic flux density $B_r$ is $$|dF_d|=B_r\cdot J_\phi\cdot dA\cdot dL=\sigma\cdot v_z\cdot B_r^2\cdot d(V_{coil}).$$

Integrating the differential damping force $dF_d$ over the coil volume $V_{coil}$, the damping force $F_d$ acting on the coil is determined as $$F_d\approx\sigma\cdot v_z\cdot B_r^2\cdot V_{coil}\equiv\gamma\cdot v_z$$

where $\sigma\cdot B_r\cdot V_{coil}$ is defined as the damping constant $\gamma$ and the coil volume $V_{coil}$ is $$V_{coil}=L\cdot A_{wire}\approx\pi(r_o^2-r_i^2)\cdot h$$

where $r_o$ is the coil outer radius, $r_i$ is the coil inner radius and h is the coil height. Assuming an external applied acceleration force $F_0$ on the coil mass caused by a vertical displacement such as a road bump, the force balance yields $$F_0 = F_i + F_d = m_{coil}\left(\frac{dv_z}{dt}\right) + \gamma v_z = m_{coil}\cdot a.$$

Rewriting this equation yields $$\frac{dv_z}{dt} + \left(\frac{\gamma}{m_{coil}}\right)\cdot v_z = a.$$

Assuming an initial velocity of $v_z=0$, defining $\gamma/m_{coil}$ as a damping time constant $\tau$, and solving for the terminal damping velocity $v_z=v_T$ yields $$v_z = v_T \equiv a\cdot\tau\left(1-e^{-\frac{t}{\tau}}\right).$$

This equation provides a reasonably accurate measure of device damping behavior and performance. Generally, the acceleration a is approximately equal to 9.8 m/s, the gravitation constant g. It is interesting to note that the terminal damping velocity $v_T$ is approached fairly quickly where the vertical velocity $v_z$ is approximately 0.99 $v_T$ at $t=5\tau$.

The validity of the above equations for predicting electromagnetic damping performance has been verified experimentally for eddy current damping by measuring the transit time for a dropped cylindrical permanent magnet to travel through a one meter length of conductive pipe. For either electromagnetic linear generator or regenerative electromagnetic shock absorber applications, these equations provide reasonably accurate estimates of the damping time constant $\tau$ and terminal damping velocity $v_T$ as well as the damping force $F_d$ when the linear displacement velocity $v_z$ is either determined from actual displacement measurements for linear generator applications or from actual road profile data for shock absorber applications.

As shown by the equations provided above, electrical power generation, energy conversion efficiency and electromagnetic damping performance estimates may be advantageously employed for evaluating and adapting various coil and magnet configurations and device embodiments for specific applications as a linear electromagnetic generator or regenerative electromagnetic shock absorber.

3. Road Profile Data Modeling a. Road Profile Data

For acceptable technical performance, functionality and viability, a regenerative shock absorber must have the capacity to operate at actual road bump and vibration frequencies, vertical displacements, and vertical displacement velocities encountered under typical vehicle driving conditions. An apparent shortcoming of many prior art devices is the general lack of consideration given to actual road surface conditions and the effect of road roughness, bump displacement magnitude, bump shape, and bump duty cycle or vibration frequency, on device operation and performance. Since any regenerative vehicle shock absorber device must be able to generate useful power with typical road surfaces encountered under normal driving conditions, a shock absorber design which provides for maximum power generation under typical road conditions with actual road surface profiles is critical to viability of the regenerative electromagnetic shock absorber concept and performance.

U.S. road profiling data measurements and compilations for all states has been sponsored by the U.S. National Highway Institute and the Federal Highway Administration. A compilation of road profile measurement data has been published by the University of Michigan Transportation Research Institute [see M. W. Sayers and S. M. Karamihas, *The Little Book of Profiling*, Univ. Michigan Transportation Research Inst. (Ann Arbor, Mich., 1996)]. These road profiles are typically taken from test pavements where wear performance of new pavement materials is evaluated. Since these pavements are relatively new experimental pavement sections, it is unlikely that the road profile measurements taken from these sections are representative of the surface roughness of typical roads which have considerable traffic and environmental exposure which produce accelerated wear. While it is difficult to determine from published measurement studies just how representative such road profile data are of average road conditions within any given state, a random sampling of published road profile data suggests that a significant number of U.S. roads exhibit typical peak bump heights in the range of 1 to 6 mm and typical peak to peak bump baselengths in the range of 10 to 100 cm equivalent to spatial frequencies between 1/10 and 1/100 $cm^{-1}$. Since the profile data represent experimental road surfaces with above average smoothness, it is anticipated that actual road surfaces may have much rougher road surfaces with even higher bump heights.

In considering the influence of road roughness profiles on typical vehicle suspension displacements produced under normal driving condition, it is necessary to consider only those road bumps to which the vehicle wheel responds. Typical passenger vehicle wheels will bridge most bumps having very high spatial frequencies or short baseline widths which are similar in size to the road contact length of a typical tire. Thus, in considering published road profile date, it is necessary to employ high pass filtering of available data to provide profile data of bumps which are available and capable of producing a vertical displacement in a typical wheel under normal driving conditions.

Typical examples of high pass filtered road profile data for a relatively rough Massachusetts road surface are shown if FIGS. 1A–1D. FIGS. 2A–2D show typical filtered profile data for a relatively smooth California road surface. These data sets were high pass filtered using a peak to peak bump baselength of 20 cm. Based on sample filtered road profile measurements made on select road surfaces in California, New York, New Jersey, Massachusetts and Washington, D.C., road bump height distributions on typical roads fall within a ±5 mm range with baselengths of 10 to 100 cm, corresponding to spatial frequencies between 1/10 to 1/100 $cm^{-1}$. For such road surfaces, it is anticipated that typical passenger vehicles, with 24 to 30 inch wheel diameters and traveling at speeds of 25 to 65 mph, would require a regenerative shock absorber capable of operating at displacement frequencies between 50 Hz to 1.7 kHz. Thus, a regenerative shock absorber must be appropriately designed to operate over a limited range of short displacements and moderate displacement frequencies for converting anticipated road displacements and vibrations into useful electrical power.

b. Bump Modeling

As noted above, the electrical power generated by a linear electromagnetic generator device is proportional to the square of the displacement velocity $v_z$. For regenerative shock absorber applications, the vertical displacement velocity $v_z$ is a function of both road surface conditions and horizontal vehicle velocity $v_x$. Under normal driving conditions on typical road surfaces, $v_z$ has a relatively narrow operating range and a regenerative electromagnetic shock absorber design must accommodate both anticipated vertical displacement velocities and displacement amplitudes to achieve acceptable performance. It us worth noting that, in certain embodiments where low frequency-high amplitude displacements are anticipated, a mechanical transmission may be employed to convert low $v_z$/large displacement motion to high $v_z$/short displacement motion to accommodate specific generator device configurations.

Figure 3:
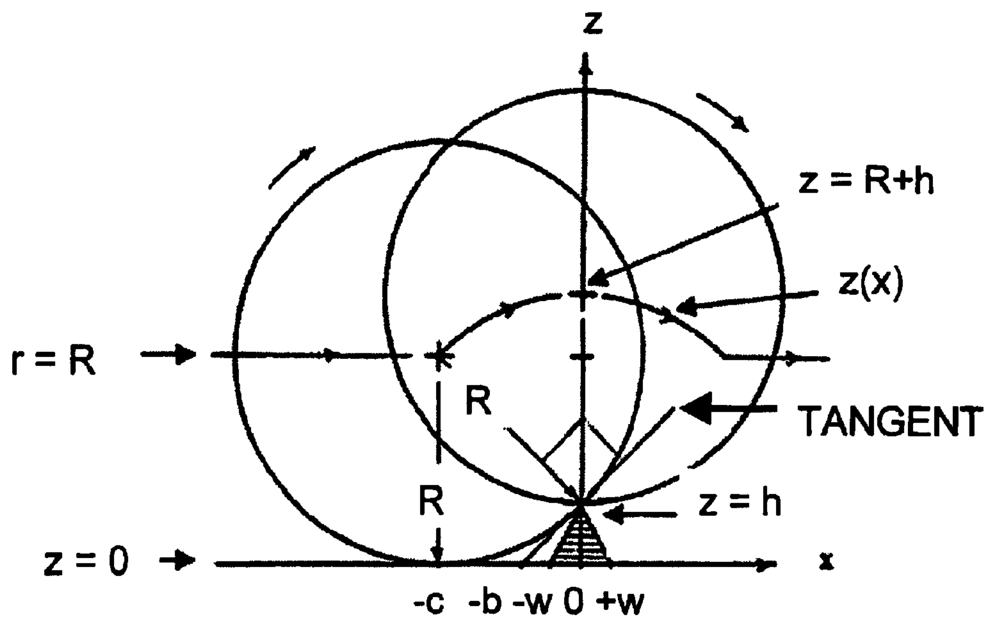
FIG. 3 is a schematic diagram of the model geometry for an idealized road bump-wheel interaction used in road bump modeling.

For determining the vertical velocity $v_z$ of a vehicle wheel travelling over an idealized bump, FIG. 3 provides a geometric schematic of a model wheel of radius R rotating clockwise and traveling in a horizontal direction while riding over an idealized model bump shape consisting of an isosceles triangle of height h and base 2w. The vertical position due to wheel displacement by the bump at position x is represented as z(x) where the horizontal position x is measured relative to the center of the bump base (x=0). For illustration purposes, FIG. 3 shows two wheel positions at x=−c and x=0. For estimating vertical displacement due to road bumps, two different bump geometries, short bumps and long bumps, are considered for determining the vertical displacement velocity $v_z$ of a vehicle wheel.

1. Short Bump Model

The short bump model applies where the wheel first touches the bump apex before climbing the bump approach surface. As shown in FIG. 3, this occurs when the wheel tangent line at the bump apex contact point intersects the road at x=−b where |b|>|w|.

For h<<R, it can be shown trigonometrically that $$b \approx \left(\frac{h \cdot R}{2}\right)^{1/2}$$

and $$c \approx (2R \cdot h)^{1/2}.$$

Thus, the ratio of the incremental vertical displacement and horizontal displacement is given as $$\frac{dz}{dx} = -\frac{x}{x-h} = -\frac{x}{(R^2 - x^2)^{1/2}}.$$

For x<<R, this can be approximated as $$\frac{dz}{dx} \approx -\frac{x}{R}.$$

Thus, for x<−c, the vertical displacement velocity $v_z=0$. At x=−c, the vertical velocity jumps to $v_z=v_{max}=(c/R)v_x$ and then decreases linearly to $v_z=0$ at x=0. As x increases from x=0 to x=+c, the vertical displacement changes direction, the vertical velocity changes sign, and the velocity magnitude increases linearly to $v_z=-v_{max}=|-(c/R) \cdot v_x|$. At x>+c, the vertical velocity again returns to $v_z=0$. Thus, for a short bump cycle having a period equal to 2T seconds, the vertical displacement velocity may be expressed as $$v_z = a \cdot t$$

where the acceleration or deceleration a is given as $$a = \frac{v_{max}}{T}.$$

2. Long Bump Model

The long bump model applies where the wheel first climbs the bump approach surface prior to touching the bump apex. This occurs when the wheel tangent line at the bump apex contact point intersects the road at x=−b where |b|<|w|. It can be shown trigonometrically for long bumps, where h<<R, that $$\frac{dz}{dx} \approx \frac{h}{w}.$$

Thus, for x<−c, the vertical displacement velocity $v_z$=0. At x=−c, the vertical velocity jumps to $v_z$=(h/w)$v_x$ and then decreases linearly to $v_z$=0 at x=0. As x increases from x=0 to x=+c, the vertical displacement changes direction and vertical velocity changes sign and the velocity magnitude increases linearly to $v_z=|-(h/w)\cdot v_x|$. At x>+c, the vertical velocity again returns to $v_z$=0.

While the change in sign of the vertical velocity $v_z$ with either model causes a change in voltage polarity and current flow direction, only the rapid rise and magnitude of the vertical velocity $v_z$ is important for power generation. It is important to note that, if the spatial frequency of the road bumps is too high, the vehicle wheel will bridge neighboring bumps resulting in a reduction in vertical displacement z(x) and vertical velocity $v_z$. This occurs when the distance between successive bumps or the bump baselength is less than 2c. If the spatial frequency of the road bumps is too low, such as with infrequent bumps or smooth undulating roads, this will lead to reduced power generation due to a lower effective duty cycle for the regenerative shock absorber. This occurs when the distance between successive bumps or the bump baselength is much greater than 2c.

By considering high pass filtered road profile data as representing anticipated wheel axle displacements under normal driving conditions, vertical displacements at any given vehicle speed can be approximated from road profile data bump slopes where the bump slope $m_b$ is approximated as the incremental vertical bump height divided by the incremental horizontal bump width $$m_b = \frac{dz}{dx}$$

and the vertical displacement is approximated as the bump width times the bump slope $$z(x) \approx \frac{dz}{dx} \cdot x = m_b \cdot x.$$

When this equation is combined with the derivation obtained above for the short bump model the bump slope is given as $$m_b = \frac{dz}{dx} = \frac{v_z}{v_x}.$$

Thus, both the vertical displacement z(x) and vertical displacement velocity $v_z$ due to road surface roughness for a vehicle traveling at a horizontal speed $v_x$ may be approximated from bump slopes $m_b$ estimates obtained from actual road profile measurement data where $$V_z \approx m_b \cdot v_x.$$

By combining vertical displacement velocity values $v_z$ derived from actual bump slopes $m_b$ obtained from published road profile data with calculations of average radial magnetic flux densities $B_r$ obtained for specific magnet-coil configurations using the finite element analysis methods described below, the induced electromotive force $V_e$, the induced short circuit current $I_0$, and the maximum instantaneous electrical power $P_{max}$ generated in each coil winding element may be readily determined. The maximum instantaneous electrical power for each shock absorber can then be determined from the total number of coils within each shock absorber and the total electrical power generating capacity for a vehicle can be obtained from the total number of shock absorbers used in a given vehicle suspension system.

B. Finite Element Analysis For Optimized Device Design

1. Radial Magnetic Flux Density and Coil Power

As shown above, the power generated by each coil in the linear electromagnetic generator of the present invention is proportional to the square of the average radial magnetic flux density $B_r$ within the coil volume multiplied by the coil volume $V_{coil}$ or $$P_{coil} \propto B_r^2 \cdot V_{coil}.$$

The average radial component of the magnetic flux density $B_r$ within the coil volume is dependent on remanent magnetic flux $B_{rem}$, magnet size and shape, magnetic pole orientation, coil volume, coil location and coil orientation within the magnetic field. While power generation may be increased by employing larger coil volumes and larger magnets with higher radial magnetic flux, this approach is generally undesirable for vehicle applications where it is preferable to minimize any additional weight and volume penalties for auxiliary power generating devices. In order to determine preferred magnet and coil configurations for optimizing device power generation capacity per unit weight, finite element modeling and analysis was employed.

Radial magnetic flux densities were calculated for a variety of magnet and coil configurations using a 2-D model with a commercial finite element analysis program suite, "Mesh", "Permag", and "Perview" available from Field Precision (Albuquerque, N. Mex.). These programs include lookup tables of known handbook property values for many common magnetic and ferromagnetic materials. For model calculations neodymium-iron-boron magnets and soft iron spacers were assumed. The remanent magnetization $B_{rem}$ for the NdFeB magnets was assumed to be 1.5 Tesla with the magnet coercive field $H_c$ assumed equal to the remanent magnetization $B_{rem}$ due to the hysteresis loop behavior for these magnets. Based on the magnetic flux density calculated for each node, the program automatically supplied magnetic permeability values from lookup tables of permeability as a function of magnetic flux for the soft iron spacers.

Magnetic flux density profiles were calculated for an idealized cylindrical magnet-coil assembly comprised of a central magnet array, a concentric outer toroidal magnet array, an inner coil array positioned between the central and outer magnet arrays, and an optional outer coil array surrounding the outer magnet array. The inner and outer magnet layers were separated by high permeability spacers to limit dispersion of magnetic fields at the magnet pole regions and enhance radial magnetic flux density in the coil winding regions. Due to the preferred axial symmetry of the present invention, a two-dimensional model was employed with the modeled device consisting of two magnet array layers and three coil array layers for calculating magnetic flux density profiles for the magnets. These model device calculations were applied to larger devices by using the average radial magnetic flux densities calculated for each axially-symmetric inner and outer magnet-coil pairing in the model device and extending this to multiple layers of axially-symmetric magnet-coil parings in more complex devices representing preferred generator embodiments. The finite element calculation results for average radial magnetic flux densities were then combined with linear displacement velocity estimates obtained from actual road profile measurements to calculate coil output voltage and current and total electrical power generating capacity for more complex, multi-layered devices which employer a greater number of magnets and coil windings.

Figure 4:
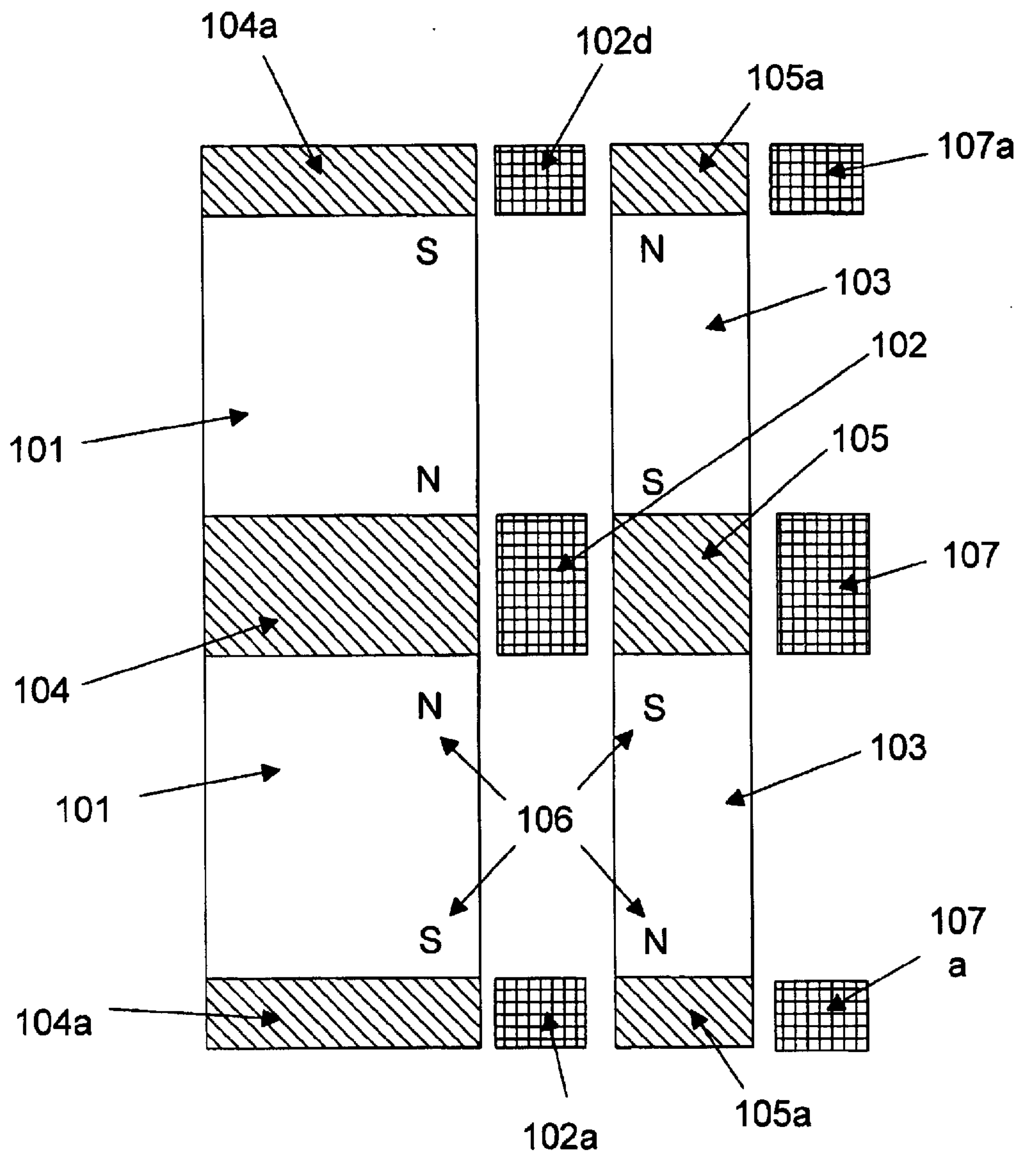
FIG. 4 is a schematic cross section of the magnet-spacer-coil configurations and magnetic pole orientations of the present invention.

FIG. 4 provides a schematic half cross section of a model magnet-coil geometry used for finite modeling analysis of the present invention. As shown schematically in the figure, the device is comprised of an array of stacked cylindrical central magnets 101 which are separated by high magnetic permeability, high saturation magnetization, central cylindrical-shaped spacers 104, an array of stacked concentric toroidal magnets 103 which are separated by high permeability, high saturation magnetization inner concentric toroidal-shaped spacers 105, and half-height, high permeability, high saturation magnetization spacers 104*a*, 105*a* at each end of both the central magnet stack 101 and concentric magnet stack 103. For modeling purposes, L is the height of individual magnets 101, 103, Z is the total height of the magnet-spacer array stack, $R_1$ is the outer radius of the central magnets 101, $R_2$ is the inner radius of the outer concentric toroidal magnets 103, $R_3$ is the outer radius of the outer concentric toroidal magnets 103, G is the width of the air gap space between the inner magnets 101 and outer magnets 103 where G is approximately the difference between $R_2$ and $R_1$, and H is the height of the spacers 104, 105. As shown in FIG. 4, inner concentric coil windings 102 are positioned in the air gap adjacent to the spacers 104 and magnet pole regions 106. In one optional preferred embodiment, an additional array of concentric outer coils 107, 107*a* is employed beyond the concentric magnet array 103 to exploit the magnetic flux at the external perimeter of the toroidal magnets 103.

In preferred embodiments, like magnetic poles 106 of adjacent magnet layers within each magnet stack 101, 103 are facing and opposite magnetic poles 106 in each magnet layer of the central magnet stack 101 and concentric magnet stack 103 are facing. In one embodiment, the height of the inner coils 102 is equal to H, the height of spacers 104, 105. For both computational symmetry and to maintain uniform radial flux density throughout the inner and outer coil arrays, in a preferred embodiment, half height spacers 104*a*, 105*a* and half-height inner and outer coils 102*a*, 107*a* of height H/2 are employed at each end of the center and concentric magnet array stacks 101, 103. In one preferred embodiment, the height of the inner and outer coils 102, 107 is 1.5 H and the height of the end coils 102*a*, 107*a* is 0.75 H, where H is the spacer height 104, 105 In another preferred embodiment, the height of the inner and outer coils 102, 107 is at least 1.5 H and no greater than L/2 and the height of the end coils 102*a*, 107*a* is at least 0.75 H and no greater than L/4, where H is the spacer height 104, 105 and L is the magnet height 101, 103. In order to provide for uniform high radial magnetic flux density, in preferred embodiments, the cross-sectional width ($R_3-R_2$) of the outer toroidal magnets 103 is substantially equal to or greater than the radius ($R_1$) of the central magnets 101 (i.e. $R_1 \leqq R_3-R_2$). Due to the symmetrical configuration of the inner and outer magnet-spacer-coil assemblies, finite element analysis calculations are simplified and extrapolation of calculations for stacked layers of repeating magnet-coil pairs is facilitated.

With reference to the idealized model geometry shown in FIG. 4, assuming an example embodiment where the coil heights 102 (102*a*), 107 (107*a*) are equal to their corresponding spacer heights 104 (104*a*), 105 (105*a*), the magnet volume, coil volume and total volume are given as $$V_{mag}=Z\pi(R_3^2-R_2^2+R_1^2)$$

$$V_{coil}\approx H\pi(R_2^2-R_1^2)$$

$$V_{tot}\approx H\pi(R_2^2-R_1^2)+Z\pi(R_3^2-R_2^2+R_1^2).$$

Magnet weight and coil weight are calculated from the respective volumes and densities for given magnet, spacer and coil materials which were assumed, in one preferred embodiment, to be NdFeB magnets, square copper wire windings and pure iron spacers. For each finite element calculation, component dimensions and material parameters, such as the magnet properties, spacer permeability, and coil conductivity were input into the program. Due to the cylindrical geometry and radial symmetry of the model device, 2-D plots of radial magnetic flux density lines were generated for half cross sections of the entire assembly.

Figure 5A:
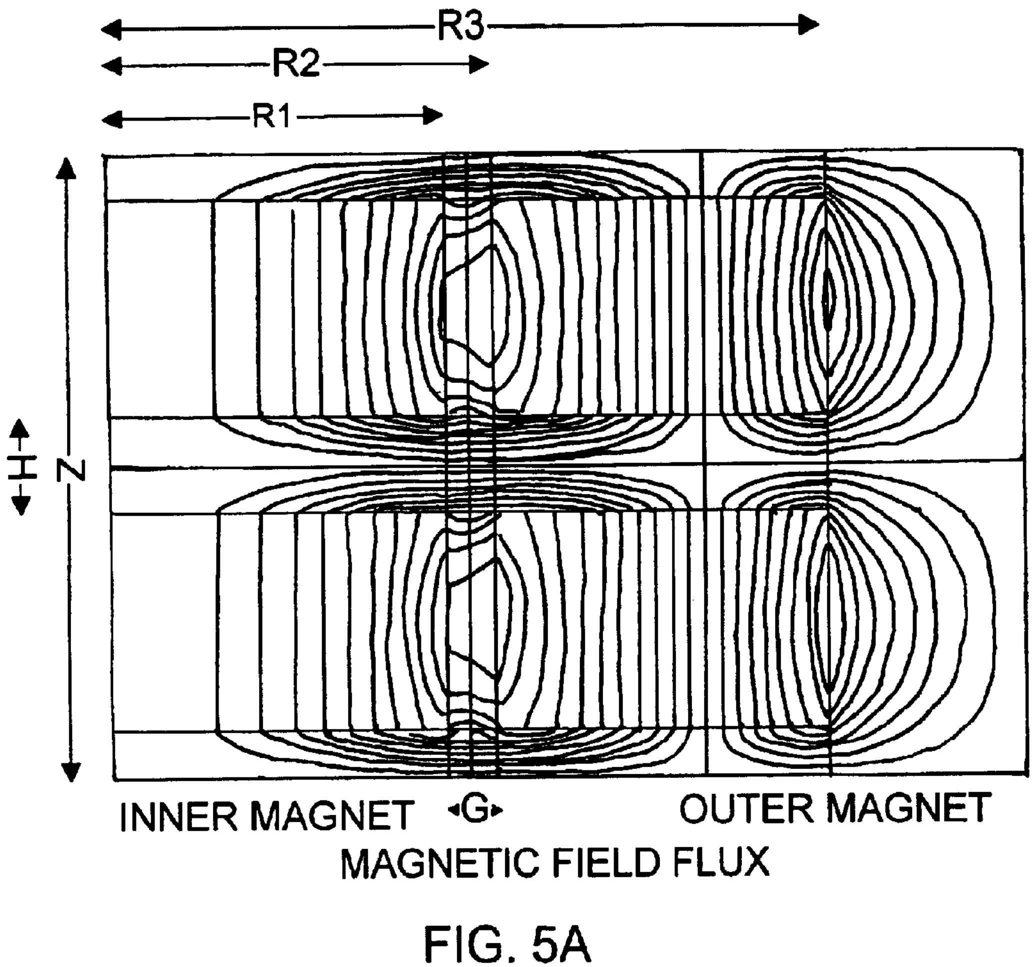
FIGS. 5A–5B show plots of finite element modeling results for one embodiment of the present invention where
Figure 5B:
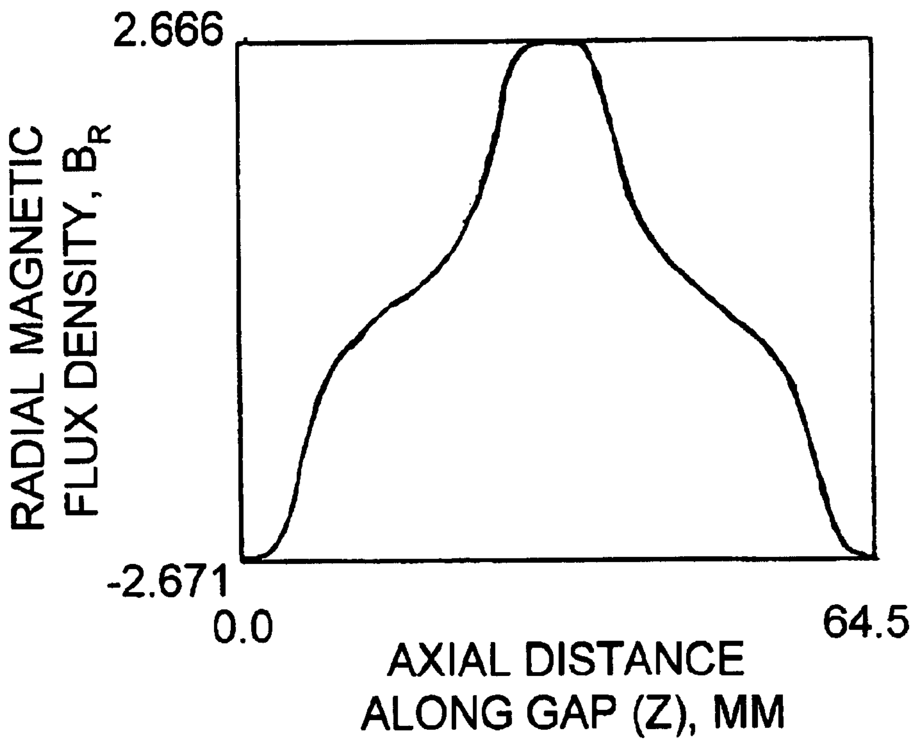

A typical finite element calculation result is shown in FIGS. 5A and 5B. FIG. 5A shows a radial magnetic flux density contour plot for the entire assembly. As shown in FIG. 5A, the radial magnetic flux density exhibits the greatest uniformity and highest intensity in the air gap regions adjacent to the inner and outer spacers. Thus, coil windings which placed at these locations will experience the maximum average radial magnetic flux density. FIG. 5B shows a plot of the radial magnetic flux density in the z-axis direction at the midpoint of the air gap between the central $R_1$ and outer $R_2$ magnets. As shown in FIG. 5B, due to the innovative design of the present device, the maximum radial magnetic flux density always occurs in the region of the air gap between adjacent high permeability spacers which is the most preferred location for coil winding placement. The radial magnetic flux maximum is substantially uniform and constant in the spacer region. As shown in FIG. 5B, the sign and direction of the radial magnetic flux density changes at each magnet end due to the reversed magnet poles.

Finite element calculations were performed for a range of magnet-coil-spacer component dimensions and the value of the average radial magnetic flux density $B_r$ in the coil region was determined for a variety of configurations. Assuming a vertical velocity of 0.4 m/s, the maximum instantaneous power output per coil $P_{max}$ was calculated from the open circuit voltage $V_e$ and the short circuit current $I_0$. Power per unit volume $P_{vol}$ and weight $P_{wt}$ were calculated from known volume and densities of the magnets and coil windings. Table 1 provides calculation results for a range of component parameter variations where the average radial magnetic flux density and maximum power output per unit volume $P_{vol}$ and weight $P_{wt}$ have been determined for each configuration.

As shown by the results in Table 1, with the device design of the present invention, the average radial magnetic flux density increases with increasing magnet size. At constant magnet size, radial magnetic flux density increases with decreasing coil volume and coil volume/magnet volume ratio. It is important to note that the results of Table 1 show a maximum power per unit volume generation capacity which differs from conditions which yield a maximum average radial magnetic flux density. This apparently is due to coil design parameters where the maximum power per unit volume occurs when there is an optimum coil design relationship between coil winding parameters and the resultant open circuit voltage and short circuit current which provide for maximum coil power output without exceeding the coil wire current carrying capacity. Thus, the innovative device of the present invention provides for design configurations which provide maximum average magnetic flux density within the coil volume and maximum coil volume within the region of maximum average magnetic flux density which are optimized to provide the maximum open circuit voltage and short circuit current which are compatible with vehicle electrical requirements.

TABLE 1

Finite Element Parameter Optimization Study

| G (mm) | $R_1$ (mm) | H (mm) | L (mm) | $B_r$ (Tesla) | $P_{vol}$ (W/c.c.) | $P_{wt}$ (W/kg) |
|---|---|---|---|---|---|---|
| 5 | 25 | 10 | 20 | 1.8 | 108 | 13.72 |
| 5 | 25 | 10 | 22.5 | 2.05 | 129.4 | 16.44 |
| 5 | 25 | 10 | 25 | 2 | 114.2 | 14.51 |
| 5 | 25 | 5 | 22.5 | 2.39 | 103.8 | 13.19 |
| 5 | 25 | 10 | 22.5 | 2.05 | 129.4 | 16.44 |
| 5 | 25 | 15 | 22.5 | 1.65 | 109 | 13.85 |
| 2.5 | 25 | 10 | 22.5 | 2.8 | 120.6 | 15.32 |
| 5 | 25 | 10 | 22.5 | 2.05 | 129.4 | 16.44 |
| 10 | 25 | 10 | 22.5 | 1.25 | 96.2 | 12.22 |
| 5 | 15 | 10 | 22.5 | 1.25 | 80.2 | 10.19 |
| 5 | 20 | 10 | 22.5 | 1.6 | 98.4 | 12.50 |
| 5 | 25 | 10 | 22.5 | 2.05 | 129.4 | 16.44 |
| 5 | 30 | 10 | 22.5 | 2.2 | 124.2 | 15.78 |
| 5 | 15 | 10 | 5 | 0.75 | 62.6 | 7.95 |
| 5 | 15 | 10 | 7.5 | 0.9 | 77.2 | 9.81 |
| 5 | 15 | 10 | 10 | 1.1 | 100.8 | 12.81 |
| 5 | 15 | 10 | 12.5 | 1.15 | 98 | 12.45 |
| 5 | 15 | 10 | 15 | 1.2 | 96 | 12.20 |
| 5 | 15 | 10 | 17.5 | 1.25 | 94.6 | 12.02 |
| 5 | 15 | 10 | 20 | 1.3 | 93.8 | 11.92 |
| 5 | 15 | 10 | 22.5 | 1.25 | 80.2 | 10.19 |

2. Contribution Efficiency

A power contribution efficiency for the regenerative electromagnetic shock absorber of the present invention can be determined, at a given vehicle speed $v_x$, from the ratio of the regenerated power to the sum of the regenerated power and the power required to maintain vehicle travel on a smooth and level road at speed $v_x$. The power contribution efficiency $\eta_x$ at vehicle speed $v_x$ may be defined as $$\eta_x = \frac{P_{regen}}{P_{regen} + P_{diss}},$$

where $P_{regen}$ is the total regenerated power of a fully-equipped vehicle. $P_{regen}$ is equal to the total number of shock absorber coils used in the vehicle multiplied by the average power generated by each coil $P_{Avg}$. $P_{diss}$ is the power dissipated to maintain the vehicle at an assumed horizontal velocity $v_x$ of 45 mph or 20 m/s on a smooth level road for a vehicle weight which includes the additional weight penalty of the shock absorbers. In a published analysis of road energy losses for passenger vehicles, the power required to maintain a 45 mph or 20 m/s vehicle speed for a typical 2500 pound passenger vehicle has been estimated at 6500 watts [see Efficient Use of Energy, K. W. Ford, et al. (eds.), American Institute of Physics (New York 1975), p 99–121]. Assuming that recent improvements in vehicle designs have reduced air resistance, bearing losses and tire friction in typical passenger vehicles, a revised estimate of the power required $P_0$ to maintain a vehicle speed of 45 mph or 20 m/s for a 2500 pound vehicle is about 6000 watts. Assuming only tire friction, $P_{diss}$ can be defined as $(1+\beta)P_0$, where $\beta$ is the ratio of the shock absorbers weight to vehicle weight.

A particularly useful expression for determining the power contribution efficiency of the regenerative shock absorber of the present invention is the average power:

$$P_{avg} \approx \frac{\sigma \cdot (v_{\max} \cdot B_r)^2 \cdot V_{coil}}{12}$$

In this equation, $\sigma$ is the conductivity of the coil windings and $v_{max}$ is the maximum vertical displacement velocity $v_z$ of the shock absorber, which is determined from road surface profiles and the horizontal speed $v_x$ of the vehicle. Analysis of actual road profile data suggests that, for a vehicle traveling at a horizontal velocities $v_x$ ranging from 45 mph (20 m/s) to 65+ mph (30 m/s), anticipated vertical displacement velocities $v_z$ range between 0.1 to 1.0 meters per second. Values for the average radial magnetic flux density $B_r$ are obtained by applying finite element analysis to sample device designs and calculating the average radial component of the magnetic flux density for specific component dimensions and configurations such as provided in either Table 1 or Table 2. As noted below, the maximum achievable average radial magnet flux density $B_r$ obtained from vector superposition of magnetic fields according to the teachings of the present invention is limited primarily by the saturation magnetization of the high magnetic permeability materials employed as spacers and support tubes.

Figure 6:
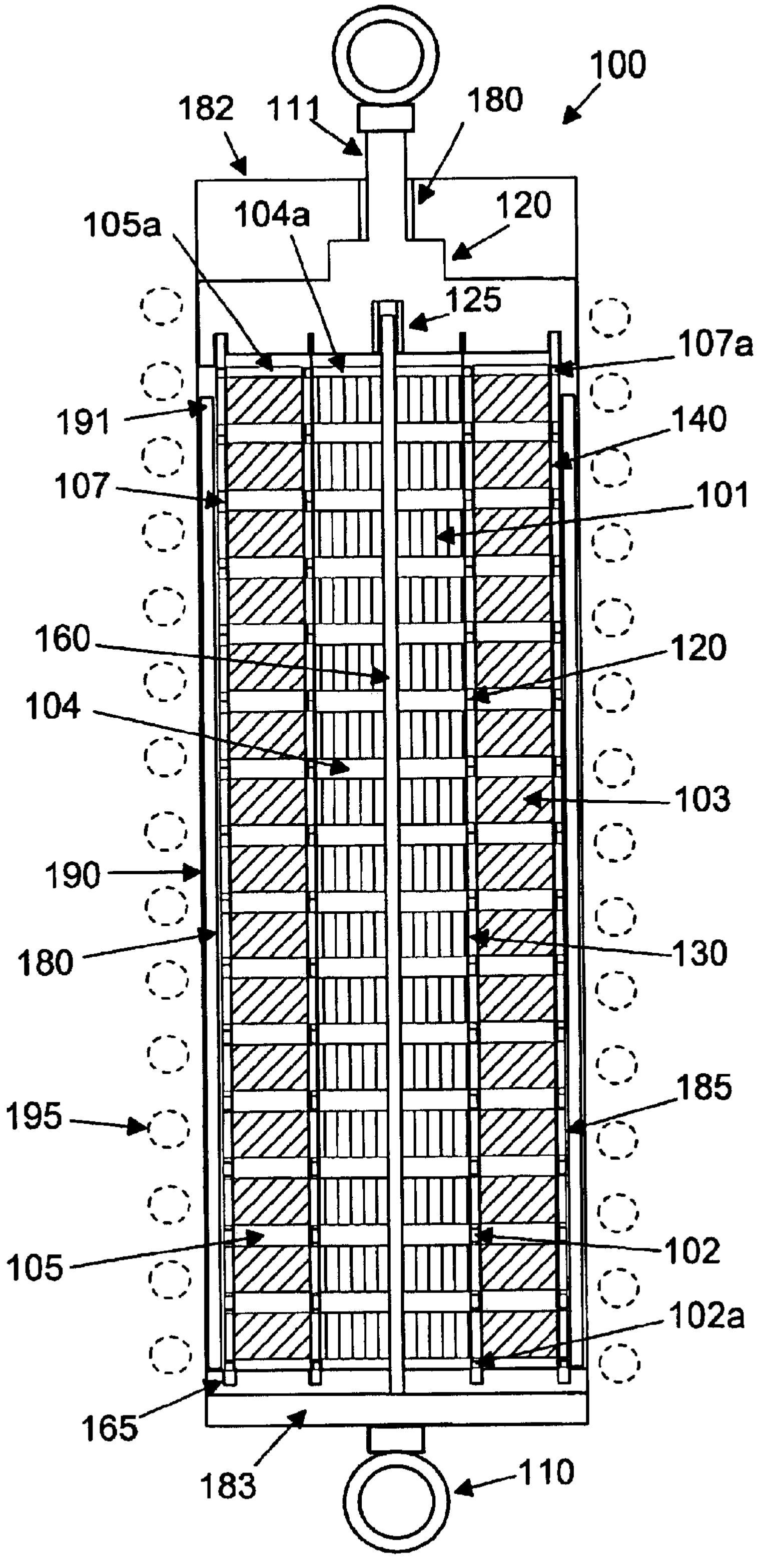
FIG. 6 is a schematic cross section of one regenerative electromagnetic shock absorber embodiment of the present invention.

FIG. 6 is a cross-sectional schematic of one preferred regenerative shock absorber embodiment that was used for power contribution efficiency calculations. In this preferred embodiment, fifteen magnet layers and sixteen coil layers are employed for each of four vehicle shock absorbers. Table 2 provides a list of example component dimensions used for these calculations. It is important to note that, while a fixed number of magnet and coil layers and specific component dimensions were used for power calculations for this example, the device of the present invention provides for a variety of embodiments where fewer or greater numbers of magnet and coil layers and alternative component and device dimensions may be employed without departing from the teachings of the present invention.

For these example calculations, it was assumed that regenerative shock absorber was sized to accommodate the replacement of conventional shock absorbers in a typical passenger vehicle retrofit application with a nominal three inch diameter and twenty inch length, equivalent to typical diameter and length of a conventional shock absorber. In this particular embodiment, a fifteen layer magnet assembly was assumed comprising fifteen central cylindrical 101 and concentric toroidal magnets 103, fourteen full height, concentric inner coils 102 and outer coils 107, fourteen full height inner spacer 104 and outer spacer 105 layers, and half-height inner end coils 102*a*, outer coils 107*a* and spacers 104*a*, 105*a* at each end of the magnet-coil array assembly. For these calculations, the vehicle was assumed to be equipped with four regenerative electromagnetic shock absorber assemblies. Coil, spacer and magnet dimensions were used for calculating their respective volumes and material densities were used to calculate the respective weights of coils, magnets and spacers. For calculation purposes, NdFeB magnets, copper wire windings and iron spacers were assumed. In order to simplify these calculations, coil and magnet support components and materials were ignored although their effect on coil and magnet gap spacing was not.

In a typical regenerative electromagnetic shock absorber vehicle installation, a total of four shock absorbers are employed, one for each wheel. In one embodiment, the addition of four regenerative shock absorbers increase vehicle weight by approximately 600 pounds. In an alternative embodiment, the regenerative shock absorbers increase vehicle weight by approximately 800 pounds. The dissipated power $P_{diss}$ and power contribution efficiency $\eta_x$ may be calculated for an assumed baseline vehicle weight of 2500 pounds and an assumed combined shock absorber weight of 600 pounds. Assuming a value of 6000 Watts for $P_0$ and a $\beta$ value of 0.24, $P_{diss}$ is approximately 7440 Watts. Since $P_{regen}$ is equal to the total combined power output $P_{total}$ of all coils in each of the four shock absorbers, the power contribution efficiency $\eta_x$ is readily determined for specific device embodiments from calculations of individual coil power outputs $P_{coil}$ from the open circuit voltage $V_e$ and short-circuit current $I_0$ calculated for specific coil geometries and configurations.

TABLE 2

Example Device Dimensions

| | | |
|---|---|---|
| central cylindrical magnets (101) | radius | $R_1$ = 35 mm |
| central high permeability spacers (104) | radius | $R_1$ = 35 mm |
| inner coil winding (102) | inner radius | $R_1'$ = 35.5 mm |
| | outer radius | $R_2'$ = 39.5 mm |
| | height/length | H = 10 mm |
| concentric toroidal magnets (103) | inner radius | $R_2$ = 40 mm |
| | outer radius | $R_3$ = 75 mm |
| concentric high permeability spacers (105) | inner radius | $R_2$ = 40 mm |
| | outer radius | $R_3$ = 75 mm |
| central and concentric magnets (101, 103) | height/length | L = 22.5 mm |
| central/concentric middle spacers (104, 105) | height/length | H = 10 mm |
| half-height end spacers (104a, 105a) | height/length | H = 5 mm |
| optional outer coil winding (107) | inner radius | $R_3'$ = 75.5 mm |
| | outer radius | $R_4$ = 79.5 mm |
| | height/length | H = 10 mm |
| half-height end coils (102a, 107a) | height/length | H = 5 mm |

For determining the maximum $P_{max}$ and average $P_{Avg}$ individual coil power output, open circuit coil voltages $V_e$ and short-circuit coil currents $I_0$ were calculated for a range of vertical velocities $v_z$, where $v_z = v_{max}$, using the sample magnet and coil dimensions provided in Table 2. The results are presented in Table 3. Both the inner and outer coils were assumed to be wound from copper wire having a square 1 mm×1 mm cross section and electrical conductivity of $5\times10^7$ S/m. Based on the wire cross section and coil dimensions provided in Table 2, the inner and outer coils both had 40 turns, the inner coil volume was approximately $9.4\times10^{-6}$ $m^3$ and the outer coil volume was approximately $19.4\times10^{-6}$ $m^3$. Peak and average inner coil power was determined for two $B_r$ values, 2.2 and 2.35 Tesla, which were derived from finite element analysis and represent a typical range of average radial magnetic flux densities produced by the example embodiment having the specifications shown in Table 2. Peak and average outer coil power was calculated for a typical average radial magnetic flux density of 0.8 Tesla determined from finite element analysis calculations assuming the outer coil and outer concentric magnet specifications provided in Table 2.

Ranges of anticipated vertical displacement velocities were determined by applying the short bump geometric model to actual road profile data with a given horizontal vehicle speed. Assuming a horizontal vehicle speed of 45 mph (20 m/s), ranges of road bump slope values and estimates of associated vertical displacement velocities were determined by application of the bump model to actual profile data. Based on road profile measurement data for model pavement sections on U.S. roads, bump heights apparently range from fractions of a millimeter to centimeters, bump slopes range from 0.001 to 0.05 and associated vertical displacement velocities range between 0.1 to 1.0 meters per second. However, it is anticipated that bump slopes as high as 0.10 and displacement velocities greater than 1 m/s are likely on badly weathered or worn road surfaces. Furthermore, vehicles traveling on unpaved road surfaces would likely encounter even greater bump slopes and displacement velocities. For the purpose of estimating power generating capacity and power contribution efficiencies for the present device, road surfaces having bump slopes ranging between 0.010 and 0.030 were assumed to be representative of the diverse road surface profiles encountered under typical urban driving conditions.

Table 3 provides a summary of anticipated device performance results for a regenerative electromagnetic shock absorber embodiment having the specifications listed in Table 2. Coil power and efficiency calculations are provided for a range of realistic road bump conditions and radial magnetic flux densities where peak open circuit voltage $V_e$, peak short circuit current $I_0$, peak instantaneous coil power $P_{max}$ and average coil power $P_{Avg}$ are calculated for each coil, and total peak regenerative power $P_{TP}$, total average regenerative power $P_{TA}$ and power contribution efficiency $\eta$ are calculated for a vehicle equipped with four regenerative shock absorbers having fourteen full-height coils and two half-height coils, equivalent to fifteen full-height coils. For power contribution efficiency calculations $\eta$, the average power output was used. As the results of Table 3 demonstrate, the regenerative electromagnetic shock absorber system of the present invention is capable of peak power generating capacity of between about 2 to 17 kW, average power generating capacity ranging from about 1 to 6 kW, and power contribution efficiencies ranging from 8 to 44% for passenger vehicles traveling at relatively moderate speeds on typical roads encountered under normal urban driving conditions. For rough roads with bump slopes as high as 0.10 and displacement velocities greater than 1.0 m/s, it is anticipated that the regenerative shock absorber system of the present invention may generate nearly 50 kilowatts of peak power and nearly 16 kW of average power with a power contribution efficiency approaching 70%. It is anticipated that, with devices fabricated with high permeability materials having a saturation magnetization of greater than 2.5 Tesla, even greater peak and average power outputs and power contribution efficiencies may be realized from additional increases in radial magnetic flux density in the coil windings.

The data shown in Table 3 provides performance results for two alternative embodiments. In one preferred embodiment, only an inner concentric coil array 102, **102*a* is employed. In an alternative preferred embodiment, an additional outer concentric coil array 107, 107*a* is employed with the inner array 102, 102*a*. The optional outer concentric coil array 107, 107*a* exploits the additional radial magnetic flux around the outside perimeter of the concentric toroidal magnets 103 without adding significant weight. Table 3 provides data for the inner coil, outer coil, combined inner and outer coil, and total output. Total peak and average regenerative power output was determined for a vehicle configuration where four shock absorbers are employed, one on each wheel, and each shock absorber comprises the equivalent of fifteen full-height coils, fourteen full-height coils and two half-height coils. Finite element analysis has shown that the combined output of two half-height end coils is equivalent to a single full-height coil for a specific configuration and therefore the total regenerative shock absorber system output power was determined for sixty coils, four regenerative shock absorbers having the equivalent of fifteen coils per shock absorber. As shown in Table 3, the addition of the optional outer coil array 107, 107*a*** provides approximately 23 to 28% increase in peak regenerated power, approximately 22 to 29% increase in average regenerated power and approximately 13 to 26% increase in power contribution efficiency with minimal additional weight penalty.

For the sample calculations provided in Table 3, 18 AWG square copper coil windings were assumed. It is important to note that, for a given displacement velocity and average radial flux density, that coil voltage, current, power and regeneration efficiency may tailored to specific load needs by choice of coil wire and winding configurations. In addition to increasing coil cross-sectional area and number of winding turns, round, square or rectangular wire of varying gauge size may be employed. Additionally, copper wire may be substituted with silver alloy wire may be to enhance winding conductivity and reduce coil resistance.

In one embodiment, fine diameter, high magnetic permeability ferromagnetic alloy wire may be used in conjunction with coil windings made from round copper wire to increase the radial magnetic flux density in the coil winding volume. In this embodiment, a wrapping of fine diameter, high permeability alloy wire fills the interstices formed by round copper wire windings. For an assumed effective permeability of the iron alloy wire of 1.1, which takes into account the fractional cross-sectional area occupied by the iron alloy wire and a permeability of 26 at 2.2 Tesla, an approximately 5–7% increase in average radial magnetic flux density $B_r$ may be realized within the coil volume with an anticipated 2–3% increase in power contribution efficiency. As an alternative, a high magnetic permeability alloy coating, such as nickel or iron, may be applied to a copper wire core, to achieve a similar effect.

Due to the enhanced electromagnetic efficiency of the present device, as Table 3 shows, relatively high peak short circuit currents $I_0$ are anticipated with the displacement velocities anticipated under normal driving conditions. Normally, such high coil currents could overload the current carrying capacity of the coil windings and lead to coil burnout. However, under normal operating conditions where maximum power generation is preferred, a matched load is used where the load resistance $R_L$ equals the coil resistance $R_C$ and only half of the induced current flows through the coil windings. Thus, the peak current and voltage which the coil windings experience is approximately half the peak short circuit current $I_0$ and half the peak open circuit voltage $V_e$. Since these peak currents and voltages are only brief intermittent transients which typically last only a few milliseconds, the rms average current $I_{rms}$ and rms average voltage $V_{rms}$ are more indicative of required current capacity specifications for the coil windings.

TABLE 3

Coil Output and Regeneration Efficiency Calculatic

| Bump Slope $m_b$ | Displacement Velocity (m/s) $v_z$ | Ave. Radial Magnetic Flux Density (T) $B_r$ | Coil Array | Electrical Output per Coil $V_e$(V) | $I_0$(A) | $P_{max}$(W) | $P_{Avg}$(W) | Total Peak Power $P_{TP}$(W) | Total Average Power $P_{TA}$(W) | Power Contribution Efficiency η(%) |
|---|---|---|---|---|---|---|---|---|---|---|
| .030 | 0.6 | 2.2 | Inner | 12.4 | 66 | 205 | 68 | 12300 | 4080 | 35 |
| | | 0.8 | Outer | 9.3 | 24 | 56 | 19 | 3360 | 1140 | — |
| | | — | Combined | 21.7 | 90 | 261 | 87 | 15660 | 5220 | 41 |
| .025 | 0.5 | 2.2 | Inner | 10.4 | 55 | 143 | 48 | 8580 | 2880 | 28 |
| | | 0.8 | Outer | 7.8 | 20 | 39 | 13 | 2340 | 780 | — |
| | | — | Combined | 18.2 | 75 | 182 | 61 | 10920 | 3660 | 33 |
| .020 | 0.4 | 2.2 | Inner | 8.3 | 44 | 91 | 30 | 5460 | 1800 | 19 |
| | | 0.8 | Outer | 6.2 | 16 | 25 | 8 | 1500 | 480 | — |
| | | — | Combined | 14.5 | 60 | 116 | 39 | 6960 | 2340 | 24 |
| .015 | 0.3 | 2.2 | Inner | 6.2 | 33 | 51 | 17 | 3070 | 1020 | 12 |
| | | 0.8 | Outer | 4.7 | 12 | 14 | 5 | 840 | 300 | — |
| | | — | Combined | 10.9 | 45 | 65 | 22 | 3910 | 1320 | 15 |
| .010 | 0.2 | 2.2 | Inner | 4.1 | 22 | 23 | 8 | 1364 | 480 | 6 |
| | | 0.8 | Outer | 3.1 | 8 | 6 | 2 | 360 | 120 | — |
| | | — | Combined | 7.2 | 30 | 29 | 10 | 1724 | 600 | 7 |
| .030 | 0.6 | 2.35 | Inner | 13.2 | 71 | 234 | 78 | 14040 | 4680 | 39 |
| | | 0.8 | Outer | 9.3 | 24 | 56 | 19 | 3360 | 1140 | — |
| | | — | Combined | 22.5 | 95 | 290 | 97 | 17400 | 5820 | 44 |
| .025 | 0.5 | 2.35 | Inner | 11.1 | 59 | 164 | 55 | 9840 | 3300 | 31 |
| | | 0.8 | Outer | 7.8 | 20 | 39 | 13 | 2340 | 780 | — |
| | | — | Combined | 18.9 | 79 | 203 | 68 | 12180 | 4080 | 35 |
| .020 | 0.4 | 2.35 | Inner | 8.9 | 47 | 104 | 35 | 6230 | 2100 | 22 |
| | | 0.8 | Outer | 6.2 | 16 | 25 | 8 | 1500 | 480 | — |
| | | — | Combined | 15.1 | 63 | 129 | 43 | 7730 | 2580 | 26 |
| .015 | 0.3 | 2.35 | Inner | 6.6 | 35 | 59 | 20 | 3500 | 1200 | 14 |
| | | 0.8 | Outer | 4.7 | 12 | 14 | 5 | 840 | 300 | — |
| | | — | Combined | 11.3 | 47 | 73 | 24 | 4340 | 1440 | 16 |
| .010 | 0.2 | 2.35 | Inner | 4.4 | 24 | 26 | 9 | 1555 | 540 | 7 |
| | | 0.8 | Outer | 3.1 | 8 | 6 | 2 | 360 | 120 | — |
| | | — | Combined | 7.5 | 32 | 32 | 11 | 1915 | 660 | 8 |

Where large coil currents are anticipated, to avoid the possibility of coil burnout from coil currents which exceed the current carrying capacity of the coil winding wire, conventional passive or active cooling methods, such as heat sinks or forced convection, may be employed for thermal management of excessive coil heat. Alternatively, to avoid coil overheating due to excessive currents, the effective load resistance $R_L$ of the coil circuit may be increased to reduce eddy current in the coil windings. As discussed below in reference to the optional damping control circuit 400, this may be accomplished by employing an additional transformer 351 between the coil output leads and a voltage conditioning circuit 300 where the primary to secondary winding turn ratio is greater than 1.0.

In preferred embodiments, to avoid coil burnout a larger gauge coil wire may be employed with a current capacity that at least matches or exceeds the anticipated rms average coil current $I_{rms}$ are preferred. Wire gauges having a current capacity which exceeds half the anticipated peak short circuit current $I_0$ are most preferred. Table 4 provides guidelines for selecting a proper coil wire gauge based on anticipated peak or average coil currents where the current carrying capacity for various gauges of bare and insulated round and square cross section wire is provided. By convention, round and square wire gauges are based on the equivalence of round wire diameters and square wire edges. The data in Table 4 are for a single wire in air. For the insulated wire data, a high temperature polytetrafluoroethylene insulation was assumed.

TABLE 4

Current Carrying Capacity of Example Coil Wire

| | Current Capacity (Amps) | | | |
|---|---|---|---|---|
| | Round | | Square | |
| Wire Gauge | Bare | Insulated | Bare | Insulated |
| 18 | 16 | 24 | 20 | 30 |
| 16 | 22 | 32 | 28 | 40 |
| 14 | 32 | 45 | 40 | 57 |
| 12 | 41 | 55 | 52 | 70 |
| 10 | 55 | 75 | 70 | 95 |
| 8 | 73 | 100 | 93 | 127 |

As shown in Table 4, where relatively high coil currents which may exceed the capacity of round wire are anticipated, either high temperature insulation, square wire of equivalent gauge, or a heavier gauge round wire may be employed to avoid coil burnout. Within each wire gauge, square wire has a higher current capacity than round wire due to the increase in wire cross-sectional area where the cross section of square wire is approximately 1.27 times the area of round wire. While examples of round and square wire current capacities are provided in Table 4, rectangular wire may also be employed. Rectangular wire gauge is determined by cross section thickness. The current carrying capacity of rectangular wire is typically higher than that of square wire of equivalent gauge due to the additional cross-sectional width. Depending on the wire width to thickness ratio, rectangular wire may exceed the current capacity of equivalent gauge square wire by more than a factor of ten.

Since coil voltage is proportional to the number of turns in a winding cross section and coil current is proportional to the winding cross-sectional area, in preferred embodiments, it is desirable to maximize both the winding cross-sectional area and number of wire turns. Additionally, since coil power is proportional to the coil volume exposed to the maximum radial magnetic flux density, due to the lower packing density of round wire compared to rectilinear-shaped wire, square or rectangular wire are generally preferred to round wire for maximizing coil volume. In most applications, once the coil winding cross section dimensions and current capacity requirements are established, the choice of round, square or rectangular wire and wire gauge may be made based on the desire to maximize coil volume to maximize power output and the selection of an appropriate number of winding turns for the preferred output voltage. Where rectangular winding cross sections are employed, although round wire may be employed to save winding costs, square or rectangular wire are generally preferred to maximize coil volume and current capacity. For most applications, the coil winding may be tailored for a specific voltage and current output by selection of an appropriate number of winding turns and wire cross-sectional area.

3. Energy Conversion Efficiency

In considering the conversion of parasitic energy losses from road surface induced displacement motions and vibrations, it is anticipated that the device of the present invention has a relatively high energy conversion efficiency compared to prior art devices due to the absence of a complex, high inertia, mechanical assembly of moving parts for converting linear motion to rotary motion. By direct conversion of linear displacements to electrical energy without introducing undesirable mechanical friction and inertia produced by linear-rotary mechanical motion converters, the device of the present invention uniquely provides for low internal friction, low frictional energy losses, low device mass and low device inertia. Thus, the device of the present invention uniquely provides for rapid bump or vibration response over a wide range of frequencies and efficient energy conversion due to elimination of unnecessary mechanical inertia, slip and play produced by conventional mechanical motion converters. Furthermore, in contrast to conventional mechanical motion converters, which typically require continuous, large amplitude displacements at relatively constant, low frequencies, the improved displacement sensitivity and response time of the present device provides for efficient energy conversion of reciprocal, intermittent linear motion having relatively high, variable frequencies and relatively short, variable displacements which are typical of the linear motion anticipated under normal driving conditions on typical road surfaces.

By way of example, the energy conversion efficiency may be estimated for a 2500 lb. (1136 kg) vehicle travelling at 45 mph (20 m/s) over a typical road and equipped with four regenerative shock absorbers, each weighing 150 lbs. (68 kg) with the equivalent of fifteen full-height coils. Assuming that the vehicle suspension or under-carriage accounts for approximately 25% of the vehicle mass, 625 lbs. (284 kg), and that the suspension mass is divided equally over four shock absorbers, 156 lbs. (71 kg) per shock, for a single regenerative shock absorber the kinetic energy of the moving mass is given as $$E_{KE} = \frac{1}{2} \cdot m \cdot V^2$$

where V is the vertical velocity $V_z$ caused by a bump displacement and mass m is the combined shared suspension mass (71 kg) and shock absorber mass (68 kg) for one regenerative shock absorber. The electrical energy $E_e$ produced by a regenerative shock absorber is given as $$E_e = n \cdot P_{Avg} \cdot T$$

when the vehicle traverses a single bump is calculated from where $P_{Avg}$ is the average power per coil, n is the number of coils per shock absorber and 2T is the vertical displacement period or time required to traverse an entire bump width and $$T = \frac{1}{2} \cdot \frac{\text{Bump Width } (x)}{\text{VehicleSpeed } (V_x)}$$

From road profile data, a typical bump baseline width x is about 20 cm and, assuming a vehicle speed of 20 m/s, the bump period T is approximately 0.01 seconds. From Table 3, assuming an average radial magnetic flux density $B_r$ of 2.35 Tesla and a vertical displacement velocity $V_z$ of 0.6 m/s, the average power $P_{Avg}$ per coil is 97 J/s and the total electrical energy produced by one shock absorber from a single road bump is $$E_e = 15 \times 97 J/s \times 0.01 s = 14.55 J$$

The kinetic energy created by the road bump may be estimated as $$E_{KE} = \frac{1}{2} \cdot 139 \text{ kg} \cdot (0.6 \text{ m/s})^2 = 25 \text{ J}$$

and the energy conversion efficiency estimated as $$\frac{E_e}{E_{KE}} \approx \frac{15}{25} = 60\%.$$

Thus, the device of the present invention is particularly suitable as a regenerative shock absorber for recovering energy losses due to parasitic displacement motion caused by actual road bumps and vibrations encountered under normal urban driving conditions. Due to the relatively low frictional losses and enhanced power generation efficiency of the present invention, it is anticipated that energy conversion efficiencies of greater than 60% are possible and conversion efficiencies of greater than 50% may be routinely achieved.

C. Electromagnetic Linear Generator and Shock Absorber Design

In order to achieve optimum power generation capacity, energy conversion efficiency and power contribution efficiency, it is important to understand the interrelationships between magnet-spacer-coil geometry, configuration and placement, vector superposition of magnetic fields and limitations in coil output voltage and current. In addition, for vehicle shock absorber applications, realistic limitations in device weight and size must be established to overcome the potential added weight and volume penalty encountered when equipping vehicles with regenerative shock absorbers while maintaining acceptable fuel economy and power generating capacity.

Since peak power or maximum instantaneous power $P_{max}$ is proportional to the square of the average radial magnetic flux density $B_r$ which the coil experiences, design parameters which maximize average radial magnetic flux within the region of the coil are most preferable. Maximizing the extent of the coil volume which is exposed to the maximum radial magnetic flux density is also desirable to achieve maximum power generation capability. However, due to the significant weight penalties encountered with increasing device size, for optimum vehicle fuel efficiency it is necessary to consider designs which provide maximum power generation capacity per unit weight or per unit volume.

In addition to optimizing coil volume, coil winding configurations must accommodate preferred open circuit voltages $V_e$, short circuit currents $I_0$, and coil resistances $R_{coil}$. While maximum short circuit current $I_0$ may be achieved with a single winding of a conductor with a large cross-sectional area, to produce useful electric power, a regenerative shock absorber must operate at voltages which are compatible with vehicle electrical system and battery voltages. While maximum open circuit voltages $V_e$ may be achieved with coils having a large number of wire windings, coils which employ lengthy windings with wire conductors having small cross-sectional areas will produce undesirably high resistance to induced currents with joule heating losses resulting in reduced electrical power output and generation efficiency.

The preferred regenerative shock absorber design must operate at realistic road bump frequencies and displacements encountered in typical urban or highway driving conditions, provide maximum regenerative power per device weight, maximize both average radial magnetic flux density and magnetic field uniformity at the location of the coil, maximize coil volume which is exposed to the maximum radial magnetic flux density, minimize coil joule heating losses due to excessive winding resistance, provide coil useful output voltages and currents which are adaptable to vehicle electrical requirements, and provide for dynamic suspension damping which accommodates both efficient power generation and enhanced passenger ride comfort and safety.

1. Design Concept

The electromagnetic linear generator and shock absorber of the present invention provides an innovative configuration of a central and concentric magnet array and coil windings which provide for substantial improvements in vector superposition of magnetic flux density, power generation capacity, energy conversion efficiency and damping performance over conventional electromagnetic generator devices.

As noted above, for a given coil volume $V_{coil}$ exposed to an average radial magnetic flux density $B_r$ the regenerative electrical power output of an electromagnetic shock absorber is proportional to the product of the average radial magnetic flux density squared $B_r^2$ and the coil volume $V_{coil}$. For the device of the present invention, an axially-symmetric, cylindrical magnet and coil geometry is generally preferred due primarily to three factors: a) magnet magnetic field lines close on themselves (i.e. the magnetic flux B has a non-zero curl) suggesting that a circular-type geometry is preferred; b) a solid cylinder has a substantially higher volume to surface area ratio than conventional cubic or rectangular shapes. A high volume to surface area ratio is preferred to maximize the $B_r^2 \times V_{coil}$ product. While a fixed magnet volume generates a fixed magnetic flux Φ, the radial magnetic flux density $B_r$ is inversely proportional to magnet area. Thus, the higher the volume to surface area ratio, the higher the radial magnetic flux density $B_r$ and the larger the $B_r^2 \times V_{coil}$ product or power generating capacity; and c) an axially symmetric geometry is preferred for generating higher induced voltage and current since coil displacement along an axis which is parallel to the longitudinal axis of cylindrical magnets coil causes electrons in the coil wire to experience a predominant Lorentz force tangential to the coil winding which is the preferred circumferential direction of current flow.

The single magnet-single coil interactions provided in conventional electromagnetic generator devices have significantly lower power generation capacity and efficiency because much of the magnet's magnetic flux is wasted and available to the coil for generating electricity. Even where arrays of magnets and coils are employed, the individual magnet-coil configurations and interactions used with conventional linear electromagnetic generators generally do not provide for the vector superposition (i.e. overlapping and combining of vector components) of the magnetic fields of multiple magnets nor do they provide for maximizing the magnetic flux density available to coil windings. With conventional electromagnetic linear generator devices, due to the non-optimum configuration and orientation of magnets and coils, magnetic fields are rapidly dispersed in the region immediately surrounding the magnet poles leading to a substantial reduction in magnetic flux density available to coil windings which are positioned in a region of relatively low average magnetic flux density.

Figure 7:
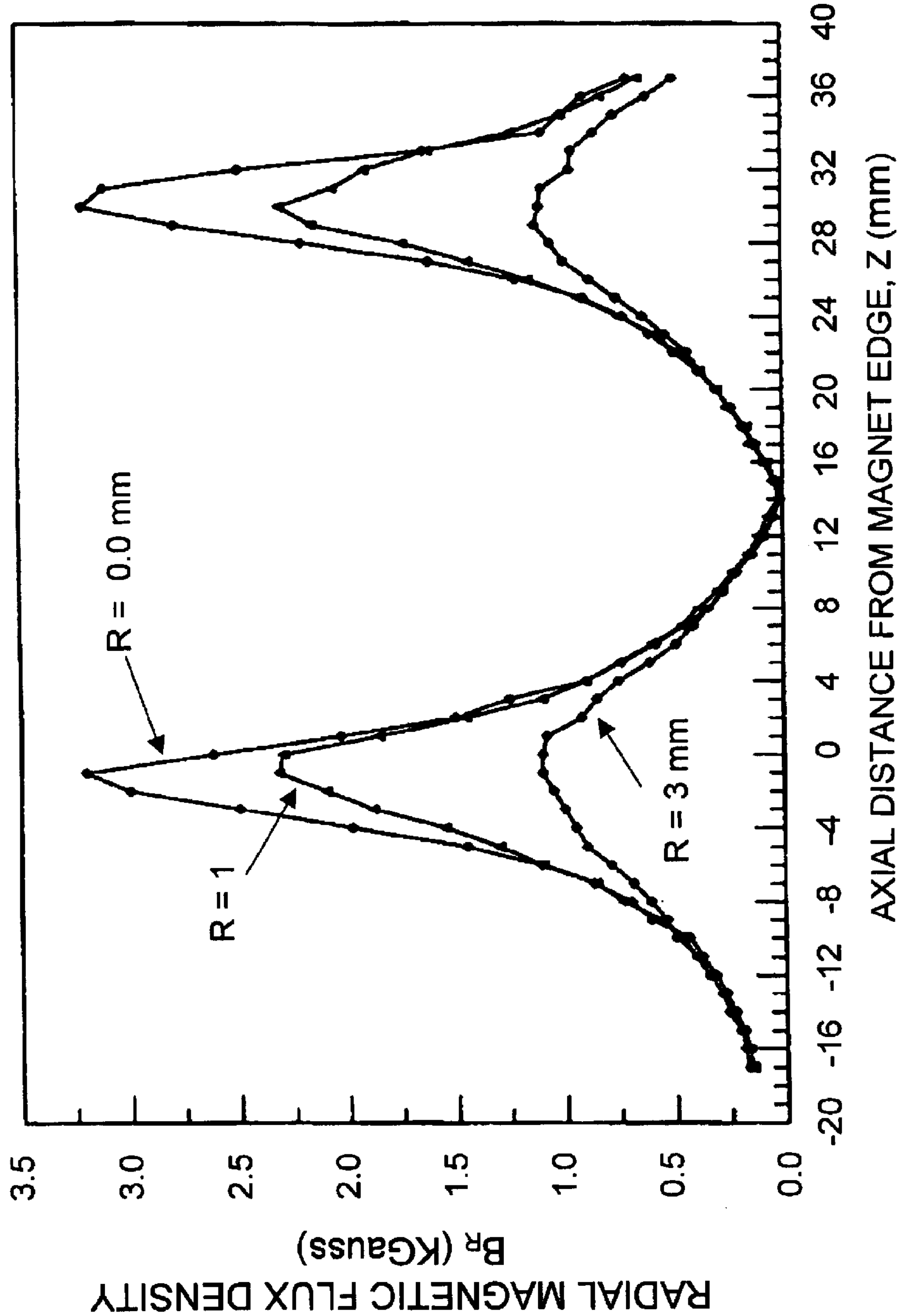
FIG. 7 is a plot of the radial magnetic flux density profile at various radial distances and axial positions along a NdFeB magnet.

By way of example, a plot of the magnitude of the radial magnetic flux density at various radial distances r and axial positions z along a 0.5" diameter×1.25" long NdFeB magnet is provided in FIG. 7. The flux density is given in kiloGauss where 10 kGauss=1.0 Tesla. As shown in FIG. 7, the maximum radial magnetic flux density occurs adjacent to the two magnet poles at either end of the magnet and the radial magnetic flux density drops dramatically at increasing distance from the magnet surface. As shown in FIG. 7, with conventional electromagnetic generator devices which only utilize coil interactions with single magnet poles, coils must be placed within about 30 um of the surface of a magnet pole in order to benefit from the region of maximum radial magnetic flux density, which for this example magnet is about 0.325 Tesla. Due to rapid attenuation of the magnetic flux in air, when coils are placed at further distances from the magnet surface, the coils are exposed to only a small fraction of the maximum radial flux density provided by the magnet.

Figure 8A:
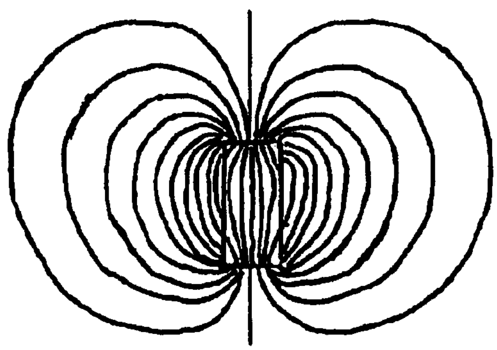
FIGS. 8A–8C is a schematic representation of typical magnetic field lines formed by single magnet (FIG. 8A) and adjacent paired magnets having opposing (FIG. 8B) and like (FIG. 8C) magnetic pole orientations.

As shown schematically in FIG. 8A, the magnetic flux density of an isolated magnet is rapidly dispersed with increasing distance from the poles or sides. As shown schematically in FIG. 8C, by placing two magnets adjacent to one another with like poles adjacent, the magnetic field and flux density are dramatically changed in the gap between the magnets where relatively high field strength and flux density is observed. As shown schematically in FIG. 8B, by placing two magnets adjacent to one another with opposite poles adjacent, the magnetic flux density in the region between the magnets is substantially enhanced such that this magnet pole orientation and configuration provides for a maximum average radial magnetic flux density in the region adjacent to the opposing magnet poles.

Figure 8B:
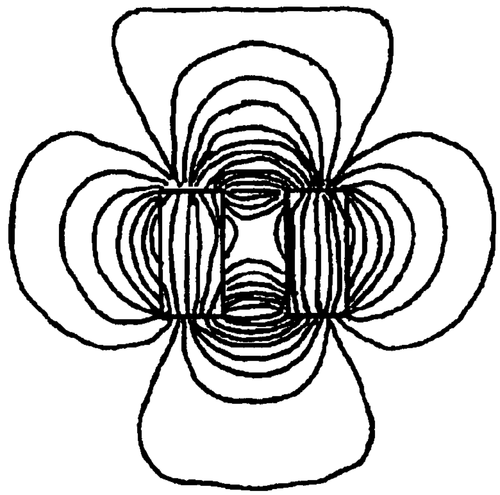
Figure 8C:
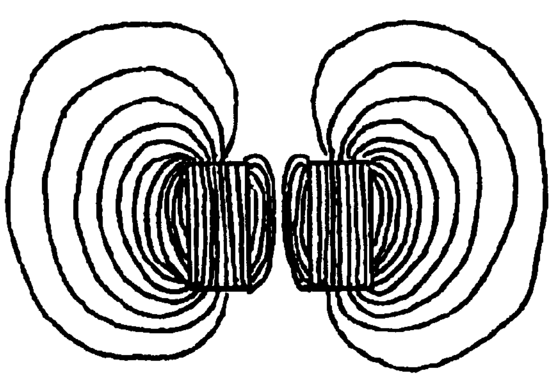

The magnet-pole configuration shown in FIG. 8B is employed in preferred embodiments of the present invention in order to provide regions of maximum average radial magnetic flux density which can be exploited by proper positioning of the coil windings. Thus, as shown in FIG. 4, the innovative magnet-coil configuration and corresponding magnet pole orientations of the present invention provide for maximum radial flux density within the coil winding volume and efficiently exploits the maximum magnetic flux produced by the magnets. Furthermore, the use of high permeability spacers between like poles of adjacent stacked magnets reduces magnetic field dispersion in the magnet pole regions and provides maximum radial magnetic flux density $B_r$ in the coil windings positioned adjacent to the spacers.

As shown in FIGS. 5A–5B, the average radial magnetic flux density $B_r$ is greatest in the spacer region because, by symmetric vector superposition, the radial magnetic fields from four neighboring magnets add maximally in this region with very little loss of flux. Thus, the innovative design of the present invention provides for an optimum vector superposition of the magnetic flux from the poles of four adjacent magnets which, in principal, can produce a nearly four-fold increase in the average radial magnetic flux density within the coil volume. The achievement of theoretical maximum flux density is limited primarily by the saturation magnetization of the high permeability spacers which are employed. In contrast, conventional electromagnetic generator designs which typically utilize only single magnet-coil pairs or arrays of single magnet-coil pairs can provide only about one fourth of the magnetic flux and average radial magnetic flux density in the coil volume produced by the device of the present invention. Since coil electrical power output is proportional to $B_r^2$, the nearly four-fold increase in average radial magnetic flux density provided by the present invention can provide, in principal, nearly sixteen times the electrical power generating capacity of conventional electromagnetic generator device designs.

As shown in FIGS. 5A and 5B, the typical magnetic flux and average radial magnetic flux density produced by the present invention is concentrated in the gap region adjacent to the magnetic poles where the coil is located. The coil associated with each magnetic pole region is designed to fill essentially the entire volume where the radial magnetic flux density is concentrated, thereby producing the maximum value of the $B_r^2 \cdot V_{coil}$ product. Since power is proportional to the $B_r^2 \cdot V_{coil}$ product, the regenerated power can be significantly increased over that of a single magnet-single coil configuration or arrays of single magnet-single coil configurations as is found in conventional electromagnetic generator devices known in the art. Additional efficiencies may be obtained by placing an optional concentric outer coil array around the external perimeter of the concentric toroidal magnet array. With the addition of the optional outer coil array assembly, essentially all of the magnet flux produced by the central and concentric magnet arrays is exploited, thereby increasing the electrical power generated per magnet pole and the overall power efficiency of the regenerative electromagnetic generator.

Virtually any magnet type may be used with the device of the present invention. Magnets may be selected based on anticipated power generating requirements, cost considerations or a balance of cost and performance requirements. While the device of the present design will provide optimum power output no matter what magnet types are employed, optimum performance is obtained with magnets having high maximum energy product defined as the product of magnetizing force H times induction B. This property is essentially a measure of the efficiency of magnetic induction. Where cost considerations are a primary factor and generation capacity and power output is secondary, aluminum-nickel-cobalt or AlNiCo magnets may be employed. Alternatively, ceramic magnets such as barium or strontium ferrite may be used where increased power is desirable with marginal cost increases. Rare earth magnets may be preferred where cost is not a factor and maximum magnetic flux densities are required for maximum power generating capacity. For example, rare earth magnets such as samarium cobalt, $SmCo_5$ or $S_2Co_{17}$, or neodymium iron boron ("NdFeB"), for example $Nd_2Fe_{14}B$, may be employed to provide for high magnetic flux density.

While the device of the present invention may employ rare earth magnets, such as neodymium iron boron alloys or samarium cobalt alloys, ceramic magnets, such as barium ferrites or strontium ferrites, or AlNiCo magnets, in preferred embodiments rare earth magnets are used due to their high remanent magnetization and coercive magnetic fields. In a preferred embodiment, magnets having a high "maximum energy product" $B \cdot H_{max}$ are used. The "maximum energy product" is defined as the point in the magnetic hysteresis loop at which the product of the magnetizing force H and induction B reaches a maximum. At this point, the volume of magnetic material required to project a given energy into its surroundings is at a minimum.

In a most preferred embodiment, neodymium iron boron magnets are employed due to their relatively high maximum energy product. NdFeB magnets with remanent magnetic flux density $B_{rem}$ of 1.3 Tesla are widely available and magnets having a $B_{rem}$ of 1.5 Tesla have been recently commercialized. In a preferred embodiment, rare earth magnets having a typical remanent magnetization $B_{rem}$ and coercive magnetic field $H_c$ of 1.5 Tesla are employed. Based on actual road profiles encountered under normal urban driving conditions, NdFeB magnets could potentially lead to power contribution efficiencies of at least 50% with the device of the present invention.

A key design feature of the electromagnetic generator device of the present invention is the unique configuration and orientation of stacked central magnets and spacers, stacked concentric magnets and spacers, coil location, and magnet magnetic pole orientations which provide for vector superposition of magnetic fields from a plurality of neighboring magnets to produce a maximum average radial magnetic flux density in the coil windings. As shown in FIG. 4 and FIG. 6, two arrays of central magnets 101 and corresponding concentric toroidal magnets 103 are stacked with like poles facing one another. As shown in FIG. 4, the orientation and alignment of the magnetic poles of the central magnets 101 and concentric magnets 103 are complementary such that a north or south magnetic pole on a central magnet 101 is oriented with an opposing south or north magnetic pole of a facing concentric ring magnet 103. As shown in FIG. 4 and FIG. 6, each magnet within both the center and concentric magnet stacks 101, 103 is separated from its neighbors by high permeability spacers 104, 105. The spacers 104, 105 serve to minimize the dispersion of the magnetic field lines and magnetic flux from the magnet 101, 103 poles so that overlapping magnetic fields from the magnets 101, 103 produce a region of maximum radial magnetic flux density in the coil volume 102. As shown by plots of finite element calculation results in FIGS. 5A and 5B, with this innovative design configuration, the radial magnetic flux density and average radial magnetic flux density $B_r$ is greatest in the region between the center and concentric magnet spacers 104, 105 where the inner coil windings 102 are located. Where an optional outer coil array 107 is employed, the outer coils 107 are similarly positioned in the region of highest radial magnetic flux density on the outside perimeter of the concentric toroidal magnets 103, adjacent to the spacers 105 and magnetic pole regions 106 of the magnets 103.

The innovative design of the present invention provides for maximizing radial magnetic flux densities within coil volumes 102, 107 (102*a*, 107*a*) by vector superposition of the magnetic flux density from a plurality of adjacent magnets 101, 103. The maximum radial magnetic flux density $B_r$ which can be achieved with this superposition approach is limited primarily by air gap spacing between the magnets 101, 103 and coils 102 (102*a*), 107 (107*a*) and the saturation magnetization and magnetic permeability of currently available materials used for the high permeability spacers 104 (104*a*), 105 (105*a*) and support tubes 130, 140 170. The high permeability, high saturation magnetization spacers employed in the present device respond to vector superposition of the magnetic flux density from all neighboring magnets by each moment in the spacer material aligning its otherwise randomly oriented permanent moment. This moment realignment is a consequence of both the applied external fields from neighboring magnets and due to the response of the other moments within the spacer material. Because of this moment realignment, the spacers act like extensions of the neighboring magnets, except that the spacer magnetization direction is easily changed, making them appear as if the magnets are "bent". Furthermore, because the saturation magnetization of the spacer alloy is higher than that of the magnets, the spacers can achieve higher magnetic flux densities than the magnets. Thus, the spacers act as "bent" permanent magnets with a higher remanent flux density $B_{rem}$ and considerably higher radial flux density $B_r$ than is achievable with any one of the magnets. Consequently, a very high magnetic flux density concentration is produced in the coil region.

In preferred embodiments, the high magnetic permeability, high saturation magnetization ferromagnetic materials employed as spacers 104 (104*a*), 105 (105*a*) and support tubes 130, 140 170 in the present invention have a magnetic permeability of at least 2 relative to air with a minimum saturation magnetization of 2.0 Tesla (T). In more preferred embodiments, the high permeability, high saturation magnetization ferromagnetic materials have a minimum magnetic permeability of 10 and saturation magnetization of at least 2.2 Tesla (T). In a most preferred embodiment, the high permeability, high saturation magnetization materials have a minimum saturation magnetization of at least 2.4 Tesla.

It is well known from published handbook data that the magnetic permeability of high permeability materials drops off dramatically at high magnetic flux densities due to saturation magnetization [see Handbook of Chemistry and Physics, $80^{th}$ ed., CRC Press (Cleveland, Ohio), 1999]. Thus, while pure iron and iron—cobalt alloy spacer materials exhibit high magnetic permeability, the saturation magnetic flux density for these materials places practical limits on the maximum radial magnetic flux densities achievable with the innovative device and design of the present invention using presently available rare earth magnets and existing ferromagnetic materials. With currently available commercial iron-cobalt alloys, it is anticipated that maximum average magnetic flux densities produced by the innovative device and design of the present invention may be limited to about 2.4 Tesla since current generation high magnetic permeability materials have a saturation magnetization approaching 2.45 Tesla. However, it is anticipated that, as new high permeability materials become available having higher saturation flux density values, higher maximum average radial magnetic flux densities may be achieved by incorporating such new materials into improved device designs following the teachings of the present invention.

2. Magnet-Coil Configuration

Figure 9:
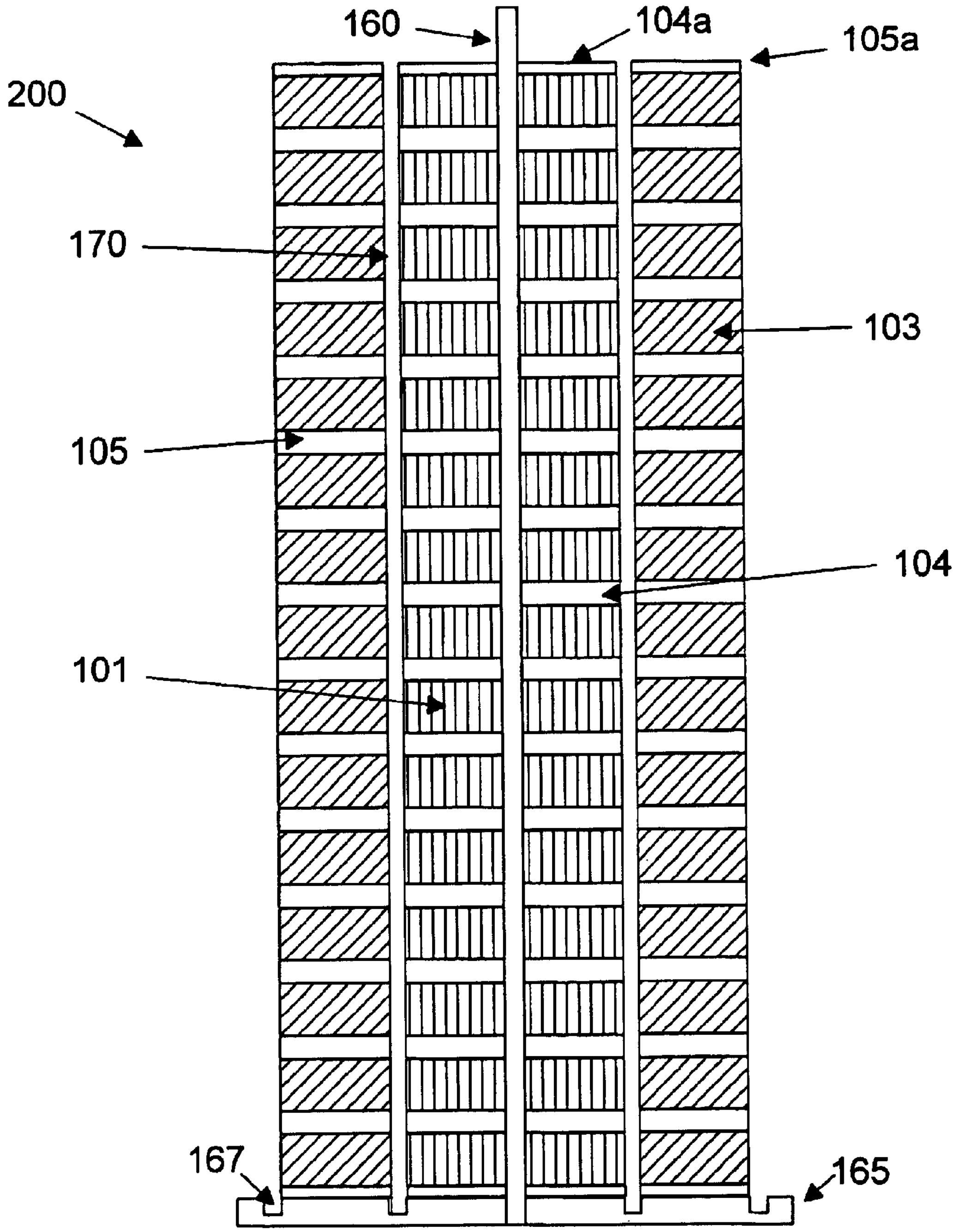
FIG. 9 is a schematic cross section of the inner and outer magnet-spacer arrays and magnet array mounting assembly of the embodiment shown in FIG. 6.
Figure 10:
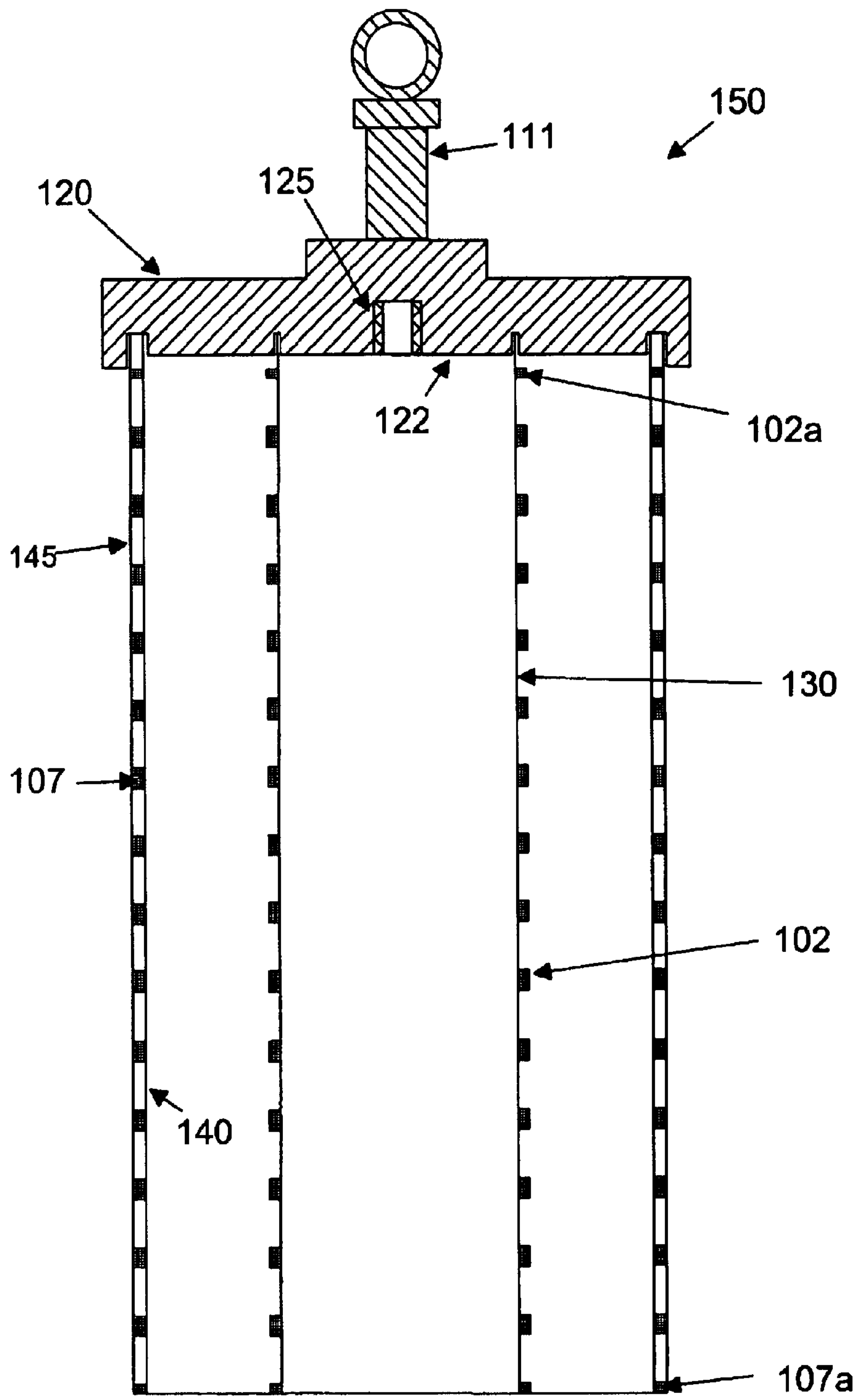
FIG. 10 is a schematic cross section of the inner and outer coil array and coil array mounting assembly of the embodiment shown in FIG. 6.
Figure 11A:
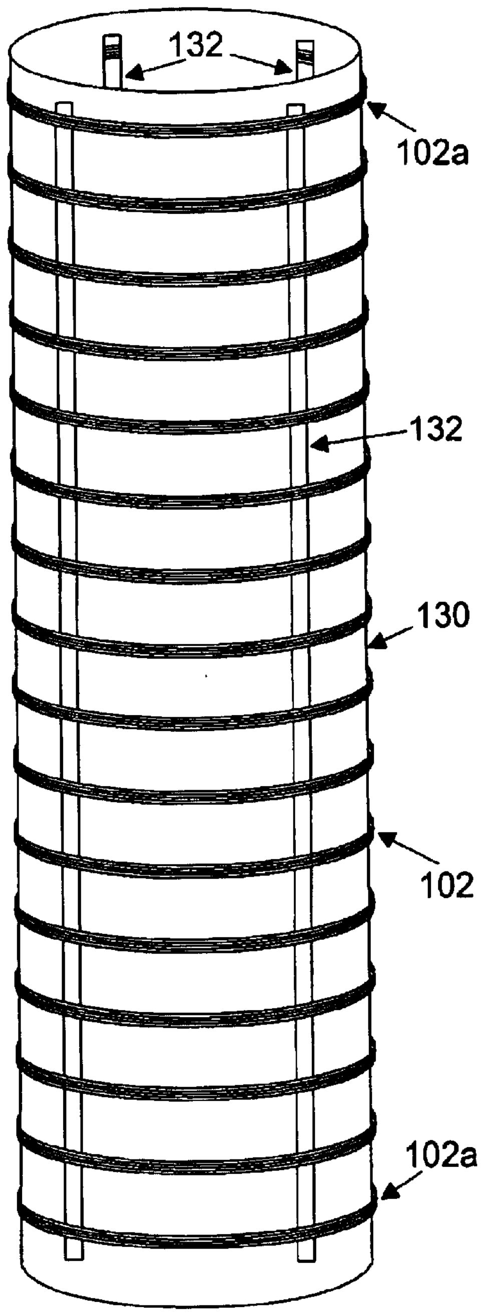
FIGS. 11A–11B are schematic diagrams of the inner coil winding array configuration and slotted coil support tube for one embodiment of the present invention where
Figure 11B:
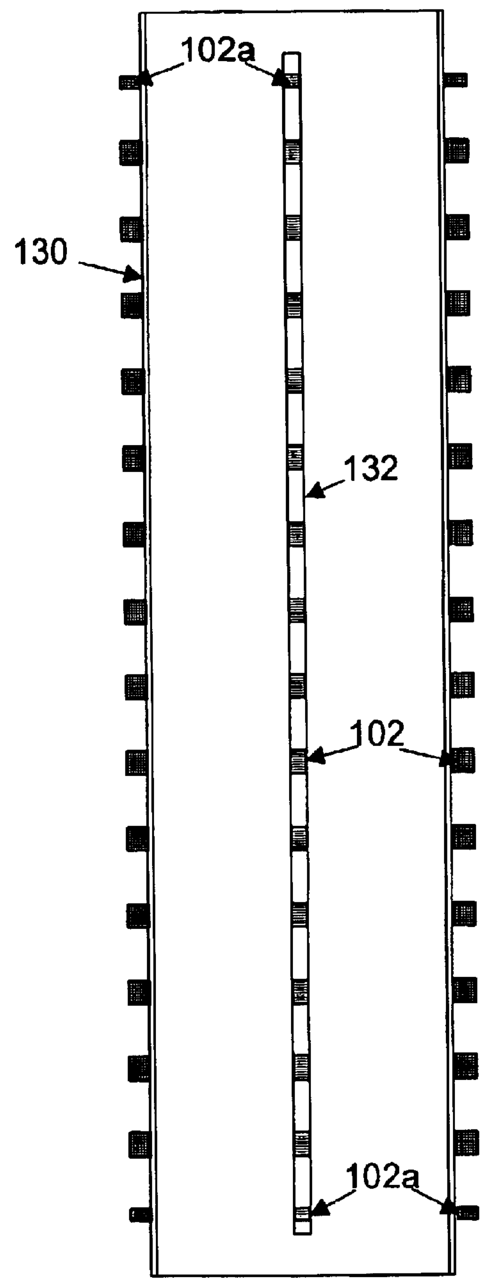
Figure 12A:
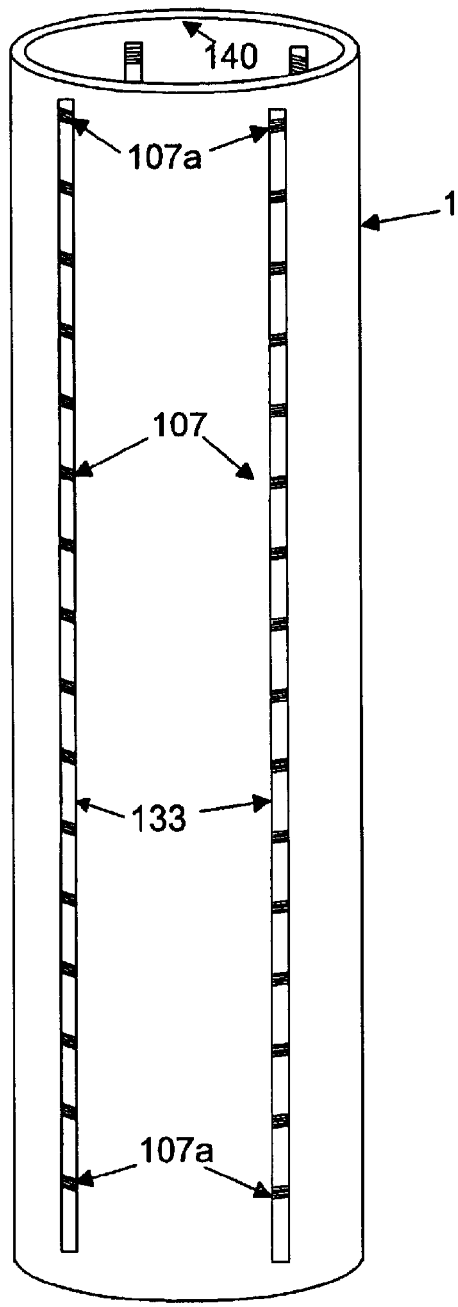
FIGS. 12A–12B are schematic diagrams of the outer coil array slotted tube supports and winding array configuration for one embodiment of the present invention where
Figure 12B:
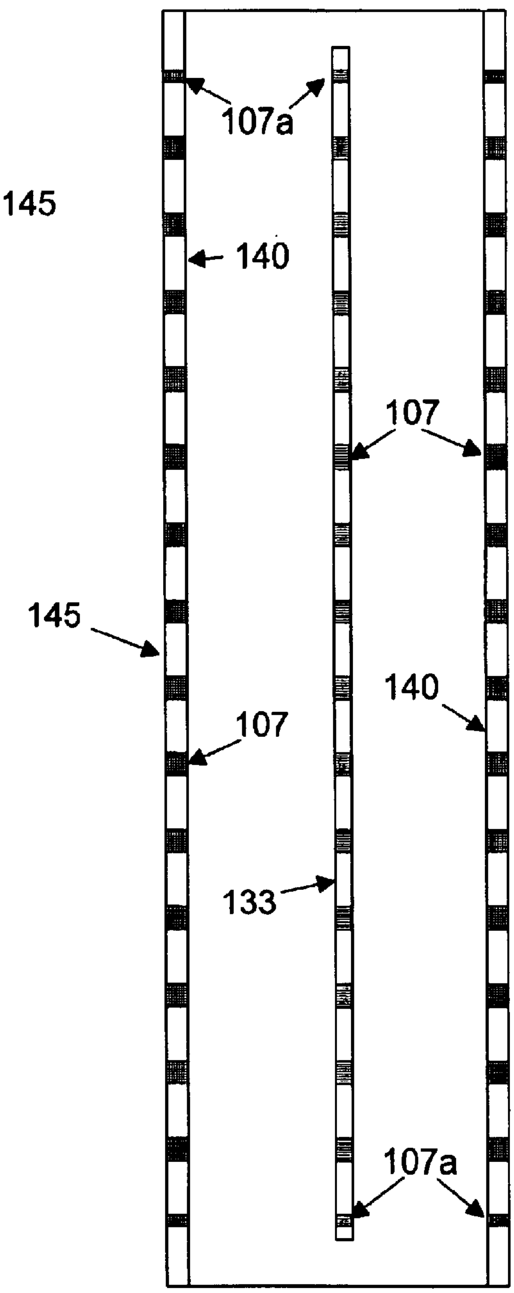

FIG. 4 provides a half cross-sectional view of a simplified magnet-coil-spacer configuration used for illustrating the innovative design features of the present invention. FIG. 6 provides a cross-sectional view of one preferred embodiment of an electromagnetic linear generator device equipped with fifteen magnet layers. In FIG. 6, a typical configuration of a central magnet array 101, inner concentric coil array 102 (102*a*), outer concentric toroidal-shaped magnet array 103, high permeability, high saturation magnetization, central and outer concentric spacers 104 (104*a*), 105 (105*a*) and optional outer concentric coil array 107 (107*a*) is shown. The magnetic pole 106 orientations of the stacked central magnets 101 and concentric magnets 103 shown in FIG. 6 are the same as those shown in FIG. 4. FIG. 9 shows details of the central and concentric stacked magnet arrays 101, 103 and magnet array assembly 200 configuration. FIG. 10 shows details of the inner and outer concentric coil arrays and coil array assembly 150 configuration. FIGS. 11A and 11B show a perspective view and cross-sectional view of the inner concentric coil array windings 102 (102*a*) and slotted coil support tube 130. FIGS. 12A–12B show a perspective view and cross section view of the outer concentric coil array windings 107 (107*a*), slotted outer coil support tube 140 and outer coil bearing tube 145.

As shown schematically in FIG. 4, two stacked arrays of central cylindrical permanent magnets 101 and concentric ring or toroidal magnets 103 are separated by a gap which accommodates placement of an inner concentric array of copper wire coils 102 (102*a*). The stacked magnets 101, 103 are separated by spacers 104 (104*a*), 105 (105*a*) which limit dispersion of the magnetic field in the magnet pole regions 106 and provide for vector superposition of the magnetic fields of a neighboring magnets 101, 103. The inner concentric coils 102 (102*a*) are positioned between the outer perimeter of the central spacers 104, 104*a* and inner perimeter of the outer spacers 105, 105*a*, adjacent to the magnetic pole regions 106 of the central magnets 101 and outer magnets 103 so as to benefit from regions of maximum average radial flux density due to vector superposition of the magnetic fields of neighboring magnets 101, 103.

In most preferred embodiments, the cross-sectional width (i.e. $R_3-R_2$) of the outer concentric toroidal-shaped magnets 103 is selected to provide a substantially uniform and maximum radial magnetic flux density in the region of the inner coils 102, 102*a*. As the spacing between the inner and outer magnets 101, 103 is increased, for example where it is desirable to increase the inner coil cross-sectional width or accommodate the same number of winding turns with a larger coil wire gauge, the outer magnet 103 cross-sectional width is increased by an equivalent width to maintain uniform high radial flux density in the gap between magnets 101, 103. In preferred embodiments, the cross-sectional width ($R_3-R_2$) of the outer toroidal magnets 103 is at least equal to the radius ($R_1$) of the central cylindrical magnets 101 but no greater than the sum of the magnet gap spacing ($R_2-R_1$) and the central magnet radius ($R_1$). In one preferred embodiment, the cross-sectional width of the outer concentric toroidal-shaped magnets 103 equals the radius of the central magnets 101. In another preferred embodiment, the cross-sectional width of the outer concentric toroidal-shaped magnets 103 is greater than the radius of the central magnets 101. In another preferred embodiment, the cross-sectional width of the outer magnets 103 is equal to the sum of the magnet gap spacing and the central magnet radius.

As FIG. 4 shows, the central magnet and concentric magnet arrays are stacked with adjacent magnet layers having like magnetic poles facing. In contrast, as shown in FIG. 4, within each magnet layer of the magnet arrays 101, 103, adjacent central 101 and concentric 103 magnets are oriented with opposite magnetic poles facing where a north or south magnetic pole 106 on a central magnet 101 faces an opposing south or north magnetic pole 106 of its adjacent concentric magnet 103. The spacers 104 (104*a*), 105 (105*a*) between magnet layers 101, 103 serve to minimize the dispersion of the magnetic field lines at the magnet poles 106 so that superposition of the magnetic fields from four neighboring magnets 101, 103 in adjacent magnet layers produce a maximum radial magnetic flux density in the inner coil windings 102. As shown in FIGS. 5A and 5B, with the innovative configuration of the present invention, the magnetic field strength and average radial magnetic flux density $B_r$ is substantially increased in the gap between the central and outer magnets 101, 103 where the inner coils 102 are located. This innovative design provides for average radial magnetic flux densities which are nearly four times greater than those produced with conventional electromagnetic generator designs which do not employ vector superposition of magnetic fields.

As shown in FIG. 4, an optional array of concentric outer coils 107, 107*a* may be positioned around the external perimeter of the outer concentric spacers 105, 105*a*, adjacent to the magnetic pole regions 106 of the outer magnets 103, so as to benefit from regions of maximum average radial magnetic flux density due to vector superposition of the magnetic fields of the outer magnets 103. At each end of the magnet-coil-spacer assembly, half-height coils 102*a*, 107*a* and spacers 104*a*, 105*a* may be employed with end magnets 101, 103. Typically, the half-height end coils 102*a*, 107*a* and half-height end spacers 104*a*, 105*a* have a length or height approximately half that of coils 102, 107 and spacers 104, 105 in order to maintain the same maximum radial magnetic flux density within the end coils 102*a*, 107*a* as is provided in the middle inner and outer coils 102, 107. In one preferred embodiment, the half-height spacers 104*a*, 105*a* and coil windings 102*a*, 107*a* have a height of at least 5 mm and the full-height coils windings 102, 107 and spacers 104, 105 have a height of at least less 10 mm, and the coil windings 102 (102*a*), 107 (107*a*) have a minimum width of 4 mm. In one embodiment, full-height coil 102, 107 heights are equal to the full-height spacer 104, 105 heights and the half-height coil 102*a*, 107*a* heights are equal to the half-height spacer 104*a*, 105*a* heights. In one preferred embodiment, the height of the full-height coils 102, 107 is greater than or equal to the spacer 104, 105 height and less than or equal to the sum of the spacer 104, 105 height and one half the magnet 101, 103 height, and the height of the half-height coils 102*a*, 107*a* is greater than or equal to the half-height spacer 104*a*, 105*a* height and less than or equal to the sum of the half-height spacer 104*a*, 105*a* height and one half the magnet 101, 103 height. In one preferred embodiment, the full-height coil 102, 107 heights and half-height coil 102*a*, 107*a* heights are at least 50% greater than the corresponding spacer 104, 105 (104*a*, 105*a*) heights. The use of longer coils 102, 107 (102*a*, 107*a*) ensures that maximum coil winding volume is always positioned within the region of maximum radial magnetic flux density during reciprocating movement of the coil arrays 102 (102*a*), 107 (107*a*) relative to the magnet arrays 101, 103 during device operation.

As shown in FIG. 6, in one preferred embodiment as a regenerative electromagnetic shock absorber, the device of the present invention comprises an array of fifteen stacked cylindrical central magnets 101 separated by high permeability spacers 104, an array of stacked concentric toroidal magnets 103 separated by high permeability spacers 105, an array of inner coil windings 102 positioned between the magnetic poles of the central magnets 101 and concentric magnet 103, an optional array of outer coil windings 107 positioned around the outside perimeter of spacers 105, and half-height spacers 104*a*, 105*a* and half-height coils 102*a*, 107*a* at each end of the assembly. As noted above, the high permeability spacers limit magnetic field dispersion of the magnetic poles of magnets 101, 103 and permit the vector superposition of magnetic field components from four neighboring magnets in the region occupied by inner coils 102 and from two neighboring magnets in the region occupied by outer coils 107 and half-height coils 102*a*, 107*a*, thereby providing for a region of maximum radial magnetic flux density in the coil windings 102 (102*a*), 107 (107*a*).

FIG. 9 provides a cross-sectional view of the magnet array assembly 200 employed in the preferred embodiment shown in FIG. 6. The stacked arrays of central cylindrical-shaped magnets 101 and outer concentric toroidal-shaped magnets 103 may be assembled with either adhesives, mechanical fasteners, such as screws, bolts or clamps, or held together by magnetic forces. By employing high magnetic permeability, high saturation magnetization spacers 104, 105 which separate the magnets 101, 103, strong attractive magnetic forces will secure the magnets together without the use of adhesives or mechanical fasteners. However, to ensure stacked magnet array rigidity and strength, in a preferred embodiment, the stacked magnets 101, 103 are bonded with a thin adhesive film.

In alternative embodiments, composite magnet assemblies formed from smaller component magnets and ferromagnetic spacers may be employed. In these embodiments, individual magnets made from composite assemblies may be formed by gluing together small rectangular-shaped permanent magnets with intervening wedges of ferromagnetic spacers, having a high magnetic permeability and high saturation magnetization, in an alternating circular pattern to form either cylindrical or toroidal-shaped magnets. The radial magnetic flux density produced by these composite magnet assemblies is essentially equivalent to the radial magnetic flux density produced by a similar-sized solid magnet due to vector superposition of the magnetic fields from adjacent magnets. This approach may be preferred where the application of specific cylindrical or toroidal magnet shapes or sizes may be impractical due to a lack of availability or high manufacturing costs.

Where glues or adhesive materials are employed in the assembly of any components of the present device 100, the primary material requirements are that the adhesives are thermally, chemically, and mechanically stable, that they have no magnetic or ferromagnetic filler and that they have sufficient adhesive strength and stiffness to ensure the integrity of the assembled components during device operation. It is anticipated that where adhesives are employed with components of the present device 100, any filled or unfilled adhesives, for example resins, polymers or copolymers of epoxy, cyanoacrylate, polyurethane, acrylic, polyester, silicon, latex or their equivalents, which satisfy these material requirements would be suitable.

In one preferred embodiment shown in FIGS. 6 and 8, the central magnet 101 and spacer 104, 104*a* stack is reinforced with a high magnetic permeability, high saturation magnetization, magnet support rod 160 which passes through axially-aligned holes in the central magnets 101 and spacers 104, 104*a*. The axial holes in the magnets 101 may be formed by either machining preformed magnet blanks or formed during casting or pressing of net shape magnets. In one preferred embodiment the support rod 160 is fabricated from 1018 steel. In another preferred embodiment, the support rod 160 is fabricated from high magnetic permeability stainless steel.

Wherever non-stainless steel alloys, such as 1018 steel or similar ferrous materials, are employed in the present device, it is preferable to coat them with a thin oxidation or corrosion resistant coating prior to assembly. In one preferred embodiment, a thin nickel coating is applied by electrolytic deposition. In preferred embodiments, the coating thickness is typically between 0.1 um and 25 um. In one preferred embodiment, the coating thickness is between 0.1 to 10 um. In a most preferred embodiment, the coating thickness is between 0.1 um and 5 um. The principal requirement for such coatings is to maintain high magnetic permeability while providing protection against oxidation or corrosion of the underlying substrate material in a minimum coating thickness.

The magnet support rod 160 is attached to a magnet array mounting plate 165 with either an adhesive or by mechanical attachment, for example a threaded fitting, screw, bolt, nut or weld. In this embodiment, the outer concentric magnet 103 and spacer 105, 105*a* stack is supported by a high magnetic permeability, high saturation magnetization, magnet support tube 170 which is also attached to the mounting plate 165 with either an adhesive or by mechanical attachment. In a preferred embodiment, the magnet support tube 170 is fabricated from 0.010" thick seamless tubing or welded rolled sheet steel, for example high magnetic permeability 1018 steel or stainless steel. In alternative embodiments, a support tube 170 having a wall thickness of between 0.005" and 0.030" may be employed depending on the mechanical strength requirements for supporting the magnets 103. In one preferred embodiment, an adhesive is used to secure the toroidal magnets 103 and spacers 105, 105*a* to the support tube 170. In one alternative configuration, the two magnet array stacks may be further secured together by way of optional radial struts attached to the magnet support tube 170 and magnet support rod 160 which pass through slotted openings in the inner coil support tube 130.

In a preferred embodiment, the magnet array mounting plate 165 is made from a non-ferromagnetic material, for example aluminum, titanium, brass or other non-ferromagnetic alloys, ceramics, polymers or composites, so as not to enhance or promote undesirable dispersion of the magnetic field and reduction of radial magnetic flux densities provided by the end magnets 101, 103 and end spacers 104*a*, 105*a* of the magnet assembly 200. The magnet array mounting plate 165 is attached to a magnet assembly end plate 183 with a suitable adhesive or by a mechanical attachment means which secures the entire magnet array assembly 200 to the device housing 190. In a preferred embodiment, the end plates 183, 182 and housing 190 are made from a conventional steel. In an alternative preferred embodiment, where weight savings are desired, the housing 190 and end plates 182, 183 may be fabricated from light weight materials, for example aluminum or titanium alloys, polymers, ceramics or composites. In a preferred embodiment, a mounting fixture 110 is attached to the magnet assembly end plate 183 which may be optionally configured for mounting the device to a vehicle suspension, stationary or mobile equipment or machinery, or any other source of linear displacement motion for energy recovery and power generation.

In a preferred embodiment, the inner coils 102, 102*a* are wound around the outside perimeter of an inner coil support tube 130 as shown in FIGS. 11A and 11B. In one preferred embodiment, optional outer coils 107, 107*a* are similarly wound around the outside perimeter of an outer coil support tube 140 (see FIGS. 12A–12B). In the most preferred embodiment the inner and outer coil support tubes 130, 140 are formed from a ferromagnetic material having a high magnetic permeability and high saturation magnetization, for example 1018 steel or high permeability stainless steel. In a preferred embodiment, the inner coil support tube 130 and outer coil support tube 140 are fabricated from 0.010" thick seamless tubing or welded rolled sheet steel. In alternative embodiments, support tubes 130, 140 ranging between a minimum thickness of 0.005" and maximum thickness of 0.030" wall thickness may be optionally employed depending on the mechanical strength requirements for supporting the coil arrays 102 (102*a*), 107 (107*a*). Unlike the inner coil array 102, 102*a* configuration the outer coil array 107, 107*a* has additional support from a bearing support tube 145, positioned around the outer perimeter of the coils 107, 107*a*, that provides a mating surface for a coil assembly bearing 185 which provides for low friction, reciprocal movement of the coil assembly 150 relative to the magnet assembly 200. In one preferred embodiment, the bearing support tube 145 is fabricated from 0.030" seamless tubing or welded rolled sheet steel, for example 1018 steel or stainless steel. In alternative embodiments, the bearing support tube 145 may range between a minimum thickness of 0.010" and maximum thickness of 0.050" depending on the mechanical strength, rigidity and bearing surface requirements for mating with the coil assembly bearing 185. The bearing support tube 145 may be optionally machined or centerless ground as required to provide a smooth mating surface for the assembly bearing 185. The thicker bearing support tube 145 provides greater rigidity to the entire coil assembly 150 and provides for precision alignment of the coil assembly 150 within the coil assembly bearing 185 during device fabrication. The additional tube 145 thickness further provides a smooth mating surface for reciprocal movement of the coil assembly 150 within the coil assembly bearing 185 during device operation. The assembly bearing 185 is preferably lubricated with a non-corrosive lubricant, such as a grease, oil or Teflon® coating. In preferred embodiments, either a linear ball bearing or a linear sleeve bearing may be employed as the coil assembly bearing 185. In one embodiment, the assembly bearing 185 is press fit into the external housing 190 and held by a retainer ring 191.

The inner coil support tube 130, outer coil support tube 140 and bearing support tube 145 are preferably formed from a high magnetic permeability, high saturation magnetization material, for example 1018 steel or high permeability stainless steel, to avoid attenuation of the radial magnetic field and reduction in radial magnetic flux density in the coil windings 102, (102*a*), 107, (107*a*). In one preferred embodiment, a series of longitudinal slots 132 is machined around the circumference of the coil winding support tubes 130, 140 in order to increase the conductor path length and resistance to induced eddy current flow around the support tube 130, 140, 145 circumferences. In an optional embodiment, the bearing support tube 145 is similarly slotted with longitudinal slots. As noted above, undesirable parasitic eddy currents, which dampen motion and reduce power output, may be induced within any conductive coil support structures due to the reciprocating displacement motion of the coil array assembly relative to the magnet array assembly during device operation. By increasing the resistance in the support tubes 130, 140, 145 with longitudinal slots, undesirable circumferential eddy current flow within the tubes 130, 140, 145 is prevented. In one preferred embodiment, four longitudinal slots are employed in the support tubes 130, 140, 145. In other embodiments, a fewer or greater number of slots may be used. In considering the requisite number of slots for a particular support tube configuration, the minimum number of slots is typically determined by minimum resistance requirements for preventing anticipated, induced eddy current flow around the tube 130, 140, 145 circumferences and the maximum number of slots is determined from tube 130, 140 mechanical strength and stiffness requirements for supporting the coils 102 (102*a*), 107 (107*a*) and linear bearing 185. It is important to note that. if longitudinal slots are employed in the bearing support tube 145, the slots should not interfere with the operation of the coil assembly bearing 185 which must provide smooth reciprocating motion of the coil array assembly relative to the magnet array assembly during device operation.

The coil spacing, coil wire type and gauge, winding height and width, winding length, number of turns, wire gauge and cross section shape for both the inner coils 102, 102*a* and optional outer coils 107, 107*a* are determined from electrical conductivity σ, open circuit voltage $V_e$, short circuit current $I_0$, coil volume $V_{coil}$ and power generation capacity requirements. Depending on desired electrical output requirements, the inner and optional outer coil windings 102 (102*a*), 107 (107*a*) of each device 100 may be optionally connected in series, parallel or a combination of series and parallel configurations to match the voltage and current requirements of an electrical load, battery or vehicle electrical system. In preferred embodiments, the individual coils of the inner 102, 102*a* and outer 107, 107*a* coil arrays are connected in series with each coil wound in an opposing direction to its neighboring coils. Since the stacked magnet arrays 101, 103 have alternating magnetic pole orientations in each layer, by connecting the individual coils within each coil array in series, with adjacent coil windings wound in opposing directions, each coil moves relative to its adjacent magnetic pole orientation while coils on either side move relative to their adjacent opposing magnetic pole orientations and phase shifts in coil array voltage and current output are avoided.

In one preferred embodiment, the device of the present invention employs coil windings 102 (102*a*), 107 (107*a*) made from copper wire having a square cross section. In another preferred embodiment, the coil windings are formed from rectangular cross section copper wire. In one embodiment, round copper wire is used for the windings. In one preferred embodiment, the coil wire is AWG #18 square copper wire having a nominal 1 mm×1 mm square cross section. In an alternative embodiment, the coil wire is AWG #18 round copper wire having a nominal 1 mm diameter cross section. In preferred embodiments, the coil wire is coated with an electrical insulator. In most preferred embodiments, an insulation coating with enhanced thermal stability is employed for increasing the current capacity of the coil winding.

Any number of coil turns, wire types and wire gauges may be employed in the coil windings for matching desired voltage, current and power output. For example, in one preferred embodiment, approximately 40 turns of AWG #18 square copper wire are employed in each of the coils. In an alternative preferred embodiment, approximately 48 turns of AWG #18 round copper wire are employed in each coil. While any suitable wire gauge may be employed in the coil windings, in preferred embodiments, the coil wire ranges between AWG # 18 and AWG #8. While industry standard wire and wire gauges are typically employed in coil windings, in alternative embodiments, coil wire may be fabricated in non standard, or intermediate gauge sizes to accommodate particular winding cross sections or electrical characteristics. In one preferred embodiment high permeability alloy wire, for example pure iron or iron-cobalt alloy, and OFHC copper wire having circular cross sections are used together for increasing the radial magnetic flux density within the coil volume. In one preferred embodiment, the coil windings are made by combining AWG #18 copper wire, having a nominal 1 mm diameter, with high permeability iron wire, having a nominal 150 um diameter. In this embodiment, the fine diameter, high permeability alloy wire fills the interstices formed by the larger diameter copper wire windings and increases the magnetic flux density within the coils windings. In this embodiment, with an assumed effective permeability of the iron alloy wire of 1.1, which takes into account the fractional cross-sectional area occupied by the iron alloy wire and an iron wire permeability of 26 at 2.2 Tesla, an approximately 5–7% increase in average radial magnetic flux $B_r$ is produced within the coil volume with an anticipated 2–3% increase in power contribution efficiency under normal driving conditions on typical road surfaces. In an alternative preferred embodiment, nickel or iron coated copper wire winding is employed for increasing the radial flux density in the coil volume.

To avoid shorting of the coil windings 102 (102*a*), 107 (107*a*), electrically insulated wire is employed in the coils. Where higher coil currents are anticipated, the current carrying capacity of the wire may be increased by employing insulation which has enhanced thermal stability. With moderate coil currents, conventional magnet or transformer wire having a thin varnish or oleoresinous enamel coating may be employed. In alternative embodiments, polyethylene, neoprene, polyurethane, polyurethane-nylon, polyvinylchloride, polypropylene, nylon or vinylacetyl resin is employed. In preferred embodiments, crosslinked polyethylene, polyurethane-155, polyurethane-nylon, polyurethane-nylon 155, Kynar or thermoplastic elastomers. In most preferred embodiments, polyurethane-180, polyurethane nylon-180, polyester-imide or polyester nylon high temperature insulation is employed. Where very high coil currents are anticipated, it is most desirable to employ wire insulation which has exceptional thermal stability, such as polyester-200, polyester-amide-imide, polytetrafluoroethylene, Kapton, silicone or polyimide.

In one preferred embodiment, the coil support tubes 130, 140 are fitted with Teflon collars to facilitate wrapping and spacing of the windings on the support tubes 130, 140. The strength and stiffness of the coil windings 102 (102*a*), 107 (107*a*), support tubes 130, 140, 145 and coil assembly 150 may be further enhanced by employing conventional potting compounds for encapsulating the coils and increasing the rigidity of the coil array support tubes 130, 140, 145. In preferred embodiments, potting compounds may be either filled or unfilled polymers, for example epoxies, acrylics, polyurethanes, cyanoacrylates, polyesters, silicones or waxes. Suitable potting compounds must be thermally stable at operating device temperatures, have sufficient strength and stiffness to support the coil windings during device operation, and contain no magnetic or ferromagnetic fillers.

As shown in FIG. 10, in a preferred embodiment, the inner and outer coil support tubes 130, 140, bearing support tube 145 and magnet support rod bearing 125 are attached to a coil assembly mounting plate 120 which supports both coil arrays 102 (102*a*), 107 (107*a*), provides for alignment of the coil arrays 102 (102A), 107 (107*a*) and magnet assembly 200 and permits coordinated, reciprocating linear motion of the coil assembly 150 and magnet assembly 200 during device operation. In one preferred embodiment, the support tubes 130, 140, 145 are attached to the coil mounting plate 120 by a mechanical attachment means, for example a threaded insert, compression ring, clamp, screw, bolt, nut, braze or weld. In another preferred embodiment, support tubes 130, 140, 145 are bonded to the mounting plate 120 with a thin adhesive film.

In a preferred embodiment, the coil mounting plate 120 is made from a non-ferromagnetic material, for example aluminum, titanium, brass or other non-ferromagnetic alloys, ceramics, polymers or composites, so as not to enhance or promote undesirable dispersion of the magnetic field and reduction of radial magnetic flux densities provided by the end magnets 101, 103 and spacers 104*a*, 105*a* of the magnet assembly 200. In one preferred embodiment, where it is necessary to reduce device 100 weight, the coil mounting plate 120 is formed from a low density material, for example an aluminum alloy, a ceramic or composite material, to reduce the overall weight of the coil assembly 150 and to provide for reduced inertia for reciprocating linear movement of the coil assembly 150 during device operation.

In a preferred embodiment shown in FIG. 6 and FIG. 10, a magnet support rod bearing 125 is attached to the center of the internal surface 122 of the coil assembly plate 120. The support rod bearing 125 receives the magnet support rod 160 of the magnet assembly 200 (see FIG. 9) and provides for precise alignment of the magnet assembly 200 with the coil assembly 140. The support rod bearing 125 is preferably either a linear sleeve bearing or ball bearing which provides for linear reciprocating movement of the magnet support rod 160 within the coil assembly plate 120 for linear reciprocating movement of the coil assembly 150 during operation. The support rod bearing 125 is preferably lubricated with a non-corrosive lubricant, such as a grease, oil or Teflon® coating.

In a preferred embodiment, the exterior surface of the coil assembly plate 120 is provided with either an integral machined extended portion or separate extension fixture 111 which serves as a both a mating surface to the magnet support rod bearing 125 and a mounting fixture for attaching the device 100 to a linear motion source such as a vehicle suspension or machinery. As shown in FIG. 6, the extension fixture 111 passes through a coil mount bearing 180 which is fitted in the coil assembly end plate 182 which seals one end of the housing enclosure 190. The coil mount bearing 180 is preferably either a linear sleeve bearing or ball bearing which provides for smooth reciprocating linear motion of the extension fixture 111 bearing surface and the coil assembly 150 within the coil assembly end plate 182 during device operation. The coil mount bearing 180 is preferably lubricated with a non-corrosive lubricant, such as a grease, oil or Teflon® coating.

As shown in FIG. 6 and FIG. 9, circular grooves 167 are machined in the magnet array mounting plate 165 to provide a sufficient gap and clearance for extended travel of the end coils 102*a*, 107*a* and support tubes 130, 140, 145 of the coil assembly 150 during reciprocating movement of the coil assembly 150 relative to the magnet assembly 200. As shown if FIG. 6 and FIG. 10, the interior surface 122 of the coil assembly plate 120 is correspondingly recessed to provide a sufficient gap and clearance for extended travel of the coil assembly plate 120 relative to the magnet assembly 200 during reciprocating movement of the coil assembly 150. The depth of the recess at the bottom surface 122 of the coil assembly plate 120 is typically matched to the depth of the grooves 167 in the magnet mounting plate 165 to provide for extended linear travel of the coil assembly 150 in both directions.

In low magnetic permeability media, such as air or vacuum, the magnetic field lines and magnetic flux density of permanent magnets rapidly disperse and attenuate with increasing distance from the magnets. In high magnetic permeability media, this does not occur. Thus, in order to minimize undesirable attenuation of magnetic field strength and radial flux densities in the coil volume regions, it is most desirable to minimize the air gap between magnets 101, 103 and coils 102 (102*a*), 107 (107*a*) and employ high magnetic permeability materials whenever possible in these regions. In the present invention, this is accomplished by employing high magnetic permeability support tubes 130, 140, 170 positioned between the magnets 101, 103 and coils 102 (102*a*), 107 (107*a*) and minimizing the air gap spacing in this region. Since the high magnetic permeability tube materials prevent attenuation of magnetic fields and radial flux densities, only the air gap between the magnets 101, 103 and support tubes 130, 140, 170 need consideration. In order to minimize this air gap, the dimensional tolerances of the magnet 101, 103 and spacer 104 (104*a*), 105 (105*a*) diameters and the support tube 130, 140, 170 diameters in the coil and magnet assemblies 150, 200 should be uniform and precise. In preferred embodiments, the magnet 101, 103, spacer 104, 105 (104*a*, 105*a*), and support tube 130, 140, 170 diameters and assembly 150, 200 dimensions are fabricated with dimensional tolerances of between ±0.0001 and ±0.0020. In one preferred embodiment, the tolerances are between ±0.0001 and ±0.001. In a most preferred embodiment, the tolerances are between ±0.0001 and ±0.0005. Depending on the support tube 130, 140, 170 wall thickness and machining tolerances of the magnet, coil and support tube components, the resulting air gap spacing between the coil support tubes 130, 140, and magnets 101, 103 and magnet support tube 170 and coils 102 (102*a*) will typically range between 2 to 20 mils to provide adequate clearance for reciprocal movement of the coil assembly 150 within the magnet assembly 200. In one preferred embodiment, the air gap ranges between 5 and 15 mils. In a most preferred embodiment, the air gap ranges between 5 and 10 mils.

As shown in FIG. 6, in a preferred embodiment, the coil and magnet assemblies 150, 200 are mounted within a cylindrical housing enclosure 190 which is sealed at either end by a coil assembly end plate 182 and magnet assembly end plate 183. The housing 190 and end plates 182, 183 protect the device 100 from dust and debris and also provide rigid support for the coil mount bearing 180 and coil assembly bearing 185 for alignment of the coil assembly 150 and the magnet support rod bearing 125 and mounting plate 165 for mounting the magnet assembly 200. In alternative embodiments, a two-part cylindrical housing with overlapping top and bottom shells may be employed, similar to a conventional shock absorber, where the top and bottom housing shells compress or expand with displacement motion. In one alternative embodiment, the top housing shell is attached to a vehicle chassis and the bottom housing shell is attached to the vehicle suspension or axle assembly. In a preferred alternative embodiment, the magnet assembly 200 is attached to a top housing shell and the coil assembly 150 is attached to a bottom housing shell. To protect the coil and magnet assemblies 150, 200 from road debris in this alternative embodiment, the top housing shell partially overlaps the bottom housing shell and the gap between the overlapping shells are sealed with a rubber or elastomer boot, flexible sleeve, o-ring, slide bearing or other conventional flexible sealing means.

In a preferred embodiment where the device of the present invention is employed as a regenerative electromagnetic shock absorber, the device 100 is appropriately sized as a replacement for conventional shock absorbers so that it can be retrofitted to most vehicles using existing shock absorber fittings on the chassis, suspension or wheel axle mount. In this embodiment, the regenerative shock absorber would typically be used with existing vehicle coil springs or leaf springs which absorb large displacements. The regenerative shock absorber would thus supplement suspension springs by providing for damping of large amplitude motions and conversion of high frequency, low amplitude vibrations and road bumps to useful electrical energy. In one preferred embodiment shown in FIG. 6, the linear electromagnetic generator device 100 may be placed inside a conventional vehicle suspension coil spring 195 and is configured with suitable mounting fixtures 110, 111 which are adapted for attachment of the device 100 to the vehicle body and suspension. In an alternative embodiment, the mounting fixtures 110, 111 may be adapted for attachment of the device 100 to a vehicle suspension which employs conventional leaf springs. While FIG. 6, shows one embodiment of a fixture 110, 111 attachment configuration, those skilled in the art will appreciate and understand the variety of device 100 attachment configurations possible and will recognize the adaptability of various attachment means 110, 111 to virtually any vehicle, machinery or equipment design.

3. Device Assembly

Since rare earth magnets having high magnetic flux and high magnetic permeability alloys are employed in the device of the present invention, it is anticipated that, when employing fairly close spacing and tolerances with the cylindrical magnet and coil assemblies, significant attractive magnetic forces between the magnets and magnetically permeable materials may pose some difficulty for assembly of the present device. This is particularly true due to the reliance on cylindrical geometry and tight tolerances where physical imperfections in the magnets may lead to asymmetric magnetic fields and flux densities which may cause jamming, sticking, buckling or deformation of the support tubes 130, 140, 145, 170 during assembly of the magnet 101, 103 and coil 102 (102*a*), 107(107*a*) arrays, particularly where substantial force is required to overcome magnetic attraction. These device assembly problems are well known in the art of electromagnetic device fabrication. Most electromagnetic device fabricators prefer to magnetize the magnet components after assembling the device to overcome these problems. Additional precautions may eliminate such assembly problems by establishing narrow specifications and tolerances for magnet materials and magnet machining to ensure uniform and homogeneous magnets with nearly perfect magnetic field symmetry to eliminate local attractive forces between the magnets 101, 103 and magnetically permeable support tubes 130, 140, 145, 170. An auxiliary electrical current may be also be applied to the coils during device assembly to induce a counter magnetic field and repulsive magnetic forces within the coil array assembly which may counteract any potential magnetic attraction encountered between the magnets 101, 103 and magnetically permeable support tubes 130, 140, 145, 170. To further facilitate device assembly, magnets and support tubes may be optionally coated or wrapped with a removable thin Teflon film or equivalent friction-reducing material.

4. Voltage Conditioning Circuit

Due to the reciprocating, intermittent displacement motion which produces electrical power with the present device 100, the coil windings produce alternating voltage and current output. To satisfy the electrical requirements of most electrical loads, such as batteries and other devices, the ac voltage must be converted to constant dc voltage. Thus, in preferred embodiments, a voltage conditioning circuit 300 is employed with each generator or regenerative shock absorber 100 to convert the time-varying ac voltage output from the coils to a constant dc voltage for charging batteries or powering other dc electrical devices. Depending on the characteristic displacement motion which drives the generator 100 and the design of the voltage conditioning circuit 300, the voltage and current output from each generator 100 may closely match the electrical load requirements or it may be necessary to combine the output from multiple devices 100 through parallel, series or combined parallel-series connections to achieve acceptable output. Alternatively, the voltage conditioning circuit from each device 100 may be connected directly to its own electrical load.

Constant voltage transformers and magnetic amplifiers are well known in the art. Such transformers or their equivalents may be employed in the voltage conditioning circuit 300 to convert ac coil output to constant de voltage. For regenerative shock absorber applications, transformers having high permeability, low coercive magnetic field intensity $H_c$ cores are particularly useful over a large dynamic range of vehicle speeds, such as 15 mph to 75 mph, a 5 to 1 ratio. In preferred embodiments, the transformer core permeability varies from approximately 5 to 1 as the applied magnetic field intensity (H) is increased, where H varies with the number of ampere-turns in a feedback winding or the product of the current in the feedback winding and the number of turns in the winding. Other component specifications for the voltage conditioning circuit 300 are determined by consideration of anticipated displacement velocities produced by typical linear displacements and vibrations as well as system electrical requirements for charging batteries or powering accessories within acceptable voltage and current specifications.

Figure 13:
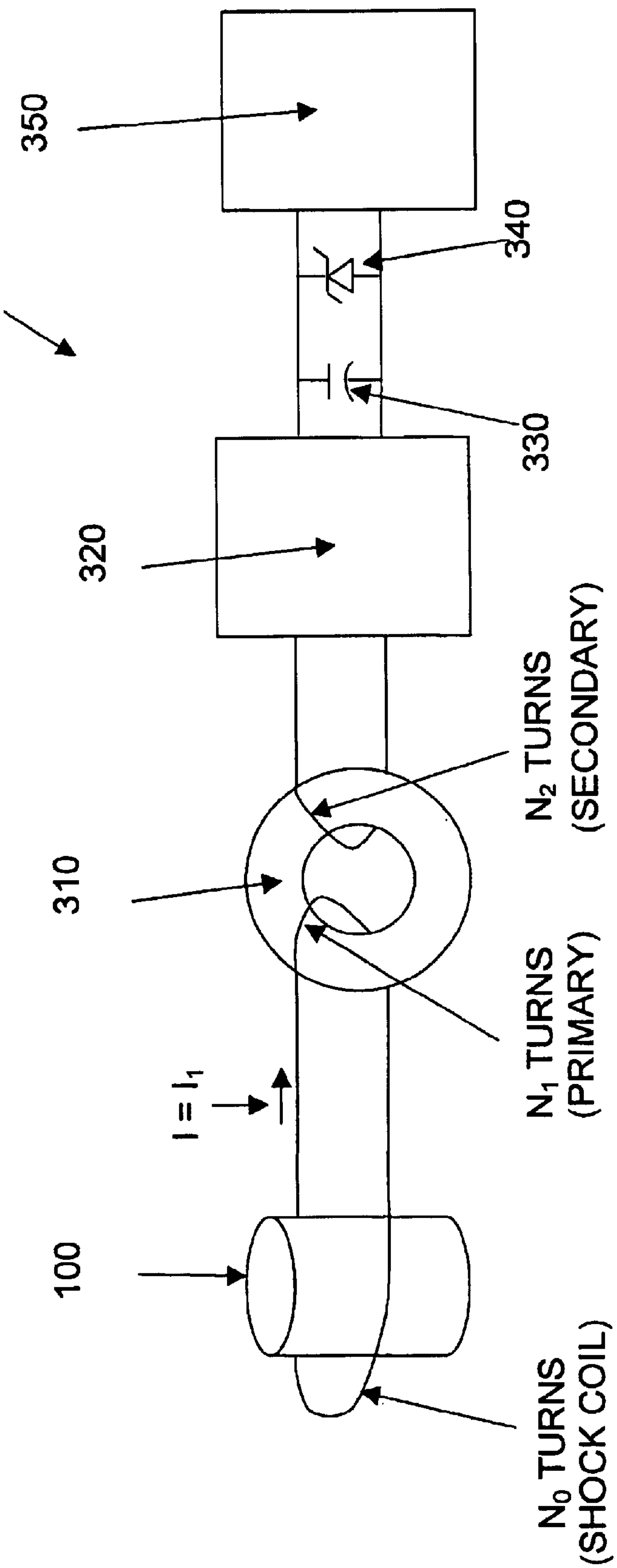
FIG. 13 is a schematic of a voltage conditioning circuit for use with the linear electromagnetic generator of the present invention.

An example voltage conditioning circuit 300 employed with a regenerative electromagnetic vehicle shock absorber of the present invention is shown in FIG. 13. In establishing the electrical specifications for this circuit 300, an average vertical displacement velocity of 0.4 m/s was assumed with a targeted output voltage of 12 volts for recharging a conventional passenger vehicle battery. As shown in FIG. 13, in one embodiment the voltage conditioning circuit 300 comprises a ferrite core transformer 310, a full-wave rectifier bridge 320, and optional capacitor 330, an optional Zener diode 340 and a conventional battery 350. In this embodiment, the ferrite transformer 310 primary winding is connected directly to the coil winding output.

In FIG. 13, $N_1$ is the number of primary winding turns in the ferrite core transformer 310 and $N_2$ is the number of secondary winding turns. In one preferred embodiment, 10 turns of AWG #18 copper wire are utilized for the transformer 310 primary winding and 24 turns of AWG#18 copper wire are employed in the secondary winding. The secondary winding gauge and number of turns may be modified to meet vehicle battery voltage requirements. In a preferred embodiment a full wave rectifier bridge 320 is employed on the secondary winding side of the transformer 310 to convert the ac coil output to dc output. The rectifier 320 is preferably rated at least 15 A/400 V with a minimum 300 A surge current. An optional capacitor 330 rated at 50 volts may be employed with a preferred capacitance of greater than 30,000 $\mu$F. In one preferred embodiment, a Zener diode with a breakdown voltage of approximately 13 V is utilized to prevent excess overvoltage charging of the battery 350. In a preferred embodiment, the ferrite-core of the transformer 310 should have a coercive field $H_c$ of approximately 20 A/m (+0.25 oersteds) and remanent magnetic flux density, $B_{rem}$ of 0.8 to 1.2 Tesla. Preferably, the ferrite core is a toroid of rectangular cross section with a 9–10 cm outer diameter, an inner diameter of 3–3.5 cm and a height of 4 cm. These specifications are matched to a shock absorber 100 with an inner cylindrical coil having an inside radius of 35.5 mm, an outside radius of 39.5 mm and a height of 10 mm with a coil volume of approximately 9,420 mm$^3$.

Based on the results of road bump modeling, it is reasonable to assume that the coil output current waveform is approximately triangular for a regenerative electromagnetic shock absorber. Furthermore, the magnetic flux density $B_0$ vs.magnetic field intensity H hysteresis loop is approximately rectangular for the ferrite-core of the ferrite core transformer 310 shown in FIG. 13. Based on these assumptions, it follows that for generator currents above a critical current $I_c$, which corresponds to $N_1 Ic=H=H_c$, where $N_1$ is the number of primary winding turns per meter for the transformer 310 and $H_c$ is the coercive magnetic field intensity of the ferrite core, the magnetic flux density $B_0$ and therefore the magnetic flux $\Phi_m$ will saturate. For this saturation condition, the effective relative permeability $\mu_r$ of the ferrite core will be very close to unity, essentially that of air. Below saturation the saturation condition, when $I<I_c$, the relative permeability will be very high, perhaps greater than 1000, compared to unity.

From Faraday's law, the magnitude of the voltage V produced in the transformer 310 secondary winding is given as $$|V| = N_2 \cdot \left|\frac{d\Phi}{dt}\right| \propto \left|\frac{dB}{dt}\right| \propto \left|\mu_r \cdot \frac{dI}{dt}\right|$$

where V is in volts, $N_2$ is the number of transformer 310 secondary winding turns, $B=\mu_o \cdot \mu_r \cdot H$ in Tesla where $\mu_o$ is the permeability of air or $4\pi\times10^{-7}$ Henries/m, the generator current $I=I_1$, where $I_1$ is the current in the transformer 310 primary winding, and d/dt represents the time derivative of the specified variables. It follows that since $I_1(t)$ is assumed to be triangular, the generator current can be represented by straight line segments for each half period $$|I_1(t)| \cong |m| \cdot t$$

where |m|=absolute magnitude of the line segment slope m and $$m \propto |I_{p-p}|$$

where $I_{p-p}$ is the peak to peak current. It also follows that, for $|I_1|>I_c$, the voltage magnitude $|V_2(t)|$ at the secondary windings of the ferrite-core transformer 310 will be a sequence of pulses whose peak value will be proportional to $|I_{p-p}|$ and whose time widths will be inversely proportional to $|I_{p-p}|$. Therefore, the area under each pulse will be independent of $|I_{p-p}|$ will be a constant. Since for $|I_1|>I_c$ the secondary voltage $|V_2|$ will be less than $10^{-3}$ of that voltage when $|I_1|<I_c$, we can conclude that, for any $|I_1(t)|>I_c$, the time average of the rectified secondary voltage $|V_2(t)|_{ave}$ will be very nearly a constant. Hence, since the battery 350 acts as an integrator, especially when the optional capacitor 330 is used, the charging voltage will be very nearly a constant. For the component specifications provided above, it is estimated that the charging voltage will be very nearly a constant 13 volts, the Zener diode 340 voltage, for an average vertical displacement velocity of 0.4 m/s which corresponds to an average vehicle horizontal velocity of 20 m/s or 45 mph on typical roads with normal bump profiles.

Generally, maximum electrical power transfer for the device of the present invention occurs when the source or coil windings impedance matches the load impedance which is actually the complex conjugate of the load impedance. It is most important that the resistive, or real, part of the coil and load impedances be equal. In preferred embodiments, this is accomplished by matching the aggregate electrical impedance of the coils to the nominal load resistance, the combined resistance of the circuit 300 and electrical load, for example a rechargeable battery 350 or other electrical device, by employing a step-down transformer. In a most preferred embodiment, the matched load condition $R_L=R_C$ is achieved with a multi-tap transformer, such as the damping transformer 351 discussed below (see FIG. 15B), where one transformer 351 tap provides a primary to secondary transformer 351 winding ratio of 1:1.

The advantages of this voltage conditioning circuit 300 compared to a conventional circuit are that no active elements are used, thereby minimizing electrical power consumption by the conditioning circuit, and that, with optional transformer 350 secondary winding taps the charging voltage may be changed either manually; or automatically, by using an active microprocessor-controlled switching circuit which adjusts voltage output in response to changes in vertical velocities produced by varying vehicle horizontal speeds and road surface conditions.

5. Electromagnetic Damping Circuit

During operation, the regenerative electromagnetic linear generator device of the present invention converts parasitic kinetic energy from linear displacement motion into useful electrical energy with some energy losses due to coil and load electrical resistance and electromagnetic damping. Due to interaction of the permanent magnets 101, 103 with induced electromagnetic fields produced by eddy current flow in the coil windings 102 (102*a*), 107 (107*a*), whenever coil motion occurs, natural electromagnetic damping is produced which resists coil movement relative to the magnets. Generally, electromagnetic damping occurs at the expense of power generation where increased damping reduces electrical power generation. While natural damping may be desirable for enhanced passenger comfort and safety in shock absorber applications, uncontrolled damping may compromise both power generation and ride comfort where large variations in road surface roughness may require either enhanced or reduced damping to match road conditions. Where unusually large or frequent road bumps or dips cause a rapid increase in vertical displacement velocity and magnitude, additional electromagnetic damping may be desirable to reduce both the magnitude and velocity of bump-induced displacements for enhanced passenger comfort and safety. For linear generator applications, uncontrolled natural damping may compromise power generating capacity and lead to undesirable mechanical friction, stress and component wear. For all of the above reasons, it may be desirable to provide some control over natural electromagnetic damping to balance the competing requirements for electrical power generation and shock or vibration damping.

In order to provide for control of natural electromagnetic damping in the present device, it is important to understand the influence of both coil resistance $R_{coil}$ and load $R_{load}$ resistance on damping force $F_d$ and regenerative electrical power $P_{regen}$. The damping force $F_d$ due to induced eddy current $I_{coil}$ in the coils is directly proportional to the eddy current $I_{coil}$ and inversely proportional to sum of the coil and load resistances $R_{coil}$ and $R_{load}$ or $$F_d \propto I_{coil} \propto (R_{coil}+R_{load})^{-1}.$$

The maximum damping force $F_{max}$ occurs with maximum eddy current or when the load resistance is zero. Under these conditions $$F_{max} \propto (R_{coil})^{-1}.$$

Normalized damping force $f_n$ may be defined as the ratio of the damping force $F_d$ to the maximum damping force $F_{max}$ where $$f_n \equiv \frac{F_d}{F_{\max}} = \frac{R_{coil}}{(R_{coil}+R_{load})} = \frac{1}{(1+r)}.$$

where r is defined as the normalized load resistance $$r \equiv \left(\frac{R_{load}}{R_{coil}}\right).$$

The regenerative power $P_{regen}$ is directly proportional to the square of the voltage and inversely proportional to the resistance where $$P_{regen} = \frac{[V_{load}]^2}{R_{load}} \propto \frac{[(V_{coil})]^2}{R_{load}}.$$

Maximum regenerative power $P_{max}$ occurs when the load resistance $R_{load}$ matches the coil resistance $R_{coil}$ and where $V_{coil}$ equals $V_{load}$ $$P_{\max} = \frac{V_{coil}^2}{4\,R_{coil}}.$$

Normalized regenerative power $p_n$ may be defined as $$p_n \equiv \left(\frac{P_{regen}}{P_{\max}}\right) = \frac{4r}{(1+r)^2}$$

where r is the normalized load resistance.

Figure 14:
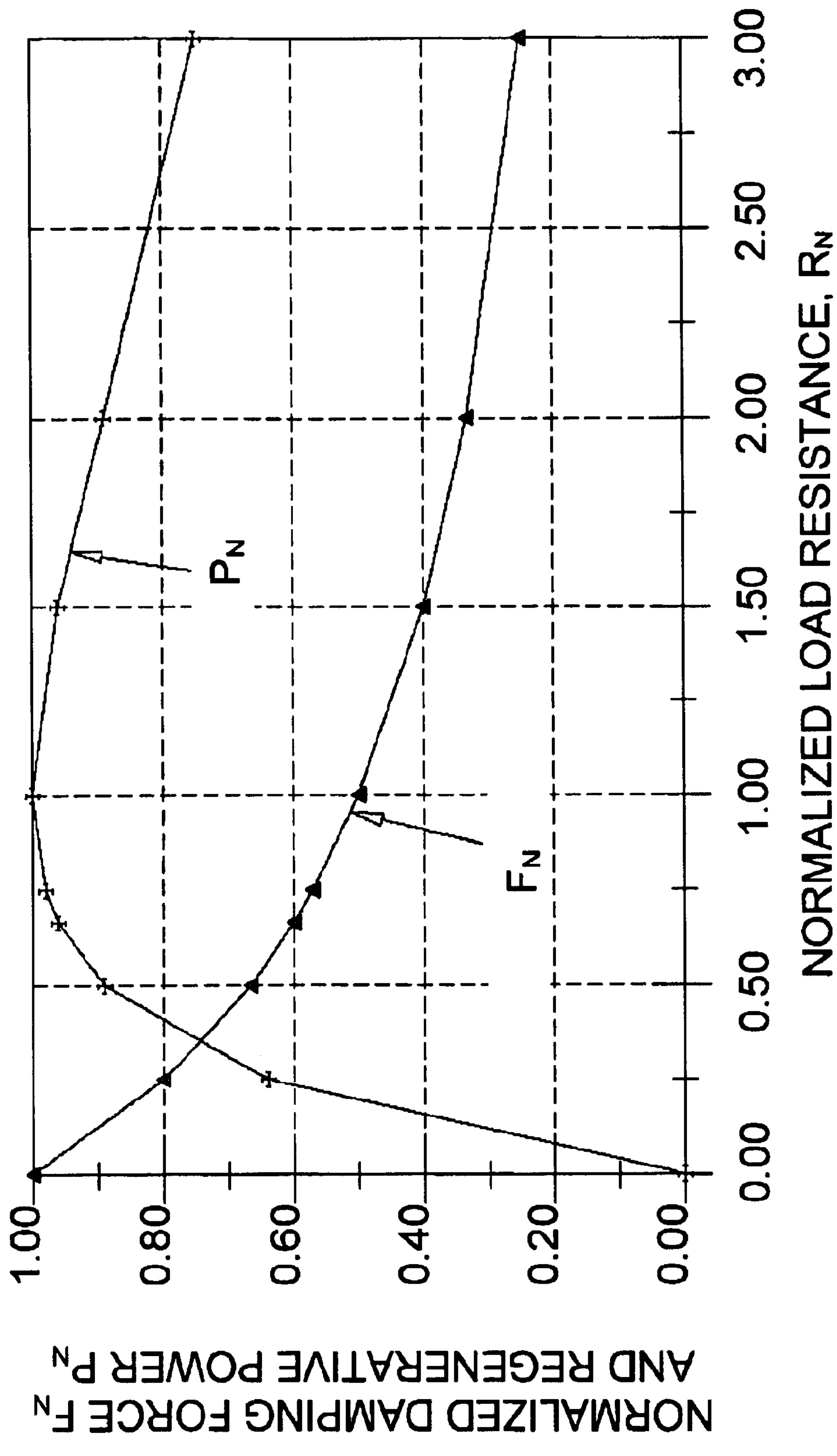
FIG. 14 is a plot of normalized damping force and normalized damping power as a function of normalized circuit load resistance.

In FIG. 14, the normalized damping force, $f_n=F_d/F_{max}=1/(1+r)$, and the normalized regenerated power, $p_nP_{regen}/P_{max}=4r/(1+r)^2$, are plotted as a function of the normalized load resistance, $r=R_{load}/R_{coil}$. As shown in FIG. 1, $P_{max}$ occurs when r=1.0 and $R_{load}=R_{coil}$, $F_d$ is a maximum when $R_{load}=0$ and reaches half maximum $F_{max}/2$ when r=1.0 or $R_{load}=R_{coil}$. $F_d$ approaches zero as $R_{load}$ approaches infinity for an open circuit condition. The normalized damping force $F_d$ equals the normalized regenerated power $P_{regen}$ when r=⅓. As the results of FIG. 14 demonstrate, the damping force $F_d$ may be varied and controlled over a wide dynamic range by simply varying the circuit load resistance, $R_{load}$. This can be achieved by applying conventional electrical circuit design concepts which provide for either manual or automatic variation of the load resistance $R_{load}$.

Damping is typically controlled by either adding load resistance to reduce damping or removing load resistance to increase damping. As shown in FIG. 14, the impact of damping force adjustment on power generation varies depending on whether the load resistance is greater than or less than the coil resistance. Power generation reaches a maximum when the load resistance equals the coil resistance. When the coil resistance is greater than the load resistance, a reduction in load resistance leads to increased damping and decreased power generation. When the load resistance is greater than the coil resistance, an increase in load resistance leads to both decreased damping and decreased power generation.

For automatic adjustment of shock absorber stiffness, an optional damping control circuit may be provided which is capable of dynamically monitoring either induced eddy current flow and voltage or changes in the induced eddy current flow and voltage in the shock absorber coils and dynamically varying the load resistance to alter both induced coil eddy current flow and the resultant eddy current-induced magnetic fields within the coils in order to either increase or decrease electromagnetic damping for enhanced passenger ride comfort or safety as road bump conditions change.

Figure 15A:
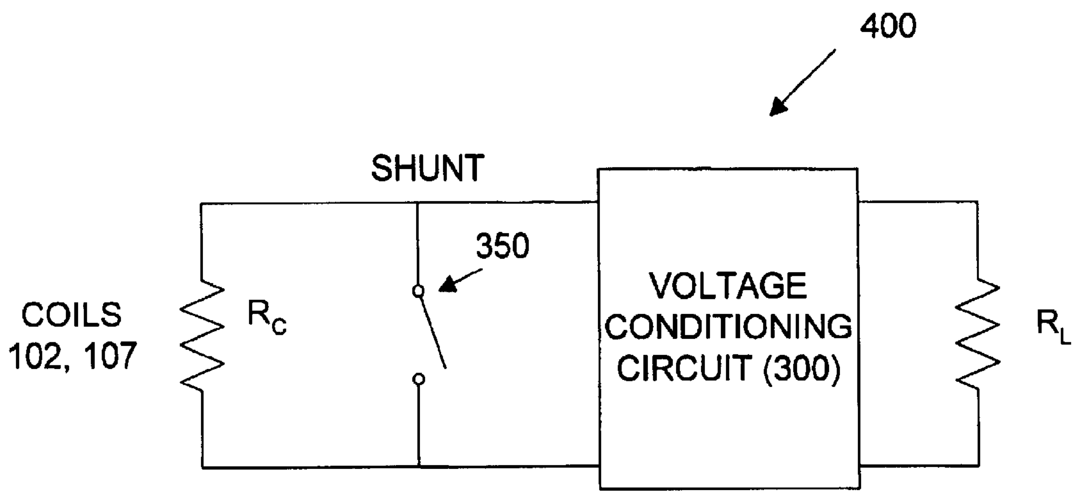
FIGS. 15A–15B are schematics of an optional damping circuits for use with the regenerative shock absorber of the present invention.
Figure 15B:
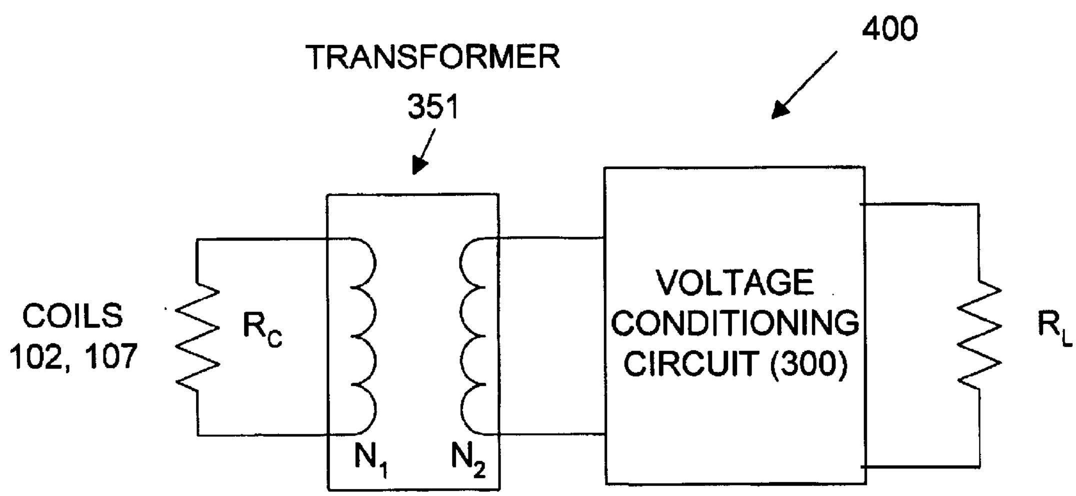

FIGS. 15A and 15B show two variations of a damping circuit 400 placed between the coil output leads and voltage conditioning circuit 300 for modifying load resistance $R_L$ to control electromagnetic damping and shock absorber stiffness. As shown in FIG. 15A, for regenerative shock absorber applications where maximum shock and vibration damping is desirable when traversing large bumps or potholes, a switch or shunt 350 may be employed between the coil output leads and the voltage conditioning circuit 300 for shorting the coil leads. Under normal driving conditions, a matched load condition is desirable for maximum power generation and the shunt switch 350 remains open so the coil is connected to the load resistance which is equal to the coil resistance $R_L=R_c$. When traversing rough road surfaces where maximum electromagnetic damping is desired, the coil leads are shorted by closing the shunt switch 350 and the effective load resistance $R_L$ drops to zero. The resultant effect on damping and power generation are shown graphically in FIG. 14 where maximum power generation and 50% damping occurs with a matched load $R_L=R_C$ and maximum damping occurs when the coil leads are shorted and $R_L=0$. As shown in FIG. 15B, for shock absorber applications where greater control of damping is desired, a multi-tap transformer 351 having varying ratios of primary to secondary winding turns may be employed between the coil output leads and the voltage conditioning circuit 300 to provide incremental variations in the apparent load resistance $R_{L_1}$ for enhanced damping control. The apparent load resistance $R_{L_1}$ on the primary winding $N_1$ side of the multi-tap transformer 351 is calculated from the actual load resistance $R_L$ on the secondary winding $N_2$ side of the transformer 351 and the transformer 351 turns ratio. By way of example, a transformer 351 winding tap which provides for a ratio of primary $N_1$ to secondary $N_2$ winding turns of $2^{-1/2}$ would reduce the apparent load resistance $R_{L_1}$ by a factor of two where $$R_{L_1}=\left(\frac{N_1}{N_2}\right)^2\cdot R_L=\left(\frac{N_1}{\sqrt{2}\cdot N_1}\right)^2\cdot R_L=\frac{R_L}{2}$$

The number of transformer 351 taps may be varied to accommodate specific damping needs. At least one tap should provide for a primary to secondary winding turn ratio of 1:1 for a matched load condition to maximize power generation. Additional taps should provide for winding turn ratios of less than one to decrease apparent load resistance $R_{L_1}$ for increased damping. Taps having winding ratios of greater than should be provided to increase the apparent load resistance $R_{L_1}$ so as to reduce eddy current flow through the coil windings to reduce damping or avoid overheating of the windings due to high rms average current. By providing a transformer with a broad range of winding taps, a wide range of damping conditions are available for enhanced damping control.

One skilled in the electronic arts would readily appreciate and recognize the inherent flexibility in providing alternative damping circuits using conventional circuit designs and methods which are generally known to those skilled in the art. For example, coil eddy currents may be monitored by monitoring the resultant voltage produced across a known resistance. The resultant output may displayed on a vehicle dashboard for manual selection of load resistance or, alternatively, electrically monitored using changes in coil voltage $V_{coil}$ or induced coil current $I_{coil}$ to provide real-time feedback for dynamic control of the load resistance for optimized balance of the competing requirements for maximum power generation and maximum ride comfort.

In alternative embodiments, either manual or electronic solid state switches or relays may be employed to switch an array of fixed resistors in series and/or in parallel with the electrical load for varying load resistance $R_L$. For automatic switching, one of the end coils of a shock absorber may be used as a sensing circuit with a fixed load to monitor coil output in response to vertical displacements. With a fixed load, either open circuit voltage or short circuit current may be used to measure shock absorber performance. In one embodiment, where open circuit voltage is monitored, a Zener diode may be employed for establishing a threshold voltage which, when exceeded, causes switching of the remaining shock absorber coil output to an appropriate combination of series and parallel resistors for controlled damping. Such damping adjustments may be made automatically, through additional damping circuitry with dynamic, real-time feedback control, or manually, by dashboard switch settings which provide for selecting a variable load resistance to modify electromagnetic damping behavior.

The effectiveness of electromagnetic damping may be illustrated by considering the damping time constant and associated terminal velocity for an electromagnetically dampened shock absorber where either the magnet assembly or coil assembly move relative to one another. The damping time constant τ is given by $$\tau=\frac{m}{\sigma\cdot B_r\cdot V_{coil}}$$

where m is the mass of the vehicle suspension either per coil or per magnet, σ is the conductivity of the coil winding, $B_r$ is the average radial magnetic flux density of the coil winding and $V_{coil}$ is the coil winding volume. The terminal velocity of the moving magnet or coil assembly is given by $$v_T=\frac{F_0}{m}\cdot\tau=a\cdot\tau$$

where a is the acceleration of the magnet or coil assembly due to external forces acting on the assembly. In most cases the acceleration a is approximately equal to the gravitational acceleration constant of 9.8 $m/s^2$. Assuming a suspension mass of 4.5 kg per coil, a coil conductivity of $5\times10^7$ S/m, an average radial magnetic flux density of 2.0 Tesla, and a coil volume of $10^{-5}$ $m^3$, the damping time constant is approximately 4.5 ms and the terminal velocity is approximately 4.4 cm/s. Typically, the terminal velocity will be reached at $t\approx5\tau$. Since the damping time constant is inversely proportional to conductivity and directly proportional to resistance, as circuit load resistance $R_L$ is increased, damping time and damping velocity will increase with a resultant increase in power generation.

6. Optional Vehicle Height Adjustment

With applications of the present device as a regenerative electromagnet shock absorber, vehicle suspension coil or leaf springs generally provide the necessary return force to maintain the shock absorber in a neutral position which allows maximum travel of the coil assembly relative to magnet assembly for reciprocating displacement motion. However, where there is an increase in cargo or passengers, the additional weight causes compression of the springs and displacement of the vehicle chassis relative to the wheel axles. This suspension movement may displace the coil assembly from its neutral position and some correction of vehicle height is necessary in order to maintain maximum stroke travel of shock absorber. Restoration of the coil assembly to its neutral position may be accomplished by any number of known devices and methods which provide for adjusting vehicle chassis height relative to wheel axles. For example, a vehicle equipped with a chassis height adjustment system comprising a plurality of optical, electrical or mechanical sensors to detect the height of the chassis relative to each wheel axle, a signal comparator circuit for comparing sensor signal output to reference signals indicative of relative chassis height, a control circuit which uses the output for the comparator circuit to adjusting the flow of gas or fluid from a reservoir to a plurality of pneumatic or hydraulic valves associated with each wheel, wherein the height of the chassis relative to each wheel axle is adjusted to a reference height where the coil array assembly is in its neutral position. Such systems are well known in the art and use conventional electrical circuits, fluid or air reservoirs, and fluid or air valves all of which may be readily adapted and configured for use with the present regenerative shock absorber by one skilled in the art [see for example, U.S. Pat. No. 4,266,790 to Uemura, et al., U.S. Pat. No. 3,573,883 to Cadiou, U.S. Pat. No. 4,614,359 to Lundin, et al, and U.S. Pat. No. 4,867,474 to Smith which are incorporated herein by this reference].

7. Alternative Device Configurations

Due to the unique power generating capabilities and versatility of the electromagnetic device of the present invention, it may be readily adapted for use either as a linear electromagnetic generator for stationary or portable field deployments or as a regenerative electromagnetic shock absorber for all types of vehicles, boats, aircraft and machinery or equipment where it is desirable to recover significant amounts of energy and power which are wasted in parasitic motions and undesirable vibrations. Those skilled in the art will readily appreciate the versatility and adaptability of the present invention to a number of applications where energy and power recovery from parasitic linear motion is required. For most applications, attachment means configurations and modifications which are generally known to those skilled in the art may be applied to the device housing 190, end plates 182, 183 or mounting fixtures 110, 111 to meet specific device installation requirements.

Where it is desirable to match device characteristics to known power requirements or known displacement velocity, frequency, magnitude, force and travel, the size, weight or volume of the central cylindrical magnets, concentric toroidal magnets, inner and outer coils and high permeability spacers may be readily adapted without departing from the innovative feature of the present invention. For example, for off-road vehicles, where unusually rough road conditions are typically encountered, large vertical displacements and displacement velocities are anticipated. For these applications, the available stroke length, coil height, or travel of the coil assemblies relative to the magnet assemblies may be increased to accommodate larger anticipated displacements. In some embodiments, where large coil displacements and extended stroke lengths are anticipated, maximum coil stroke travel in either direction may be constrained to a distance equal to approximately half the magnet heights to avoid phase shifts when coils traverse from one magnetic pole to an opposing magnetic pole. When extended displacement stroke lengths are anticipated, in some embodiments spacer heights may be increased to ensure that the moving coil volumes remain within the region of maximum magnetic flux density for essentially the entire stroke travel. Additionally, as spacer heights are increased, magnet size may be increased to maintain the high radial magnetic flux densities within the coil volumes. When adapting the device of the present invention to specific installations and applications which may require modifications to magnet, coil and spacer dimensions and spacing, it is preferable to maximize the coil volume positioned within the region of the highest radial magnetic flux density and most preferable to maintain the highest average radial magnetic flux density within the coil volume for optimum device performance since the power output of the present device varies linearly with coil volume and parabolically with average radial magnetic flux density.

Having described the preferred embodiments of the invention, it will now become apparent to one of skill in the art that other embodiments incorporating the concepts may be used. Therefore, it is not intended to limit the invention to the disclosed embodiments but rather the invention should be limited only by the spirit and scope of the following claims.

What is claimed is:

1. A linear electromagnetic generator for providing electrical power from intermittent reciprocating linear motion comprising:

a central magnet array assembly comprised of a central magnet array comprising a plurality of axially-aligned, stacked cylindrical magnets having like magnetic poles facing one another, a plurality of high magnetic permeability, high saturation magnetization, central cylindrical spacers positioned at each end of said stacked central magnet array and between adjacent stacked central magnets, and a magnet array support for mounting said magnets and said spacers;

an inner coil array comprised of a plurality of concentric cylindrical coil windings positioned adjacent to said central spacers and said magnetic poles of said central magnets, said inner coil windings surrounding an outside perimeter of said central spacers, said inner coil array mounted on a movable coil support, said movable coil support providing for reciprocating linear motion of said coil array relative to said magnet array; and an outer magnet array assembly comprised of an outer magnet array comprising a plurality of axially-aligned, stacked concentric toroidal magnets having like magnetic poles facing each other, said outer magnet array surrounding said inner coil array, said stacked outer magnets being aligned and positioned substantially coplanar with said stacked central cylindrical magnets with the magnetic poles of said outer magnets aligned with and facing opposing magnetic poles of said central cylindrical magnets, and a plurality of high permeability, high saturation magnetization, outer concentric toroidal spacers positioned at each end of said stacked outer magnet array and between adjacent stacked outer magnets, said outer magnet array assembly attached to said magnet array support;

wherein a predetermined location, configuration and orientation of said central magnet magnetic poles, said central spacers, said inner coil windings, said outer magnet magnetic poles and said outer spacers provide for superposition of a radial component of a magnetic flux density from a plurality of central and outer magnets to produce a maximum average radial magnetic flux density in the inner coil windings.

2. The device of claim 1 wherein the resultant average radial magnetic flux density in each inner coil produced by the superposition of a plurality of magnetic fields is approximately four times the average radial flux density produced in each coil by each individual magnet and wherein movement of each coil relative to said inner and outer magnet arrays generates approximately sixteen times the electrical power produced by the movement of each coil relative to each magnet.

3. The device of claim 1 wherein said central and outer magnets comprise magnetic materials selected from the group consisting of iron, neodymium, boron, samarium, strontium, cobalt, nickel, aluminum and their alloys, said inner and outer spacers comprise a ferromagnetic material selected from the group consisting of iron, nickel, cobalt and their alloys, and said inner coils comprise insulated copper wire windings.

4. The device of claim 1 further comprising a voltage conditioning circuit electrically connected to said coil windings, said circuit comprising a ferrite core transformer, a full wave rectifier bridge, a capacitor and a Zener diode, said voltage conditioning circuit providing a useful output voltage and current to an external electrical load.

5. The device of claim 1 further comprising an array of outer concentric cylindrical coil windings positioned adjacent to said outer spacers, said outer coil winding height and width being substantially equal to said inner coil winding height and width, said outer coil windings surrounding an external perimeter of said outer spacers, said outer coil array mounted on said movable coil support, wherein a predetermined location, configuration and orientation of said outer magnet magnetic poles, said outer spacers and said outer coil windings provide for superposition of a radial component of a magnetic flux density from a plurality of outer magnets to produce a maximum average radial magnetic flux density in the outer coil windings.

6. The device of claim 1 wherein said central and outer magnet heights are substantially equal, said outer magnet cross-sectional width is greater than or equal to said central magnet radius, said inner and outer spacer heights are substantially equal, said inner coil height is no less than said spacer height and no greater than the sum of said spacer height and one half of said magnet heights, and an air gap spacing between said magnet and coil array assemblies is at least 0.002 inches and no greater than 0.020 inches.

7. A regenerative electromagnetic shock absorber comprising:

a linear electromagnetic generator comprised of a central magnet array assembly comprising a central magnet array comprised of a plurality of axially-aligned, stacked cylindrical magnets having like magnetic poles facing one another, a plurality of high magnetic permeability, high saturation magnetization, central cylindrical spacers positioned at each end of said stacked central magnet array and between adjacent stacked central magnets, and a magnet array support for mounting said magnets and said spacers;

an inner coil array comprising a plurality of concentric cylindrical coil windings positioned adjacent to said central spacers and said magnetic poles of said central magnets, said inner coil windings surrounding an outside perimeter of said central spacers, said inner coil array mounted on a movable coil support, said movable coil support providing for reciprocating linear motion of said coil array relative to said magnet array; and an outer magnet array assembly comprising an outer magnet array comprised of a plurality of axially-aligned, stacked concentric toroidal magnets having like magnetic poles facing each other, said outer magnet array surrounding said inner coil array, said stacked outer concentric magnets being aligned and positioned essentially coplanar with said stacked central cylindrical magnets with the magnetic poles of said outer magnets aligned with and facing opposing magnetic poles of said central cylindrical magnets, and a plurality of high permeability, high saturation magnetization, outer concentric toroidal spacers positioned at each end of said stacked outer magnet array and between adjacent stacked outer magnets, said outer magnet array assembly attached to said magnet array support;

wherein a predetermined location, configuration and orientation of said central magnet magnetic poles, said central spacers, said inner coil windings, said outer magnet magnetic poles and said outer spacers provide for superposition of a radial component of a magnetic flux density from a plurality of central and outer magnets to produce a maximum average radial magnetic flux density in the inner coil windings; and a voltage conditioning circuit electrically connected to said coil windings, said voltage conditioning circuit providing an output voltage and output current to an electrical load.

8. The regenerative electromagnetic shock absorber of claim 7 wherein said voltage conditioning circuit comprises a ferrite core transformer, a full wave rectifier bridge, a capacitor and a Zener diode.

9. The regenerative electromagnetic shock absorber of claim 7 further comprising a damping circuit electrically connected in series between said generator coil windings and said voltage conditioning circuit wherein said damping circuit is selected from the group consisting of a shunt, a multi-tap transformer having a plurality of selectable primary and a secondary winding turn ratios, and a selectable resistance array comprising a plurality of fixed resistors connected in series and parallel by way of selectable resistance switches, wherein said damping circuit controls displacement motion and displacement velocity of a movable mass.

10. The regenerative electromagnetic shock absorber of claim 9 wherein said damping circuit further comprises a monitoring circuit for measuring changes in said generator coil current or voltage output and a control circuit for dynamically adjusting a load impedance by electrically engaging said shunt, said multi-tap transformer or said selectable resistance array in response to changes in said coil output.

11. The regenerative electromagnetic shock absorber of claim 7 wherein the resultant average radial magnetic flux density in each inner coil produced by the superposition of a plurality of magnetic fields is approximately four times the average radial flux density produced in each coil by each individual magnet and wherein movement of each coil relative to said inner and outer magnet arrays generates approximately sixteen times the electrical power produced by the movement of each coil relative to each magnet.

12. The regenerative electromagnetic shock absorber of claim 7 wherein said central and outer magnets comprise magnetic materials selected from the group consisting of iron, neodymium, boron, samarium, strontium, cobalt, nickel, aluminum and their alloys, said inner and outer spacers comprise a ferromagnetic materials selected from the group consisting of iron, nickel, cobalt and their alloys, and said inner coils comprise insulated copper wire windings.

13. The regenerative electromagnetic shock absorber of claim 7 further comprising an array of outer concentric cylindrical coil windings positioned adjacent to said outer spacers, said outer coil winding height and width being substantially equal to said inner coil winding height and width, said outer coil windings surrounding an external perimeter of said outer spacers, said outer coil array mounted on said movable coil support, wherein a predetermined location, configuration and orientation of said outer magnet magnetic poles, said outer spacers and said outer coil windings provide for superposition of a radial component of a magnetic flux density from a plurality of outer magnets to produce a maximum average radial magnetic flux density in the outer coil windings.

14. The regenerative electromagnetic shock absorber of claim 7 wherein said central and outer magnet heights are substantially equal, said outer magnet cross-sectional width is greater than or equal to said central magnet radius, said inner and outer spacer heights are substantially equal, said inner coil height is no less than said spacer height and no greater than the sum of said spacer height and one half of said magnet heights, and an air gap spacing between said magnet and coil array assemblies is at least 0.002 inches and no greater than 0.020 inches.

15. A regenerative electromagnetic shock absorber system comprising:

a plurality of electromagnetic generators comprised of
  a central magnet array assembly comprising
    a central magnet array comprised of a plurality of axially-aligned, stacked cylindrical magnets having like magnetic poles facing one another,
    a plurality of high magnetic permeability, high saturation magnetization, central cylindrical spacers positioned at each end of said stacked central magnet array and between adjacent stacked central magnets, and
    a magnet array support for mounting said magnets and said spacers;
  an inner coil array comprising of a plurality of concentric cylindrical coil windings positioned adjacent to said central spacers and said magnetic poles of said central magnets, said inner coil windings surrounding an outside perimeter of said central spacers, said inner coil array mounted on a movable coil support, said movable coil support providing for reciprocating linear motion of said coil array relative to said magnet array; and
  an outer magnet array assembly comprising
    an outer magnet array comprised of a plurality of axially-aligned, stacked concentric toroidal magnets having like magnetic poles facing each other, said outer magnet array surrounding said inner coil array, said stacked outer concentric magnets being aligned and positioned substantially coplanar with said stacked central cylindrical magnets with the magnetic poles of said outer magnets aligned with and facing opposing magnetic poles of said central cylindrical magnets, and
    a plurality of high permeability, high saturation magnetization, outer concentric toroidal spacers positioned at each end of said stacked outer magnet array and between adjacent stacked outer magnets,
    said outer magnet array assembly attached to said magnet array support;
  wherein a predetermined location, configuration and orientation of said central magnet magnetic poles, said central spacers, said inner coil windings, said outer magnet magnetic poles and said outer spacers provide for superposition of a radial component of a magnetic flux density from a plurality of central and outer magnets to produce a maximum average radial magnetic flux density in the inner coil windings; and
a plurality of voltage conditioning circuits, each voltage conditioning circuit paired with one generator and electrically connected to said generator coil windings, said voltage conditioning circuits providing an output voltage and output current to an electrical load.

16. The regenerative shock absorber system of claim 15 further comprising a plurality of damping circuits electrically connected in series between said generator coil windings and said voltage conditioning circuits wherein said damping circuit is selected from the group consisting of a shunt, a multi-tap transformer having a plurality of selectable primary and a secondary winding turn ratios, and a selectable resistance array comprising a plurality of fixed resistors connected in series and parallel by way of selectable resistance switches, wherein said damping circuit controls displacement motion and displacement velocity of a movable mass.

17. The regenerative shock absorber system of claim 16 wherein said damping circuits further comprise a monitoring circuit for measuring changes in said generator coil current or voltage output and a control circuit for dynamically adjusting a load impedance by electrically engaging said shunt, said multi-tap transformer or said selectable resistance array in response to changes in said coil output.

18. The regenerative shock absorber system of claim 15 wherein said voltage conditioning circuits comprise a ferrite core transformer, a full wave rectifier bridge, a capacitor and a Zener diode.

19. The regenerative shock absorber system of claim 15 wherein the electrical output from each of said voltage conditioning circuits is combined with the electrical output from all of said voltage condition circuits.

20. The regenerative shock absorber system of claim 19 wherein the electrical output from each of said voltage conditioning circuits is combined in series, parallel, or a combination of series and parallel connections to produce a predetermined voltage and current for an electrical load.

21. The regenerative shock absorber system of claim 15 wherein the resultant average radial magnetic flux density in each inner coil produced by the superposition of a plurality of magnetic fields is approximately four times the average radial flux density produced in each coil by each individual magnet and wherein movement of each coil relative to said inner and outer magnet arrays generates approximately sixteen times the electrical power produced by the movement of each coil relative to each magnet.

22. The regenerative shock absorber system of claim 15 wherein said central and outer magnets comprise magnetic materials selected from the group consisting of iron, neodymium, boron, samarium, strontium, cobalt, nickel, aluminum and their alloys, said inner and outer spacers comprise a ferromagnetic material selected from the group consisting of iron, nickel, cobalt and their alloys, and said inner coils comprise insulated copper wire windings.

23. The regenerative shock absorber system of claim 15 wherein said central and outer magnet heights are substantially equal, said outer magnet cross-sectional width is substantially equal to said central magnet radius, said inner and outer spacer heights are substantially equal, said inner coil height is no less than said spacer height and no greater than the sum of said spacer height and one half of said magnet heights, and an air gap spacing between said magnet and coil array assemblies is at least 0.002 inches and no greater than 0.020 inches.

24. The regenerative shock absorber system of claim 15 further comprising an array of outer concentric cylindrical coil windings positioned adjacent to said outer spacers in said generator, said outer coil winding height and width being substantially equal to said inner coil winding height and width, said outer coil windings surrounding an external perimeter of said outer spacers, said outer coil array mounted on said movable coil support, wherein a predetermined location, configuration and orientation of said outer magnet magnetic poles, said outer spacers and said outer coil windings provide for superposition of a radial component of a magnetic flux density from a plurality of outer magnets to produce a maximum average radial magnetic flux density in the outer coil windings.

* * * * *